(12) United States Patent
Gotou et al.

(10) Patent No.: US 9,068,090 B2
(45) Date of Patent: *Jun. 30, 2015

(54) IMAGE FORMING METHOD

(71) Applicant: Ricoh Company, Ltd., Tokyo (JP)

(72) Inventors: Hiroshi Gotou, Kanagawa (JP); Hidetoshi Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 156 days.

This patent is subject to a terminal disclaimer.

(21) Appl. No.: 13/683,000

(22) Filed: Nov. 21, 2012

(65) Prior Publication Data

US 2013/0176369 A1 Jul. 11, 2013

(30) Foreign Application Priority Data

Jan. 10, 2012 (JP) ................................ 2012-002423

(51) Int. Cl.
*B41J 2/01* (2006.01)
*C09D 11/02* (2014.01)
(Continued)

(52) U.S. Cl.
CPC ............... *C09D 11/02* (2013.01); *B41J 2/2107* (2013.01); *B41J 2/01* (2013.01); *B41M 5/0011* (2013.01);
(Continued)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218

USPC ......... 347/100, 95, 96, 101, 102, 21, 20, 103; 106/31.6, 31.13, 31.27; 523/160, 161
See application file for complete search history.

(56) References Cited

U.S. PATENT DOCUMENTS

| 5,224,987 A | 7/1993 | Matrick |
| 6,232,361 B1 | 5/2001 | Laksin et al. |

(Continued)

FOREIGN PATENT DOCUMENTS

| CN | 101909898 A | 12/2010 |
| CN | 102144007 A | 8/2011 |

(Continued)

OTHER PUBLICATIONS

U.S. Appl. No. 13/680,386, filed Nov. 19, 2012, Gotou, et al.

(Continued)

*Primary Examiner* — Manish S Shah
(74) *Attorney, Agent, or Firm* — Oblon, McClelland, Maier & Neustadt, L.L.P.

(57) ABSTRACT

An image forming method including adhering a pretreatment liquid to a surface of a recording medium bearing a coat layer thereon; adhering an ink including a colorant, an organic solvent, a surfactant and water to the surface of the recording medium to form an image of the ink; and adhering an aftertreatment liquid to the image-bearing surface of the recording medium to form a protective layer on at least the image on the recording medium. The organic solvent of the ink includes a polyalcohol having an equilibrium moisture content of not less than 30% by weight at 23° C. and 80% RH; a β-alkoxy-N,N-dimethylpropionamide compound, and at least one compound selected from 1,3-dioxane-4-methanol compounds, oxetane compounds, and sebacic acid dialkylester compounds.

7 Claims, 6 Drawing Sheets

(51) Int. Cl.
*B41J 2/21* (2006.01)
*C09D 11/322* (2014.01)
*C09D 11/38* (2014.01)
*C09D 11/40* (2014.01)
*C09D 11/54* (2014.01)
*B41M 5/00* (2006.01)
*B41M 7/00* (2006.01)

(52) U.S. Cl.
CPC ........... *B41M 5/0023* (2013.01); *B41M 7/0036* (2013.01); *C09D 11/322* (2013.01); *C09D 11/38* (2013.01); *C09D 11/40* (2013.01); *C09D 11/54* (2013.01)

(56) References Cited

U.S. PATENT DOCUMENTS

| | | |
|---|---|---|
| 2007/0197685 A1 | 8/2007 | Aruga et al. |
| 2008/0233363 A1 | 9/2008 | Goto |
| 2008/0257207 A1 | 10/2008 | Rengaswamy et al. |
| 2009/0043028 A1 | 2/2009 | Matsuyama et al. |
| 2009/0098312 A1 | 4/2009 | Goto et al. |
| 2009/0176070 A1 | 7/2009 | Goto et al. |
| 2009/0291213 A1 | 11/2009 | Ohshima et al. |
| 2010/0196601 A1 | 8/2010 | Goto et al. |
| 2010/0196602 A1 | 8/2010 | Koyano et al. |
| 2010/0295891 A1 | 11/2010 | Goto et al. |
| 2011/0057981 A1 | 3/2011 | Aruga et al. |
| 2011/0164086 A1 | 7/2011 | Ggoto et al. |
| 2011/0292114 A1 | 12/2011 | Sao et al. |
| 2011/0310166 A1 | 12/2011 | Namba et al. |
| 2012/0098883 A1 | 4/2012 | Matsuyama et al. |
| 2012/0128949 A1 | 5/2012 | Goto |
| 2012/0207983 A1 | 8/2012 | Matsuyama et al. |
| 2013/0155145 A1* | 6/2013 | Gotou et al. .................... 347/21 |

FOREIGN PATENT DOCUMENTS

| | | |
|---|---|---|
| EP | 2 390 288 A1 | 11/2011 |
| JP | 3-169644 | 7/1991 |
| JP | 2004-330568 | 11/2004 |
| JP | 2007-144975 | 6/2007 |
| WO | WO 00/34400 A1 | 6/2000 |
| WO | WO 2010/150913 A1 | 12/2010 |
| WO | WO 2011/021591 A1 | 2/2011 |

OTHER PUBLICATIONS

U.S. Appl. No. 13/606,075, filed Sep. 7, 2012, Fujii, et al.
U.S. Appl. No. 13/494,222, filed Jun. 12, 2012, Hidefumi Nagashima, et al.
U.S. Appl. No. 13/581,447, filed Sep. 23, 2011, Hidetoshi Fujii, et al.
U.S. Appl. No. 13/533,813, filed Jun. 26, 2012, Hiroshi Goto, et al.
Combined Chinese Office Action and Search Report issued May 28, 2014, in Chinese Patent Application No. 201310005689.2 with English translation of category of cited documents.
Extended European Search Report issued Apr. 2, 2014 in Patent Application No. 12193073.9.

* cited by examiner

IMAGE FORMING METHOD

CROSS-REFERENCE TO RELATED APPLICATIONS

This patent application is based on and claims priority pursuant to 35 U.S.C. §119 to Japanese Patent Application No. 2012-002423 filed on Jan. 10, 2012 in the Japan Patent Office, the entire disclosure of which is hereby incorporated by reference herein.

FIELD OF THE INVENTION

The present invention relates to an image forming method using an inkjet ink.

BACKGROUND OF THE INVENTION

Since inkjet recording methods have advantages over other image forming methods such that color images can be easily formed; and running costs are low, inkjet recording methods have been broadly used recently. However, inkjet recording methods have a drawback such that defective images (such as blurred images including blurred character images) are easily formed depending on combinations of the ink and the recording medium used.

For example, when coated papers which are used for commercial printing and publication printing and in which a filler such as calcium carbonate and kaolin is used for the coat layer, are used as recording media, problems such that images are seriously blurred, and image density is seriously low are caused. The reasons for the problems are considered as follows. Specifically, since such coated papers cannot absorb a large amount of ink in a short time unlike inkjet recording papers, part of the ink, which is not well absorbed, is spread in the horizontal direction, thereby forming a blurred image. In addition, even when the ink penetrates into the coat layer of coated papers, the filler (such as kaolin) in the coat layer opacifies the penetrated ink, thereby forming a low density image. Therefore, such coated papers as used for commercial printing and publication printing have been considered to be entirely unsuitable for inkjet printing.

As for inkjet inks, aqueous pigment inks in which fine pigment particles are dispersed in water attract attention. Since pigments used for inkjet inks are similar in composition to colorants of inks used for commercial printing, it is expected that images having feeling similar to that of images formed by commercial printing can be formed by inkjet inks. However, even when images are formed on coated papers used for commercial printing and publication printing by inkjet printing methods using pigment inkjet inks, the blurred image problem and/or other problems such that the pigments are not fixed to the coated papers, and glossy images cannot be formed tend to be caused.

In attempting to solve the problems, an inkjet recording method (a first method) using a combination of a pigment ink having high penetrating property and a recording medium having low ink absorbability is proposed. In addition, another method (second method) in which a heat roller is used as a drying assisting device to rapidly dry ink images is proposed to improve the drying property and fixing property of the ink images. Further, another method (third method) in which a protective layer is formed on inkjet images using a UV varnish to protect the ink images, i.e., to prevent occurrence of a problem in that the pigment included in the ink images and remaining on the surface of a recording paper is scraped off when the images are rubbed, is proposed.

In commercial printing and publication printing, hundreds or thousands sheets of prints are generally produced in one printing operation. Therefore, printing machines are required to stably produce prints without forming defective images. When inkjet printers are used for such commercial printing and publication printing, there is a risk for a problem in that inkjet nozzles are clogged with dried inks (i.e., nozzle clogging problem), or inks are ejected in wrong directions due to fixation of dried inks around the exits of inkjet nozzles, thereby forming images having white lines or undesired line images. The best method for preventing occurrence of the problem is to add a water-soluble organic solvent having a high boiling point to an inkjet ink to impart a relatively low drying property to the ink.

However, when the above-mentioned first method is used while using a combination of an inkjet ink including a water-soluble organic solvent having a high boiling point (to prevent occurrence of the nozzle clogging problem), and a recording medium such as coated papers for use in commercial printing, which has an extremely low ink absorbing property, another problem in that it takes time before the ink is fixed to the recording medium to an extent such that the ink image is not blurred even when rubbed is caused. Therefore, when the first method is used for commercial printing, it takes time before images are fixed to recording media, thereby causing a problem in that the resultant prints cannot be handed out as leaflets or catalogs soon after the prints are formed.

In the above-mentioned second method, an oil-based ink including an aliphatic hydrocarbon as a main component is used. Therefore, when the ink is heated, an organic compound is evaporated and discharged from the printer, thereby causing environmental pollution.

In the above-mentioned third method, the printer has to have a heater for forming images. In addition, in the after-treatment section of the printer, a UV varnish is ejected toward the entire surface of a recording medium, and the UV varnish adhered to the recording medium is crosslinked by a device such as UV lamps. Therefore, the printer has a complex structure and is not environmental friendly.

For these reasons, the inventors recognized that there is a need for an image forming method by which high quality full color images having good drying property and rub resistance can be formed on papers for use in commercial printing at a high speed.

BRIEF SUMMARY OF THE INVENTION

As an aspect of the present invention, an image forming method is provided which includes adhering a pretreatment liquid to a surface of a recording medium bearing a coat layer thereon; adhering an ink including a colorant, an organic solvent, a surfactant and water to the surface of the recording medium, to which the pretreatment liquid has been adhered, to form an image of the ink thereon; and adhering an after-treatment liquid to the surface of the recording medium, on which the image has been formed, to form a protective layer on at least the surface of the recording medium.

The organic solvent of the ink includes:
a polyalcohol having an equilibrium moisture content of not less than 30% by weight at 23° C. and 80% RH;
an amide compound having the below-mentioned formula (I):

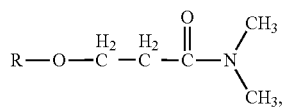

(i.e., β-alkoxy-N,N-dimethylpropionamide compound)
wherein R represents an alkyl group having 4 to 6 carbon atoms; and
a compound having a formula selected from the group consisting of the below-mentioned formulae (II) to (IV):

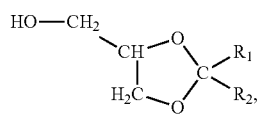

(i.e., 1,3-dioxane-4-methanol compound)
wherein $R_1$ represents a hydrogen atom, or an alkyl group having 1 or 2 carbon atoms, and $R_2$ represents an alkyl group having 1 to 4 carbon atoms;

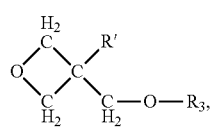

(i.e., oxetane compound)
wherein R' represents an alkyl group having 1 or 2 carbon atoms, and $R_3$ represents a hydrogen atom, an alkyl group having 1 to 8 carbon atoms, a cyclic alkyl group, or an aromatic group; and

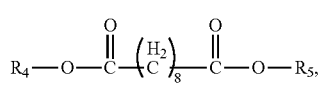

(i.e., sebacic acid dialkyl ester compound)
wherein each of $R_4$ and $R_5$ independently represents an alkyl group having 1 to 8 carbon atoms.

The aforementioned and other aspects, features and advantages will become apparent upon consideration of the following description of the preferred embodiments taken in conjunction with the accompanying drawings.

DETAILED DESCRIPTION OF THE INVENTION

Figure 1:
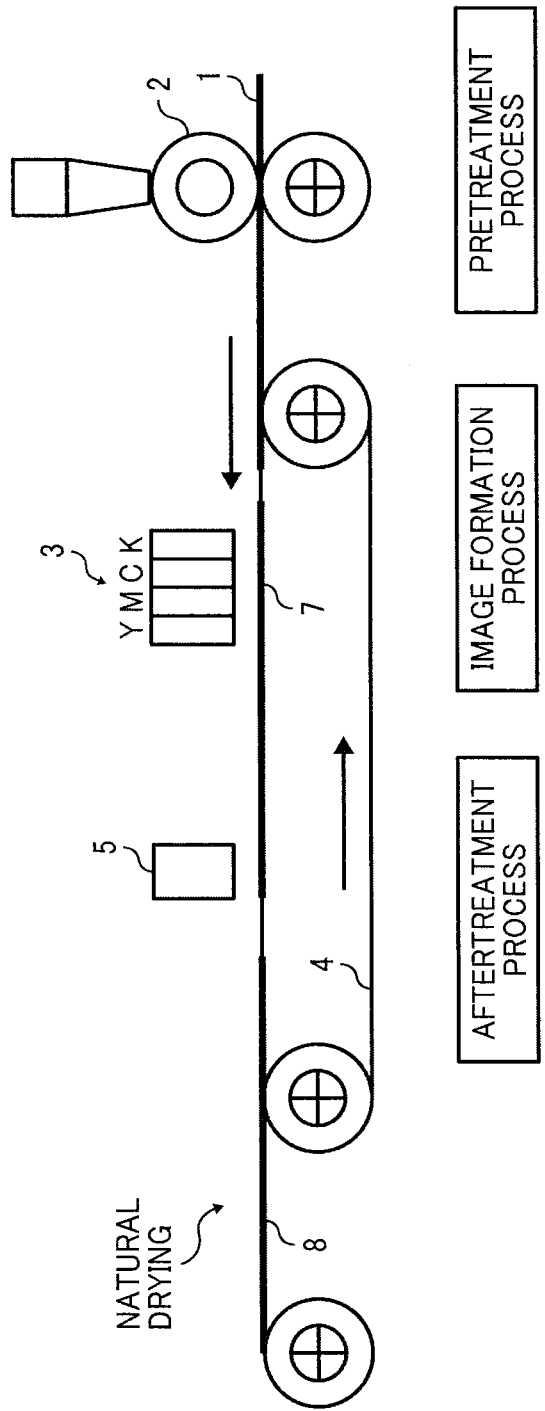
FIG. 1 is a schematic view illustrating an inkjet printer for use in the image forming method of the present invention, which performs natural drying.

The image forming method of the present invention is provided to form high quality full color images having good drying property and rub resistance on papers for use in commercial printing at a high speed. In addition, the image forming method prevents occurrence of the following problems.

(1) A beading problem in that a grainy solid image is formed due to attraction of adjacent two or more dot images, and a color bleed problem in that different color dot images which are adjacent to each other are mixed at the boundary portion thereof, resulting in deterioration of the image quality. These problems are easily caused when images are formed on coated papers having poor ink absorbing property such as printing papers having a coat layer.

(2) A fixing problem in that when a conventional pretreatment agent including a polyvalent metal salt is applied to a recording medium, ink images are not satisfactorily fixed to the recording medium.

(3) A glossiness deterioration problem in that when such a conventional pretreatment agent as mentioned above in paragraph (2) is used, occurrence of the beading problem and the color bleed problem can be prevented, but the glossiness of the image deteriorates.

(4) A cockling (waving) problem in that a recording medium on which a solid image is formed using an aqueous ink is waved.

The present invention will be described by reference to examples.

Initially, the inkjet ink (hereinafter sometimes referred to as ink) for use in the image forming method of the present invention will be described.

The ink for use in the image forming method of the present invention includes at least a colorant, an organic solvent, a surfactant, and water, and optionally includes other components such as penetrants, and aqueous resin dispersions.

The organic solvent includes a polyalcohol having an equilibrium moisture content of not less than 30% by weight at 23° C. and 80% RH, an amide compound having the below-mentioned formula (I), and at least one compound having one of the below-mentioned formulae (II) to (IV).

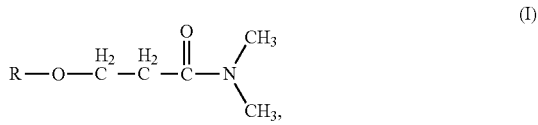

(i.e., β-alkoxy-N,N-dimethylpropionamide compound)
wherein R represents an alkyl group having 4 to 6 carbon atoms.

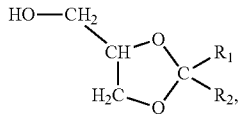
(II)

(i.e., 1,3-dioxane-4-methanol compound)
wherein $R_1$ represents a hydrogen atom, or an alkyl group having 1 or 2 carbon atoms, and $R_2$ represents an alkyl group having 1 to 4 carbon atoms.

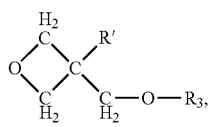
(III)

(i.e., oxetane compound)
wherein R' represents an alkyl group having 1 or 2 carbon atoms, and $R_3$ represents a hydrogen atom, an alkyl group having 1 to 8 carbon atoms, a cyclic alkyl group, or an aromatic group.

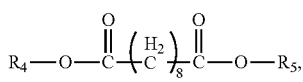
(IV)

(i.e., sebacic acid dialkylester compound)
wherein each of $R_4$ and $R_5$ independently represents an alkyl group having 1 to 8 carbon atoms.

The content of the organic solvent in the ink is preferably from 20% to 80% by weight, and more preferably from 30% to 70% by weight, based on the total weight of the ink. When the content is lower than 20% by weight, the curl preventing effect to prevent a print from curling tends not to be produced. In addition, the ejection stability of the ink tends to deteriorate, and a problem in that the waste ink is fixedly adhered to a maintenance device, which performs a maintenance operation on a recording head to eject the ink may be caused. In contrast, when the content is higher than 80% by weight, the viscosity of the ink seriously increases to an extent such that the ink is hardly ejected by a recording head. In addition, the ink tends to have poor drying property on recording papers, and qualities of character images tend to deteriorate.

Specific examples of the amine compound having formula (I) include the following.

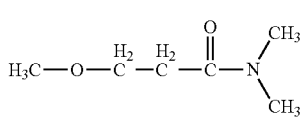
(I-1)

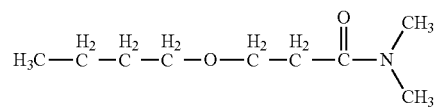
(I-2)

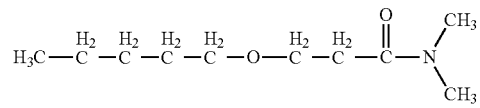
(I-3)

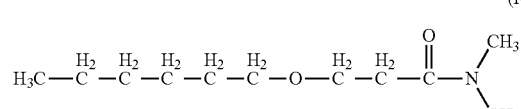
(I-4)

Specific examples of the compound having formula (II) include the following.

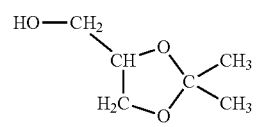
(II-1)

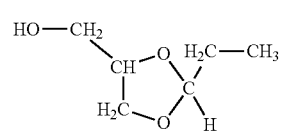
(II-2)

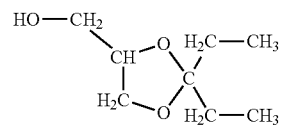
(II-3)

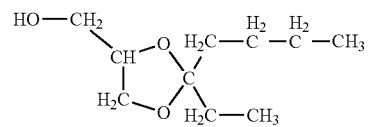
(II-4)

Specific examples of the compound having formula (III) include the following.

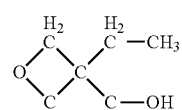
(III-1)

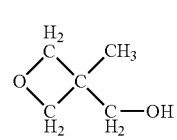
(III-2)

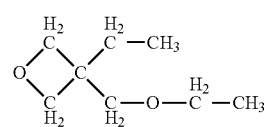
(III-3)

-continued

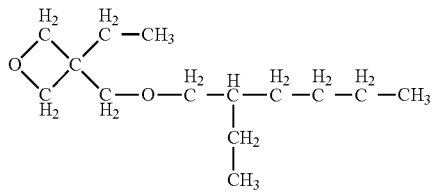
(III-4)

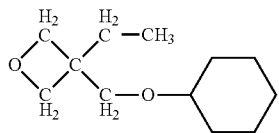
(III-5)

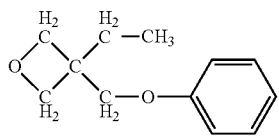
(III-6)

Specific examples of the compound having formula (IV) include the following.

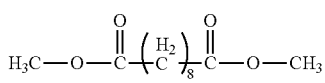
(IV-1)

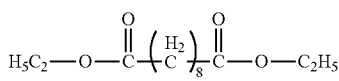
(IV-2)

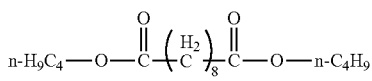
(IV-3)

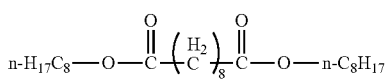
(IV-4)

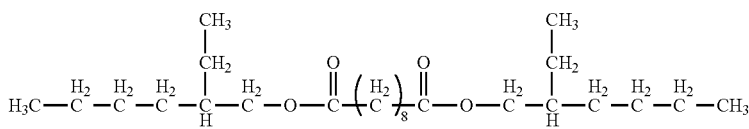
(IV-5)

When an amide compound having formula (I), and at least one of compounds having formula (II) to (IV) are used while mixed, the resultant ink has a good combination of ejection stability and drying property. The reason is considered to be that these compounds include a hydrophobic group in a relatively large amount in the hydrophilic group-hydrophobic group balance, and therefore the ink can easily penetrate into recording media.

The total content of the amide compound having formula (I) and the compounds having formulae (II) to (IV) in the ink is preferably from 1% to 50% by weight, more preferably from 2% to 40% by weight, and even more preferably from 3% to 30% by weight, based on the total weight of the ink. When the total content is lower than 1%, the curl preventing effect cannot be satisfactorily produced, and the image quality improving effect cannot be produced. In addition, the drying property of the ink adhered to general-purpose printing papers is hardly improved. In contrast, when the total content is higher than 50% by weight, the viscosity of the ink seriously increases, thereby deteriorating the ejection stability of the ink.

An alkylalkanediol can be used as an organic solvent to accelerate the curl preventing effect. Among alkylalkanediols, alkylalkanediols including an alkanediol having 3 to 6 carbon atoms as a main chain while including an alkyl group having 1 to 2 carbon atoms as a branched chain are preferable because the compounds have good hydrophilic group-hydrophobic group balance, and have proper water solubility while including a hydrophobic group in a relatively large amount, thereby imparting good penetrating property to the resultant ink.

Among these alkylalkanediols, 2-methyl-1,3-butanediol (boiling point of 214° C.), 3-methyl-1,3-butanediol (boiling point of 203° C.), 3-methyl-1,5-pentanediol (boiling point of 250° C.), and 2-ethyl-1,3-hexanediol (boiling point of 243.2° C.) are preferable.

The content of such an alkylalkanediol in the ink is preferably from 2% to 40% by weight, and more preferably from 5% to 30% by weight, based on the total weight of the ink. When the content is lower than 2% by weight, the penetrating property improving effect and the image quality improving effect can be hardly produced, and the drying property of the ink adhered to general-purpose printing papers can be hardly improved. In contrast, when the content is higher than 40% by weight, the viscosity of the ink increases, thereby often deteriorating the ejection stability of the ink.

A polyalcohol having an equilibrium moisture content of not less than 30% by weight at 23° C. and 80% RH is included in the ink as a wetting agent. By including such a polyalcohol in the ink, the ejection stability of the ink can be improved, and the effect to prevent occurrence of the waste ink fixation problem in a recording head maintenance device can be produced.

Specific examples of such a polyalcohol include 1,2,3-butanetriol (having boiling point of 175° C. at 33 hPa, and equilibrium moisture content of 38% by weight), 1,2,4-butanetriol (having boiling point of 190-191° C. at 24 hPa, and equilibrium moisture content of 41% by weight), glycerin (having boiling point of 290° C., and equilibrium moisture content of 49% by weight), diglycerin (having boiling point of 270° C. at 20 hPa, and equilibrium moisture content of 38% by weight), triethylene glycol (having boiling point of 285° C., and equilibrium moisture content of 39% by weight), tetraethylene glycol (having boiling point of 324-330° C., and equilibrium moisture content of 37% by weight), diethylene glycol (having boiling point of 245° C., and equilibrium moisture content of 43% by weight), and 1,3-butanediol (having boiling point of 203-204° C., and equilibrium moisture content of 35% by weight). Among these polyalcohols, glycerin and 1,3-butanediol are preferable.

The content of such a polyalcohol in the ink is preferably from 2% to 50% by weight, and more preferably from 5% to 40% by weight, based on the total weight of the ink. When the content is lower than 2% by weight, the moisturizing effect can be hardly produced. In contrast, when the content is higher than 50% by weight, the drying property of the ink on recording papers cannot be improved, and therefore the image qualities of character images formed on plain papers often deteriorate.

The method of measuring the equilibrium moisture content of an organic solvent is as follows.

A sample (organic solvent) of about 1 g is fed into a petri dish while precisely weighed (W1), and the petri dish is allowed to settle for 240 hours in a desiccator, in which an aqueous solution of potassium chloride and sodium chloride is contained to control the atmospheric condition in the desiccator to 23±1° C. and 80±3% RH. Thereafter the sample is weighed again (W2). The equilibrium moisture content (EMC) is determined by the following equation.

$$EMC\ (\%\ by\ weight) = \{(W2-W1)/W2\} \times 100$$

wherein W1 represents the weight of the sample before the test, and W2 represents the weight of the sample after the test (i.e., the weight of the sample absorbing water). In this regard, (W2−W1) represents the weight of water that the sample absorbs.

The amide compound having the below-mentioned formula (I-1) has a relatively high boiling point of 216° C. and a relatively high equilibrium moisture content of 39.2% by weight while having a very low viscosity of 1.48 mPa·s at 25° C. In addition, the amide compound has good solubility in other amide compounds having formula (I), compounds having formula (II) to (IV), alkylalkanediols, and water. Therefore, it is preferable to include this compound as an organic solvent in the ink, because the resultant ink has a low viscosity and a good combination of preservation stability and ejection stability without causing the waste ink fixation problem in a recording head maintenance device.

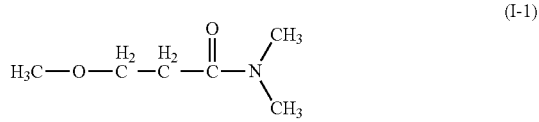
(I-1)

The content of the amide compound having formula (I-1) is preferably from 1% to 50% by weight, and more preferably from 2% to 40% by weight. When the content is lower than 1% by weight, the viscosity decreasing effect can hardly produced. In contrast, when the content is higher than 50% by weight, the ink tends to have poor drying property on recording papers, and qualities of character images tend to deteriorate.

The ink for use in the inkjet recording method of the present invention can include an organic solvent other than the above-mentioned organic solvents, and a wetting agent.

For example, polyalcohols, polyalcohol alkyl ethers, polyalcohol aryl ethers, nitrogen-containing heterocyclic compounds, amides, amines, sulfur-containing compounds, propylene carbonate, ethylene carbonate, and other wetting agents can be included in the ink.

Specific examples of such polyalcohols include dipropylene glycol (boiling point of 232° C.), 1,5-pentanediole (boiling point of 242° C.), propylene glycol (boiling point of 187° C.), 2-methyl-2,4-pentanediol (boiling point of 197° C.), ethylene glycol (boiling point of 196-198° C.), tripropylene glycol (boiling point of 267° C.), hexylene glycol (boiling point of 197° C.), polyethylene glycol (viscous liquid or solid), polypropylene glycol (boiling point of 187° C.), 1,6-hexanediol (boiling point of 253-260° C.), 1,2,6-hexanetriol (boiling point of 178° C.), trimethylolethane (solid having melting point of 199-201° C.), and trimethylolpropane (solid having melting point of 61° C.).

Specific examples of such polyalcohol alkyl ethers include ethylene glycol monoethyl ether (boiling point of 135° C.), ethylene glycol monobutyl ether (boiling point of 171° C.), diethylene glycol monomethyl ether (boiling point of 194° C.), diethylene glycol monoethyl ether (boiling point of 197° C.), diethylene glycol monobutyl ether (boiling point of 231° C.), ethylene glycol mono-2-ethylhexyl ether (boiling point of 229° C.), and propylene glycol monoethyl ether (boiling point of 132° C.).

Specific examples of such polyalcohol aryl ethers include ethylene glycol monophenyl ether (boiling point of 237° C.), and ethylene glycol monobenzyl ether.

Specific examples of such nitrogen-containing heterocyclic compounds include 2-pyrrolidone (having boiling point of 250° C., melting point of 25.5° C., and equilibrium moisture content of 47-48% by weight), N-methyl-2-pyrrolidone (boiling point of 202° C.), 1,3-dimethyl-2-imidazolidinone (boiling point of 226° C.), ε-caprolactam (boiling point of 270° C.), and γ-butyrolactone (boiling point of 204-205° C.).

Specific examples of such amides include formamide (boiling point of 210° C.), N-methylformamide (boiling point of 199-201° C.), N,N-dimethylformamide (boiling point of 153° C.), and N,N-diethylformamide (boiling point of 176-177° C.).

Specific examples of such amines include monoethanolamine (boiling point of 170° C.), diethanolamine (boiling point of 268° C.), triethanolamine (boiling point of 360° C.), N,N-dimethylmonoethanolamine (boiling point of 139° C.), N-methyldiethanolamine (boiling point of 243° C.), N-methylethanolamine (boiling point of 159° C.), N-phethylethanolamine (boiling point of 282-287° C.), and 3-aminopropyldiethylamine (boiling point of 169° C.).

Specific examples of such sulfur-containing compounds include dimethylsulfoxide (boiling point of 139° C.), sulfolane (boiling point of 285° C.), and thiodiglycol (boiling point of 282° C.).

Solid wetting agents such as saccharide can be used. Examples of saccharide include monosaccharide, disaccharide, oligosaccharide (including tri- and tetra-saccharide), and polysaccharide.

Specific examples thereof include glucose, mannose, fructose, ribose, xylose, arabinose, galactose, maltose, cellobiose, lactose, sucrose, trehalose, and maltotriose.

In this application, polysaccharide means saccharide in a broad sense, and includes materials present in nature such as α-cyclodextrin, and cellulose.

Not only the saccharide mentioned above but also derivatives thereof can be used. Specific examples of such derivatives include reduction materials of the saccharide mentioned above (e.g., sugar alcohols (having formula HOCH$_2$(CHOH)$_n$CH$_2$OH, wherein n is an integer of from 2 to 5)), oxidation materials of the saccharide mentioned above (e.g., aldonic acid, and uronic acid), amino acids, and thio acids.

Among these materials, sugar alcohols are preferable. Specific examples of such sugar alcohols include maltitol, and sorbit.

The weight ratio of the colorant to the organic solvent in the ink significantly influences the ejection stability of the ink ejected from a recording head. In addition, whether or not the problem in that the waste ink thereof is fixed to a recording head maintenance device occurs largely depends on the weight ratio.

For example, when the content of the colorant in the ink is high and the content of the organic solvent is low, water in the vicinity of the surface of the ink in a nozzle, which forms meniscus, tends to easily evaporate, thereby causing a defective ejection problem.

Next, the colorant included in the ink will be described.

The colorant in the ink preferably achieves one of the following states (1) to (3).

(1) The colorant includes a self-dispersing pigment which has at least one hydrophilic group on the surface thereof and which can be dispersed in water without a dispersant (i.e., self-dispersing pigment). Hereinafter, such a colorant is referred to as a colorant in the first state.

(2) The colorant is a pigment dispersion including a pigment, a pigment dispersant, and a polymeric dispersion stabilizer, wherein the polymeric dispersion stabilizer is one member selected from the group consisting of α-olefin-maleic anhydride copolymers having the below-mentioned formula (a), styrene-(meth)acrylic acid copolymers, water-soluble polyurethane resins, and water-soluble polyester resins.

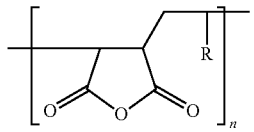

(a)

wherein R represents an alkyl group having 6 to 30, preferably 12 to 24, and more preferably from 18 to 22 carbon atoms, and n is an integer of from 20 to 100. The weight average molecular weight of the copolymers is from 5,000 to 20,000. In formula (a), the alkyl groups R in the repeat units may be the same as or different from each other. Hereinafter, such a colorant is referred to as a colorant in the second state.

(3) The colorant is a polymer emulsion in which fine polymer particles including a colorant, which is insoluble or hardly soluble in water, are dispersed in water. Hereinafter, such a colorant is referred to as a colorant in the third state.

Organic pigments and inorganic pigments can be used for the pigment of the colorant. In this regard, dyes can be used to adjust the color tone, but it is preferable to add a dye in such an amount as not to deteriorate the weather resistance of the ink.

Specific examples of the inorganic pigments include titanium oxide, iron oxide, calcium carbonate, barium sulfate, aluminum hydroxide, barium yellow, cadmium red, chrome yellow, and carbon black. Among these pigments, carbon black is preferable. Carbon blacks prepared by any known methods such as contact methods, furnace methods, and thermal methods can be used.

Specific examples of the organic pigments include azo pigments, polycyclic pigments, chelated dyes, nitro pigments, nitroso pigments, and aniline black. Among these pigments, azo pigments, and polycyclic pigments are preferable. Specific examples of the azo pigments include azo lakes, insoluble azo pigments, condensed azo pigments, and chelated azo pigments. Specific examples of the polycyclic pigments include phthalocyanine pigments, perylene pigments, perynone pigments, anthraquinone pigments, quinacridone pigments, dioxazine pigments, indigo pigments, thioindigo pigments, isoindolinone pigments, and quinophthalone pigments. Specific examples of the chelated dyes include basic dye-type chelates, and acidic dye-type chelates.

The color of the colorant is not particularly limited, and one or more colorants for use in forming black color and chromatic colors are used so that the resultant ink has the target color.

Specific examples of black color pigments include carbon blacks (i.e., C.I. Pigment Black 7) such as furnace black, lamp black, acetylene black, and channel black; powders of metals (i.e., C.I. Pigment Black 11) such as copper and iron; metal oxides such as titanium oxide; and organic pigments such as Aniline Black (i.e., C.I. Pigment Black 1).

Specific examples of chromatic color pigments include C.I. Pigment Yellows 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 138, 150, 151, 153 and 183; C.I. Pigment Oranges 5, 13, 16, 17, 36, 43 and 51; C.I. Pigment Reds 1, 2, 3, 5, 17, 22, 23, 31, 38, 48:2, 48:2 (permanent red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209 and 219; C.I. Pigment Violets 1 (Rhodamine Lake), 3, 5:1, 16, 19, 23 and 38; C.I. Pigment Blues 1, 2, 15 (Phthalocyanine Blue), 15:1, 15:2, 15:3 (Phthalocyanine Blue), 16, 17:1, 56, 60 and 63; and C.I. Pigment Greens 1, 4, 7, 8, 10, 17, 18 and 36.

The self-dispersing pigment mentioned above in paragraph (1) means a pigment subjected to surface modification such that at least one hydrophilic group is connected with the surface of the pigment with or without an intervening group therebetween. The surface modification is performed by chemically bonding a specific functional group (such as sulfone and carboxyl groups) to the surface of a pigment, or by performing a wet oxidation treatment using a hypohalous acid or a salt thereof. Among these pigments, pigments in which a carboxyl group is bonded to the surface of the pigments and which are dispersed in water are preferable. By using such a surface-modified pigment having a carboxyl group, the pigment can be stably dispersed in the ink, and therefore high quality images can be produced. In addition, water resistance of the images printed on recording media can be further enhanced.

Further, an ink including such a self-dispersing pigment as mentioned above (i.e., the colorant in the first state) has good re-dispersibility such that even when the ink in a nozzle is not used for a log period of time and water in the ink in the vicinity of the surface of the nozzle evaporates, occurrence of the nozzle clogging problem in that the inkjet nozzle is clogged with the dried ink can be prevented and good images can be formed by performing a simple recording head cleaning operation.

The volume average particle diameter (D50) of such a self-dispersing pigment in an ink is preferably from 0.01 μm to 0.16 μm.

Among self-dispersing carbon blacks, ionic carbon blacks such as anionically or cationically charged carbon blacks are preferable.

Specific examples of anionic hydrophilic groups for anionically charging carbon blacks include —COOM, —SO$_3$M, —PO$_3$HM, —PO$_3$M, —SO$_2$NH$_2$, and —SO$_2$NHCOR, wherein M represents a hydrogen atom, an alkali metal ion, an ammonium ion, or an organic ammonium ion, and R represents an alkyl group having 1 to 12 carbon atoms, a substituted or unsubstituted phenyl group, or a substituted or unsubstituted naphthyl group. Among these groups, —COOM, and —SO$_3$M are preferable. Namely, color pigments in which —COOM, and/or —SO$_3$M are bonded to the surface thereof are preferable.

Specific examples of alkali metals for use as the alkali metal M in the hydrophilic groups mentioned above include lithium, sodium and potassium. Specific examples of the organic ammonium ions include mono- to tri-methylammonium ions, mono- to tri-ethylammonium ions, and mono- to tri-methanolammonium ions.

Specific examples of the method for preparing an anionically charged pigment include a method in which a color pigment is subjected to an oxidation treatment using sodium hydrochlorite to form a group —COONa on the surface of the pigment; a method using sulfonation; and a method using a reaction of a pigment with a diazonium salt.

Among cationic hydrophilic groups, quaternary ammonium groups are preferable, and quaternary ammonium groups having the following formulae are more preferable. Carbon blacks in which any one of such quaternary ammonium groups is bonded to the surface thereof are preferably used for the ink for use in the present invention.

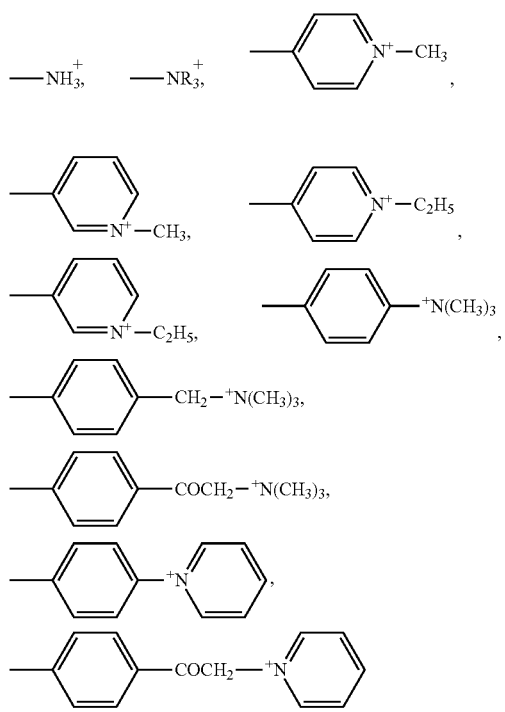

The method for preparing a cationically charged carbon black is not particularly limited. For example, a method in which a carbon black is treated with 3-amino-N-ethylpyridinium bromide to form the below-mentioned N-ethylpyridyl group on the surface of the carbon black can be used.

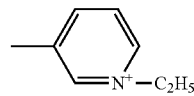

The above-mentioned hydrophilic groups may be bonded to the surface of carbon black with a group therebetween. Specific examples of such an intervening group include alkyl groups having 1 to 12 carbon atoms, substituted or unsubstituted phenyl groups, and substituted or unsubstituted naphthyl groups.

Specific examples of hydrophilic groups having such an intervening group include —C$_2$H$_4$COOM (M represents an alkali metal ion, or a quaternary ammonium ion), -PhSO$_3$M (Ph represents a phenyl group, and M represents an alkali metal ion, or a quaternary ammonium ion), and —O$_5$H$_{10}$NH$_3^+$.

The above-mentioned colorant in the second state is a pigment dispersion including a pigment (such as inorganic pigments, organic pigments, and complex pigments), a pigment dispersant, and a polymeric dispersion stabilizer. The polymeric dispersion stabilizer include at least one member selected from α-olefin-maleic anhydride copolymers having the above-mentioned formula (a), styrene-(meth)acrylic acid copolymers, water-soluble polyurethane resins, and water-soluble polyester resins.

As for copolymers having formula (a), copolymers synthesized by using a mixture of plural olefins having different number of carbon atoms can also be used. In such a case, the resultant copolymer includes alkyl groups, which have different number of carbon atoms and which are randomly incorporated into the main chain.

The weight average molecular weight of copolymers having formula (a) is measured using a gel permeation chromatography (GPC) system. The procedure is as follows.
(1) A sample (copolymer) is dissolved in tetrahydrofuran (THF).
(2) A working curve is prepared by subjecting three kinds of polystyrenes (i.e., standard materials) having known molecular weights of 1,000, 2,400 and 8,500 to the GPC analysis using a column KF-806L (for THF) as the GPC column.
(3) The THF solution of the sample is subjected to the GPC analysis to obtain a size exclusion chromatogram (SEC).
(4) The weight average molecular weight of the copolymer is determined using the SEC, the differential molecular weight distribution curve, and the working curve prepared by using the standard materials.

The polymeric dispersion stabilizer mentioned above is used for stabilizing fine particles of a pigment, which are uniformly dispersed in water by a dispersant. Copolymers having formula (a), styrene-(meth)acrylic acid copolymers, water-soluble polyurethane resins, and water-soluble polyester resins are solid at room temperature, and are hardly soluble in cold water. However, such a polymeric material (copolymer or resin) can be soluble in a liquid or water including an alkali in such an equivalent amount as to be 1.0 to 1.5 times the acid value of the stabilizer, and the alkaline solution can be used as the polymeric dispersion stabilizer. When such a polymeric material is dissolved in alkaline liquid or water, the material can be easily dissolved by heating and agitating the mixture. A copolymer having formula (a) and a long olefin chain cannot be easily dissolved in an alkaline liquid or water, and there is a case where part of the copolymer remains in the solution without being dissolved. In such a case, the solution is subjected to filtering, and the filtrate can be used as the polymeric dispersion stabilizer.

Specific examples of the alkali materials used for use in preparing the alkaline liquid or water include hydroxides of alkaline metals such as sodium hydroxide, potassium hydroxide, and lithium hydroxide; basic materials such as ammonia, triethylamine, and morpholine; and alcohol amines such as triethanol amine, diethanol amine, N-methyldiethanol amine, 2-amino-2-ethyl-1,3-propanediol, and choline.

As for the polymeric dispersion stabilizers, properly synthesized copolymers and marketed products can be used.

Specific examples of the marketed products of the copolymers having formula (a) include T-YP112, T-YP115, T-YP114 and T-YP116 from Seiko PMC Corp.

Specific examples of the marketed products of the styrene-(meth)acrylic acid copolymers include JC-05 from Seiko PMC Corp.; ARUFONs UC-3900, UC-3910 and UC-3920 from TOAGOSEI Co., Ltd.

Specific examples of the marketed products of the water-soluble polyurethane resins include TAKELACs W-5025, W-6010 and W-5661 from Mitsui Chemicals, Inc.

Specific examples of the marketed products of the water-soluble polyester resins include NICHIGO POLYESTERS W-0030, W-0005S30WO and WR-961 from Nippon Synthetic Chemical Industry Co., Ltd.; and PESRESINs A-210 and A-520 from Takamatsu Oil & Fat Co., Ltd.

The polymeric dispersion stabilizer included in the ink preferably has an acid value of from 40 to 400 mgKOH/g, and more preferably from 60 to 350 mgKOH/g. When the acid value is less than 40 mgKOH/g, the solubility thereof in an alkaline liquid tends to deteriorate. In contrast, when the acid value is greater than 400 mgKOH/g, the viscosity of the ink tends to increase, thereby deteriorating the ejection property of the ink and the dispersion stability of the pigment included in the ink.

The polymeric dispersion stabilizer included in the ink preferably has a weight average molecular weight of not greater than 20,000, and more preferably from 5,000 to 20,000. When the average molecular weight is less than 5,000, the dispersion stability of the pigment dispersion and the ink tend to deteriorate. In contrast, when the average molecular weight is greater than 20,000, the solubility thereof in an alkaline liquid or water tends to deteriorate, thereby increasing the viscosity of the ink.

The polymeric dispersion stabilizer is included in the ink in an amount of from 1 to 100 parts by weight (on a solid basis), and preferably 5 to 50 parts by weight, based on 100 parts by weight (on a solid basis) of the pigment included in the ink. When the content is less than 1 part by weight, the dispersion stabilizing effect is hardly produced. In contrast, when the content is greater than 100 parts, the viscosity of the ink tends to increase, thereby often deteriorating the ejection property of the ink, and the costs of the ink often increase.

The above-mentioned colorant in the second state preferably includes a pigment dispersant. Suitable materials for use as the pigment dispersant include anionic surfactants, and nonionic surfactants having a HLB value of from 10 to 20.

Specific examples of such anionic surfactants include polyoxyethylene alkyl ether acetates, alkylbenzene sulfonates (e.g., $NH_4$, Na, and Ca salts), alkyldiphenyl ether disulfonates (e.g., $NH_4$, Na, and Ca salts), sodium dialkylsuccinate sulfonate, sodium salts of formalin condensate of naphthalene sulfonic acid, salts (e.g., $NH_4$, and Na salts) of sulfuric acid esters of polyoxyethylene polycyclic-phenyl ethers, laurates, polyoxyethylene alkyl ether sulfates, and oleates. Among these surfactants, sodium dioctylsulfosuccinate, and ammonium salts ($NH_4$) of polyoxyethylene styrenated-phenyl ether sulfonic acid are preferable.

Specific examples of the above-mentioned nonionic surfactants having a HLB value of from 10 to 20 include polyoxyethylene alkyl ethers, polyoxyalkylene alkyl ethers, polyoxyethylene polycyclic-phenyl ethers, sorbitan fatty acid esters, polyoxyethylene sorbitan fatty acid esters, polyoxyethylene alkylphenyl ethers, polyoxyethylene alkylamines, polyoxyethylene alkylamides, and acetylene glycol. Among these surfactants, polyoxyethylen lauryl ether, polyoxyethylene-β-naphthyl ether, polyoxyethylene sorbitan monooleate, and polyoxyethylene styrenated-phenyl ether are preferable.

Such a pigment dispersant is included in the ink in an amount of from 1 to 100 parts by weight, and preferably 10 to 50 parts by weight, based on 100 parts by weight of the pigment included in the ink. When the content of the pigment dispersant is too low, pigments cannot be finely dispersed. In contrast, when the content is too high, excess of the dispersant, which is not adsorbed on pigment particles, adversely affects the properties of the ink, thereby causing problems such that blurred images are formed, and the water resistance and rub resistance of images recorded by the ink deteriorate.

Pigment particles dispersed in the ink preferably have a volume average particle diameter (D50) of not greater than 150 nm, and more preferably not greater than 100 nm. When the volume average particle diameter is greater than 150 nm, the ejection stability of the ink drastically deteriorates, thereby causing the nozzle clogging problem and an ink curving problem in that the ink is ejected while curved. When the volume average particle diameter is not greater than 100 nm, the ink has good ejection stability, and chroma of recorded images improves.

Such a pigment dispersion in which a pigment is uniformly dispersed in water is prepared by a method including dissolving such a pigment dispersant as mentioned above in an aqueous medium; adding a pigment to the solution to wet the pigment; and dispersing the pigment using a high speed agitator such as homogenizers, a dispersing machine using balls such as bead mills and ball mills, a kneader using a shearing force such as roll mills, or a supersonic dispersing machine. In this regard, the resultant pigment dispersion tends to include coarse particles even after the kneading or dispersing treatment, and the ink often causes the nozzle clogging problem. Therefore it is preferable to remove coarse particles having a particle diameter of not less than 1 μm from the pigment dispersion using a filter or a centrifugal separator.

The above-mentioned colorant in the third state preferably includes a polymer emulsion containing polymer particles including a pigment. Such a polymer emulsion is a polymer emulsion in which polymer particles including a pigment therein are dispersed, or a polymer emulsion in which polymer particles, on which a pigment is adsorbed, are dispersed. In this regard, all the polymer particles do not necessarily include a pigment therein or a pigment adsorbed thereon, and particles of the pigment may be dispersed in the emulsion as long as the effects of the present invention can be produced by using the colorant. Suitable polymers for use in preparing the polymer emulsion (i.e., polymers constituting polymer particles) include vinyl polymers, polyesters, and polyurethanes. Among these polymers, vinyl polymers, and polyesters are preferable. Specific examples of the polymers include the polymers described in JP2000-53897A and JP2001-139849 incorporated herein by reference.

Complex pigments in which a popular organic or inorganic pigment is covered with an organic pigment or carbon black can be preferably used for the colorant in the third state. Such complex pigments can be prepared by a method in which an organic pigment is precipitated in the presence of an inorganic pigment, or a mechanochemical method in which a mixture of an inorganic pigment and an organic pigment is ground mechanically. If necessary, a layer of an organo siloxane compound, which is formed from a polysiloxane or alkyl silane, may be formed between the inorganic pigment and the organic pigment to improve adhesion therebetween.

Specific examples of organic black pigments for use in preparing the complex pigments include aniline black, and specific examples of organic color pigments for use in preparing complex pigments include anthraquinone pigments, phthalocyanine blue, phthalocyanine green, diazo pigments, monoazo pigments, pyranthrone pigments, perylene pigments, heterocyclic yellow pigments, quinacridone pigments, and (thio)indigoid pigments. Among these pigments, carbon black, phthalocyanine pigments, quinacridone pigments, monoazo yellow pigments, disazo yellow pigments, and heterocyclic yellow pigments are preferable because the resultant colorant has good coloring property.

Specific examples of the phthalocyanine blue pigments include copper phthalocyanine and derivatives thereof (C.I. Pigment Blues 15:3 and 15:4), and aluminum phthalocyanine.

Specific examples of the quinacridone pigments include C.I. Pigment Oranges 48 and 49; C.I. Pigment Reds 122, 192, 202, 206, 207 and 209; and C.I. Pigment Violets 19 and 42.

Specific examples of the monoazo yellow pigments include C.I. Pigment Yellows 74, 109, 128 and 151.

Specific examples of the disazo yellow pigments include C.I. Pigment Yellows 14, 16 and 17.

Specific examples of the heterocyclic yellow pigments include C.I. Pigment Yellows 117 and 138.

Other pigments described in The Color Index, third version published in 1982 by The Society of Dyers and Colourists can also be used.

Specific examples of inorganic pigment for use in preparing the complex pigments include titanium dioxide, silica, alumina, iron oxide, iron hydroxide, and tin oxide. The inorganic pigments preferably have a particle form having a small aspect ratio, and more preferably a spherical form. When the inorganic pigment is adsorbed on a color pigment, the color of the inorganic pigment is preferably transparent or white. When the inorganic pigment is adsorbed on a black pigment, a black inorganic pigment can be used. The primary particle diameter of such an inorganic pigment is preferably not greater than 100 nm, and more preferably from 5 nm to 50 nm.

The weight ratio (I/C) of an inorganic pigment (I) to a colorant (C) (organic pigment or carbon black) is preferably from 3/1 to 1/3, and more preferably from 3/2 to 1/2. When the weight ratio is too large (i.e., the weight of the colorant is low), the coloring property and tinting power of the resultant complex pigment tend to deteriorate. In contrast, when the weight ratio is too small, the transparency and color tone of the resultant complex pigment tend to deteriorate.

Among such complex pigments, silica/carbon black complex pigments, silica/phthalocyanine PB15:3 complex pigments, silica/disazo yellow complex pigments, and silica/quinacridone PR122 complex pigments from Toda Kogyo Corp. are preferable because of having a small primary particle diameter.

When an inorganic pigment having an average primary particle diameter of 20 nm is covered with the same amount of organic pigment, the resultant complex pigment has an average primary particle diameter of about 25 nm. If such a complex pigment can be dispersed using a proper dispersant so as to be primary particles, an ink in which pigment particles dispersed therein have a small average particle diameter of 25 nm can be prepared. In this regard, not only the organic pigment present on the complex pigment contributes to dispersion of the colorant in the ink, but also the inorganic pigment present inside the complex pigment influences dispersion of the colorant in the ink because the property of the inorganic pigment is exhibited through the organic pigment layer having a thickness of about 2.5 nm. Therefore, it is preferable to select a proper dispersant, which can stably disperse both the organic pigment and the inorganic pigment.

The content (on a dry basis) of the colorant in the ink is preferably from 2% to 15% by weight, and more preferably from 3% to 12% by weight. When the content is less than 2% by weight, the ink tends to have poor coloring property, and images recorded by the ink tend to have low image density. In contrast, when the content is greater than 15% by weight, the viscosity of the ink increases, thereby deteriorating the ejection property of the ink, and in addition the costs of the ink increase.

Next, the surfactant included in the ink will be described.

As for the surfactants, at least one of anionic surfactants, nonionic surfactants, silicone surfactants, and fluorine-containing surfactants, which does not lose the dispersing ability even when the kinds of the colorant and the wetting agent used change and which has low surface tension and good penetrating property and leveling property, is preferably used. Among these surfactants, silicone surfactants, and fluorine-containing surfactants are preferable.

These surfactants can be used alone or in combination.

Suitable materials for use as the fluorine-containing surfactants include surfactants having a group, which has 2 to 16 fluorine-substituted carbon atoms, and preferably from 4 to 16 fluorine-substituted carbon atoms. When the number of fluorine-substituted carbon atoms is less than 2, the effects of fluorine are hardly produced. In contrast, when the number of fluorine-substituted carbon atoms is greater than 16, an ink preservation problem in that the preservability of the ink deteriorates often occurs.

Suitable materials for use as the anionic fluorine-containing surfactants include perfluoroalkylsulfonic acid compounds (such as perfluoroalkyl sulfonic acid, and perfluoroalkyl sulfonates), and perfluoroalkylcarboxylic acid compounds (such as perfluoroalkylcarboxylic acid, and perfluoroalkylcarboxylates).

Suitable materials for use as the nonionic fluorine-containing surfactants include perfluoroalkylphosphate compounds, perfluoroalkylethylene oxides, and polyoxyalkylene ether polymer compounds having a perfluoroalkyl ether group in a side chain thereof.

Among these surfactants, polyoxyalkylene ether polymer compounds having a perfluoroalkyl ether group are preferable because of hardly foaming. Specific examples thereof include polyoxyalkylene ether polymers having a perfluoroalkyl ether group in a side chain thereof, salts of sulfates of polyoxyalkylene ether polymers having a perfluoroalkyl ether group in a side chain thereof, and salts of polyoxyalkylene ether polymers having a perfluoroalkyl ether group in a side chain thereof. Among these nonionic fluorine-containing surfactants, surfactants having the following formula (1) are preferable.

$$CF_3CF_2(CF_2CF_2)_m—CH_2CH_2O(CH_2CH_2O)_nH \quad (1)$$

wherein each of m and n is independently 0 or an integer of not less than 1. In this regard, m is preferably 0 or an integer of from 1 to 10, and n is preferably 0 or an integer of from 1 to 40, to impart good water-solubility to the surfactants.

Suitable materials for use as the perfluoroalkylphosphate compounds include perfluoroalkylphosphoric acid esters, and salts of perfluoroalkylphosphoric acid esters.

Specific examples of the counter ions of these anionic fluorine-containing surfactants include ions of Li, Na, K, NH$_4$, NH$_3$CH$_2$CH$_2$OH, NH$_2$(CH$_2$CH$_2$OH)$_2$, and NH(CH$_2$CH$_2$OH)$_3$.

Among the fluorine-containing surfactants, compounds having the following formulae
(2) to (10) are preferable.
(1) Anionic fluorine-containing surfactants

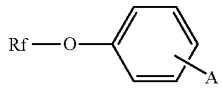  (2)

wherein Rf' represents a mixture of fluorine-containing hydrophobic groups having below-mentioned formulae (2-1) and (2-2), and A represents —SO$_3$X, —COOX, or —PO$_3$X wherein X represents a counter ion selected from H, Li, Na, K, NH$_4$, NH$_3$CH$_2$CH$_2$OH, NH$_2$(CH$_2$CH$_2$OH)$_2$, and NH(CH$_2$CH$_2$OH)$_3$.

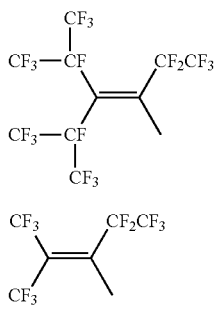

(2-1)

(2-2)

(Rf'—O$\frac{}{n}$PO—(O·X)$_m$   (3)

wherein Rf' represents a fluorine-containing group having the below-mentioned formula (3-1), X represents the counter ion defined above in formula (2), n is 1 or 2, and m is 2-n.

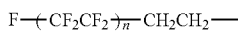  (3-1)

wherein n is an integer of from 3 to 10.

Rf—S—CH$_2$CH$_2$—COO.X   (4)

wherein Rf represents the fluorine-containing group having the above-mentioned formula (3-1), and X represents the counter ion defined above in formula (2).

   (5)

wherein Rf represents the fluorine-containing group having the above-mentioned formula (3-1), and X represents the counter ion defined above in formula (2).
(2) Nonionic fluorine-containing surfactants

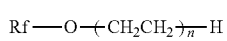  (6)

wherein Rf represents the fluorine-containing group having the above-mentioned formula (2-1) or (2-2), and n is an integer of from 5 to 20.

  (7)

wherein Rf' represents the fluorine-containing group having the above-mentioned formula (3-1), and n is an integer of from 1 to 40.
(3) Ampholytic fluorine-containing surfactants

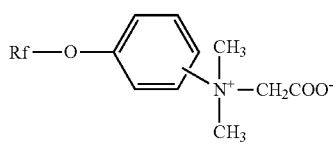  (8)

wherein Rf represents the fluorine-containing group having the above-mentioned formula (2-1) or (2-2).
(4) Fluorine-containing oligomer surfactants

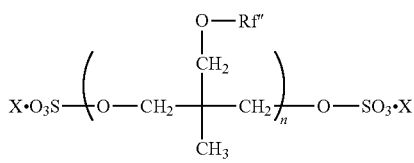  (9)

wherein Rf' represents a fluorine-containing group having the below-mentioned formula (9-1), n is 0 or an integer of from 1 to 10, and X represents the counter ion defined above in formula (2).

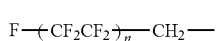  (9-1)

wherein n is an integer of from 1 to 4.

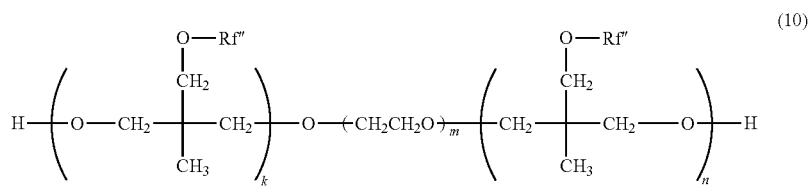  (10)

wherein Rf represents a fluorine-containing group having the above-mentioned formula (9-1), k is 0 or an integer of from 1 to 10, m is 0 or an integer of from 1 to 10, and n is 0 or an integer of from 1 to 10.

Marketed fluorine-containing surfactants can be used. Specific examples thereof include SARFRONs S-111, S-112, S-113, S-121, S-131, S-132, S-141 and S-145, which are manufactured by Asahi Glass Co., Ltd.; FLUORADs FC-93, FC-95, FC-98, FC-129, FC-135, FC-170C, FC-430 and FC-431, which are manufactured by Sumitomo 3M Ltd.; MEGAFACEs F-470, F-1405 and F-474, which are manufactured by DIC Corp.; ZONYLs TBS, FSP, FSA, FSN-100, FSN, FSO-100, FSO, FS-300 and UR, which are manufactured by Du Pont; FT-110, FT-250, FT-251, FT-400S, FT-150 and FT-400SW, which are manufactured by Neos Co., Ltd.; and POLYFOXs PF-136A, PF-156A, PF-151N, PF-154 and PF-159, which are manufactured by Om Nova Solutions, Inc.

Among these products, FS-300 (Du Pont); FT-110, FT-250, FT-251, FT-400S, FT-150, and FT-400SW (Neos Co., Ltd.); and POLYFOX PF-151N (Om Nova Solutions, Inc.) are preferable because images recorded by the ink have good image qualities, particularly, recorded images have good coloring property, and good color evenness on papers.

The silicone surfactant mentioned above is not particularly limited. Suitable materials for use as the silicone surfactant include polydimethylsiloxane whose side chains are modified, polydimethylsiloxane whose both ends are modified, polydimethylsiloxane whose one end is modified, and polydimethylsiloxane whose both ends and side chains are modified. Among these surfactants, polyether-modified silicone surfactants having a polyoxyethylene group, or a polyoxyethylenepolyoxypropylene group are preferable because of exhibiting good properties as surfactants.

Synthesized silicone surfactants or marketed products can be used as the silicone surfactant. For example, marketed products can be available from BYK Chemie GmbH, Shin-Etsu Chemical Co., Ltd., Dow Corning Toray Silicone Co., Ltd., Nihon Emulsion, and Kyoeisha Chemical Co., Ltd.

The above-mentioned polyether-modified silicone surfactant is not particularly limited. For example, compounds in which a polyalkyleneoxide structure is incorporated into a side chain connected with a Si atom of a dimethylpolysiloxane chain and which have the following formula (11) can be used.

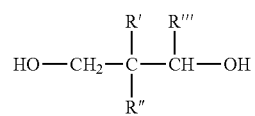

(11)

wherein each of m, n, a and b is independently an integer, and each of R and R' independently represents an alkyl group or an alkylene group.

As for the polyether-modified silicone surfactants, marketed products can be used. Specific examples thereof include KF-618, KF-642, and KF-643, which are manufactured by Shin-Etsu Chemical Co., Ltd.; EMALEXs SS-5602 and SS-1906EX, which are manufactured by Nihon Emulsion Co., Ltd.; FZ-2105, FZ-2118, FZ-2154, FZ-2161, FZ-2162, FZ-2163 and FZ-2164, which are manufactured by Dow Corning Toray Silicone Co., Ltd.; and BYK-33 and BYK-387, which are manufactured by BYK Chemie GmbH.

Specific examples of the above-mentioned anionic surfactants include polyoxyethylene alkyl ether acetates, alkylbenzene sulfonates, laurates, and polyoxyethylene alkyl ether sulfates.

Specific examples of the above-mentioned nonionic surfactants include polyoxyethylene alkyl ethers, polyoxypropylenepolyoxyethylene alkyl ethers, polyoxyethylene alkyl esters, polyoxyethylene sorbitan fatty acid esters, polyoxyethylene alkylphenyl ethers, polyoxyethylene alkylamines, and polyoxyethylene alkylamides.

The content of such a surfactant in the ink is preferably from 0.001 to 5% by weight, and more preferably from 0.05 to 1% by weight, based on the total weight of the ink. When the content is less than 0.001% by weight, the effects of the surfactant are hardly produced. In contrast, even when the content is increased so as to be greater than 5% by weight, the effects are almost the same as those in a case where the content is from 0.001 to 5% by weight.

The ink preferably includes a penetrant to impart a good combination of penetrating property and water solubility to the ink. For example, it is preferable to include one or more of non-wettable polyol compounds or glycol ether compounds, which have 8 to 11 carbon atoms, in the ink. In this regard, a "non-wettable" compound means a compound having a water solubility of from 0.2% to 5.0% by weight at 25° C.

Among these compounds, 1,3-diol compounds having the below-mentioned formula (12) are preferable as the penetrant. In addition, 2-ethyl-1,3-hexanediol (solubility of 4.2% by weight at 25° C.), and 2,2,4-trimethyl-1,3-pentanediol (solubility of 2.0% by weight at 25° C.) are more preferable.

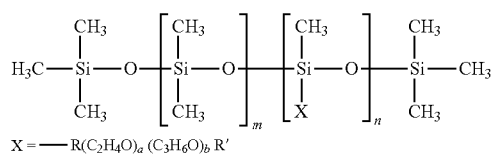

(12)

wherein R' represents a methyl group, or an ethyl group; R'' represents a hydrogen atom, or a methyl group; and R''' represents an ethyl group, or a propyl group.

Specific examples of other non-wettable polyol compounds include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

Other penetrants can be used in combination with the above-mentioned penetrants as long as the penetrants can be dissolved in the ink, and the properties of the ink can be controlled so as to fall in the desired ranges. Specific examples thereof include alkyl or aryl ethers of polyalcohols such as diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether; and lower alcohols such as ethanol.

The content of the penetrant in the ink is from 0.1% to 4.0% by weight based on the weight of the ink. When the content is lower than 0.1% by weight, quick-drying property cannot be imparted to the ink, and therefore blurred images tend to be formed. In contrast, when the content is higher than 4.0% by weight, the dispersion stability of the colorant tends to deteriorate, thereby causing the nozzle clogging problem. In addition, the ink tends to excessively penetrate into recording papers, thereby forming defective images such as low density images and penetrated images in which ink images recorded on a surface of the recording medium penetrate to the backside of the recording medium.

The ink can optionally include an aqueous resin dispersion (i.e., water-dispersing resin). Among various aqueous resin dispersions, aqueous resin dispersions having good film forming ability (image forming ability), high water repellency, high water resistance, and high weather resistance are preferable. By using such aqueous resin dispersions, prints having good water resistance and high image density (high coloring property) can be produced. Suitable materials for use as the resins of such aqueous resin dispersions include condensation-type synthetic resins, addition-type synthetic resins, and natural polymeric compounds.

Specific examples of such condensation-type synthetic resins include polyester resins, polyurethane resins, epoxy resins, polyamide resins, polyether resins, poly(meth)acrylic resins, acrylic-silicone resins, and fluorine-containing resins.

Specific examples of such addition-type synthetic resins include polyolefin resins, polystyrene resins, polyvinyl alcohol resins, polyvinylester resins, acrylic resins, and unsaturated carboxylic acid resins.

Specific examples of such natural polymeric compounds include cellulose resins, rosins, and natural rubbers.

Among these aqueous resin dispersions, aqueous dispersions of fine particles of a polyurethane resin, aqueous dispersions of fine particles of an acrylic-silicone resin, and aqueous dispersions of fine particles of a fluorine-containing resin are preferable. These aqueous resin dispersions can be used alone or in combination.

Among the particulate fluorine-containing resins for use as the aqueous resin dispersion, particulate fluorine-containing resins having a fluoro-olefin unit are preferable, and particulate fluorine-containing vinyl ether resins having a fluoro-olefin unit and a vinyl ether unit are more preferable.

Specific examples of the fluoro-olefin unit include —$CF_2CF_2$—, —$CF_2CF(CF_3)$—, and —$CF_2CFCl$—.

The vinyl ether unit is not particularly limited. Specific examples of the vinyl ether unit include groups having the following formulae.

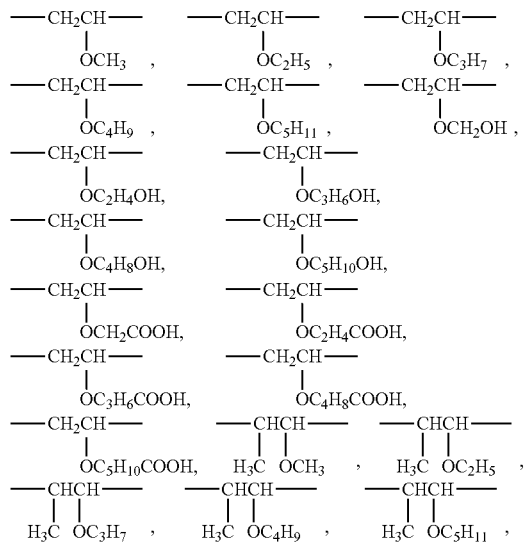
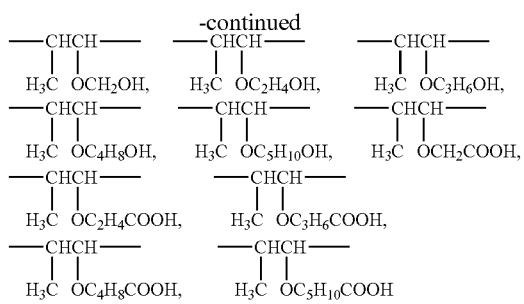

Among the above-mentioned particulate fluorine-containing resins having a fluoro-olefin unit and a vinyl ether unit, alternate copolymers, in which a fluoro-olefin unit and a vinyl ether unit are alternately connected, are preferable.

In this regard, it is possible to use synthesized aqueous resin dispersions, or marketed products thereof. Specific examples of the marketed products include FLUONATEs FEM-500 and FEM-600, DICGUARDs F-52S, F-90, F-90M and F-90N, and AQUAFLAN TE-5A, which are manufactured by DIC Corporation; LUMIFLONs FE4300, FE4500 and FE4400, and ASAHIGUARDs AG-7105, AG-950, AG-7600, AG-7000 and AG-1100, which are manufactured by Asahi Glass Co., Ltd.

Aqueous dispersions of homopolymers, copolymers, and complex resins can be used for the aqueous resin dispersions. In addition, the type of the aqueous dispersions is not particularly limited, and single-phase type emulsions, core-shell type emulsions, and power feed type emulsions can be used.

Aqueous dispersions of self-dispersing resins having a hydrophilic group, and aqueous dispersions of resins which do not have self-dispersibility and which are dispersed in an aqueous medium using a surfactant or a resin having a hydrophilic group can be used for the above-mentioned aqueous resin dispersions. Among these aqueous resin dispersions, resin emulsions including particulate resins such as ionomers of polyester resins and polyurethane resins, and resins prepared by subjecting unsaturated monomers to emulsion polymerization or suspension polymerization can be preferably used.

When preparing resin emulsions by performing emulsion polymerization, methods in which components such as an unsaturated monomer, a polymerization initiator, a surfactant, a chain transfer agent, a chelating agent, and a pH controlling agent are reacted in water are typically used. Therefore, resin emulsions can be easily prepared. In addition, since the composition of resins can be easily changed, resin dispersions having desired properties can be prepared relatively easily.

Suitable materials for use as the unsaturated monomer include unsaturated carboxylic acid monomers (such as acrylic acid, methacrylic acid, itaconic acid, fumaric acid, and maleic acid), mono- or poly-functional (meth)acrylate monomers, (meth)acrylamide monomers, aromatic vinyl monomers, vinylcyano monomers, vinyl monomers, allyl compounds, olefin monomers, diene monomers, and oligomers having unsaturated carbon, which can be used alone or in combination. By using such monomers alone or in combination, the properties of the resultant resins can be modified flexibly. In addition, by performing polymerization reactions or graft reactions using an oligomer-type polymerization initiator, the properties of the resins can be modified.

Specific examples of the above-mentioned monofunctional (meth)acrylate monomers include methyl(meth)acrylate, ethyl(meth)acrylate, isopropyl(meth)acrylate, n-butyl (meth)acrylate, iso-butyl(meth)acrylate, n-amyl(meth) acrylate, iso-amyl(meth)acrylate, n-hexyl(meth)acrylate, 2-ethylhexyl(meth)acrylate, octyl(meth)acrylate, decyl (meth)acrylate, dodecyl(meth)acrylate, octadecyl(meth) acrylate, cyclohexyl(meth)acrylate, phenyl(meth)acrylate, benzyl(meth)acrylate, glycidyl(meth)acrylate, 2-hydroxyethyl(meth)acrylate, 2-hydroxypropyl(meth)acrylate, dimethylaminoethyl(meth)acrylate, (meth)acryloxyethyl trimethyl ammonium salt, and 3-methacryloxypropyl trimethoxysilane.

Specific examples of the above-mentioned polyfunctional (meth)acrylate monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl) propane, trimethylolpropane trimethacrylate, trimethylolethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropiloxyphenyl)propane, 2,2'-bis(4-acryloxydiethoxyphenyl) propane, trimethylolpropane triacrylate, trimethylolethane triacrylate, tetramethylolmethane triacrylate, ditrimethylolpropane tetraacrylate, tetramethylomethane tetraacrylate, pentaerythritol tetraacrylate, and dipentaerythritol hexaacrylate.

Specific examples of the above-mentioned (meth)acrylamide monomers include acrylamide, methacrylamide, N,N-dimethylacrylamide, methylenebisacrylamide, and 2-acrylamide-2-methylpropane sulfonic acid.

Specific examples of the above-mentioned aromatic vinyl monomers include styrene, α-methylstyrene, vinyl toluene, 4-t-butylstyrene, chlorostyrene, vinyl anisole, vinyl naphthalene, and divinyl benzene.

Specific examples of the above-mentioned vinyl cyano monomers include acrylonitrile, and methacrylonitrile.

Specific examples of the above-mentioned vinyl monomers include vinyl acetate, vinylidene chloride, vinyl chloride, vinyl ether, vinyl ketone, vinyl pyrrolidone, vinylsulfonic acid and salts thereof, vinyl trimethoxysilane, and vinyl triethoxysilane.

Specific examples of the above-mentioned allyl compounds include allylsulfonic acid and salts thereof, allylamine, allylchloride, diallylamine, and diallyldimethylammonium salts.

Specific examples of the above-mentioned olefin monomers include ethylene and propylene.

Specific examples of the above-mentioned diene monomers include butadiene and chloroprene.

Specific examples of the above-mentioned oligomers having unsaturated carbon include styrene oligomers having a methacryloyl group, styrene-acrylonitrile oligomers having a methacryloyl group, methyl methacrylate oligomers having a methacryloyl group, dimethylsiloxane oligomers having a methacryloyl group, and polyester oligomers having an acryloyl group.

When the above-mentioned aqueous resin dispersions are present under strong alkaline or acidic conditions, the dispersions are destroyed or subjected to molecular chain cutting such as hydrolysis. Therefore, the pH of the aqueous resin dispersions is preferably from 4 to 12, and from the viewpoint of miscibility with water-dispersing colorants, the pH is more preferably 6 to 11, and even more preferably from 7 to 9.

The volume average particle diameter (D50) of the above-mentioned aqueous resin dispersions relates to the viscosity thereof, and as the particle diameter of aqueous dispersions of a resin decreases, the viscosity of the aqueous dispersions increases when the solid contents of the aqueous dispersions are the same. In order that the resultant ink does not have an excessively high viscosity, the volume average particle diameter (D50) of the aqueous resin dispersion used for the ink is preferably not less than 50 nm. When the volume average particle diameter (D50) is on the order of tens of micrometers, the resin particles are larger than the diameter of popular inkjet nozzles, and therefore the aqueous resin dispersion cannot be used for the ink. Even when the volume average particle diameter (D50) of an aqueous resin dispersion is less than the diameter of inkjet nozzles, the ejection property of the ink deteriorates if the resin dispersion includes resin particles having a particle diameter larger than the diameter of inkjet nozzles. Therefore, the volume average particle diameter (D50) of the aqueous resin dispersion used for the ink is preferably not greater than 200 nm, and more preferably not greater than 150 nm.

Such an aqueous resin dispersion is included in the ink to enhance the fixability of the colorant in the ink to recording media such as papers. Therefore, the aqueous resin dispersion preferably has a minimum film forming temperature (MFT) of not higher than 30° C. In addition, when the glass transition temperature of the resin of the aqueous resin dispersion is lower than −40°, a film of the resin becomes viscous, and the resultant ink images have tackiness. Therefore, the glass transition temperature of the resin of the aqueous resin dispersion is preferably not lower than −40°.

The content on a dry basis of such an aqueous resin dispersion in the ink is preferably from 2% to 30% by weight, and more preferably from 5% to 25% by weight, based on the weight of the ink.

The contents of the colorant and the resin (included in the aqueous resin dispersion) in the ink, and the content of the pigment in the colorant are determined by a method in which only the colorant and the resin (mixture) are separated from the ink. When a pigment is used as the colorant, the mixture is subjected to a thermal mass analysis to determine the ratio of the colorant to the resin of the aqueous resin dispersion based on the mass decreasing rate. If the molecular structure of the colorant is known, the solid content of the colorant can be determined by NMR if the colorant is a pigment or a dye. If the colorant is an inorganic pigment, a metal-containing organic pigment, or a metal-containing dye, which includes a heavy metal atom in a molecular chain, the mixture is subjected to a fluorescent X-ray analysis to determine the solid content of the colorant in the mixture.

The ink for use in the image forming method of the present invention can optionally include other components such as pH controlling agents, antiseptics/fungicides, chelating agents, anti-rust agents, antioxidants, ultraviolet absorbents, oxygen absorbents, and light stabilizers.

The pH controlling agent is not particularly limited, and pH controlling agents, which do not adversely affect the ink and which can control the pH of the ink in a pH range of from 7 to 11, can be used for the ink. Suitable materials for use as the pH controlling agent include alcohol amines, hydroxides of alkali metals, ammonium hydroxides, phosphonium hydroxides, and carbonates of alkali metals.

When the pH of the ink is lower than 7 or higher than 11, the ink tends to easily dissolve the recording heads and the ink supplying units, thereby causing problems such that the properties of the ink are changed; the ink is leaked from the recording heads and the ink supplying units; and the ink is defectively ejected from the recording heads.

Specific examples of the alcohol amines include diethanolamine, triethanolamine, and 2-amino-2-ethyl-1,3-propanediol.

Specific examples of the hydroxides of alkali metals include lithium hydroxide, sodium hydroxide, and potassium hydroxide.

Specific examples of the ammonium hydroxides include ammonium hydroxide, quaternary ammonium hydroxide, and quaternary phosphonium hydroxide.

Specific examples of the carbonates of alkali metals include lithium carbonate, sodium carbonate, and potassium carbonate.

Specific examples of the antiseptics/fungicides include sodium dehydroacetate, sodium sorbate, sodium salt of 2-pilidinethiol-1-oxide, sodium benzoate, and sodium salt of pentachlorophenol.

Specific examples of the chelating agents include sodium salt of ethylenediamine tetraacetic acid, sodium salt of nitrilotriacetic acid, sodium salt of hydroxyethylethylenediaminetriacetic acid, sadium salt of diethylenetriaminepentaacetic acid, and sodium salt of uramildiacetic acid.

Specific examples of the anti-rust agents include acidic sulfites, sodium thiosulfate, ammonium thioglycolate, diisopropylammonium nitrite, pentaerythritol tetraacetate, and dicyclohexylammonium nitrite.

Suitable materials for use as the antioxidants include phenolic antioxidants (including hindered phenol type antioxidants), amine type antioxidants, sulfur-containing antioxidants, and phosphorus-containing antioxidants.

Specific examples of the phenolic antioxidants include butylated hydroxyanisole, 2,6-di-tert-butyl-4-ethylphenol, stearyl-β-(3,5-di-tert-butyl-4-hydroxyphenyppropionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis{1,1-dimethyl-2-[β-(3-tert-butyl-4-hydroxy-5-methylphenyl)propionyloxy]ethyl}-2,4,8,10-tetraoxaspiro[5,5]undecane, 1,1,3-tris(2-methyl-4-hydroxy-5-tert-butylphenyl)butane, 1,3,5-trimethyl-2,4-6-tris(3,5-di-tert-butyl-4-hydroxybenzyl)benzene, and tetrakis[methylene-3-(3',5'-di-tert-butyl-4'-hydroxyphenyl) propionate]methane.

Specific examples of the amine type antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butylphenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-dihydroxyphenyl)propionate] methane, and 1,1,3-tris(2-methyl-4-hydroxy-5-tert-butylphenyl)butane.

Specific examples of the sulfur-containing antioxidants include dilauryl-3,3'-thiodipropionate, distearyl thiodipropionate, laurylstearyl thiodipropionate, dimyristyl-3,3'-thiodipropionate, distearyl-β,β'-thiodipropionate, 2-mercaptobenzoimidazole, and dilauryl sulfide.

Specific examples of the phosphorus-containing antioxidants include triphenyl phosphite, octadecyl phosphite, triisodecyl phosphite, trilauryl trithiophosphite, and trinonylphenyl phosphite.

Suitable materials for use as the ultraviolet absorbent include benzophenone type ultraviolet absorbents, benzotriazole type ultraviolet absorbents, salicylate type ultraviolet absorbents, cyanoacrylate type ultraviolet absorbents, and nickel complex type ultraviolet absorbents.

Specific examples of the benzophenone type ultraviolet absorbents include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Specific examples of the benzotriazole type ultraviolet absorbents include 2-(2'-hydroxy-5'-t-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-t-butyl-5'-methylphenyl)-5-chlorobenzotriazole.

Specific examples of the salicylate type ultraviolet absorbents include phenyl salicylate, p-t-butylphenyl salicylate, and p-octylphenyl salicylate.

Specific examples of the cyanoacrylate type ultraviolet absorbents include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl) acrylate.

Specific examples of the nickel complex type ultraviolet absorbents include nickelbis(octylphenyl)sulfide, 2,2'-thiobis(4-t-octylferrate)-n-butylamine nickel(II), 2,2'-thiobis(4-t-octylferrate)-2-ethylhexylamine nickel(II), and 2,2'-thiobis (4-t-octylferrate)triethanolamine nickel(II).

The method for preparing the ink for use in the image forming method of the present invention will be described.

The ink can be prepared by a known method. For example, ink components such as a colorant, an organic solvent, a surfactant, and water (and other optional components) are mixed and agitated using a mixer such as a sand mill, a homogenizer, a ball mill, a paint shaker, and a supersonic dispersing machine. This mixing and agitating can also be performed by an agitator having an agitating blade, a magnetic stirrer, and a high speed dispersing machine.

The resultant ink may be used while contained in a container such as ink cartridges.

The property of the ink is not particularly limited, and is properly determined so that the ink can be satisfactorily used for the target image forming apparatuses. However, the ink preferably has a viscosity of from 5 to 25 mPa·s at 25° C. When the ink has a viscosity of not less than 5 mPa·s, effects to improve image density and character image quality can be produced. In addition, when the ink has a viscosity of not greater than 25 mPa·s, the ink has good ejection property. In this regard, the viscosity is measured at 25° C. using a viscometer such as RE-550L from Toki Sangyo Co., Ltd.

The ink preferably has a static surface tension of not greater than 30 mN/m at 25° C., and more preferably not greater than 28 mN/m. When the static surface tension is not greater than 30 mN/m, the ink has good penetrating property, and thereby ink images can be rapidly dried on recording papers without causing the beading problem. In addition, the ink has good wettability against pretreatment layers, which are often formed on recording media before recording ink images, and therefore the resultant ink images have good coloring property without defective images such as white spot images. When the static surface tension is greater than 30 mN/m, the ink cannot be satisfactorily leveled on recording media, thereby increasing the drying time of ink images (i.e., deteriorating the drying property of the ink).

The above-mentioned ink can be used for any inkjet printers having an inkjet recording head. Specific examples of such printers include the following:
(1) Piezoelectric inkjet printers (such as a printer disclosed by JP H02-51734A), in which a piezoelectric device is used as a pressure generating device to press an ink in an ink passage, and a vibrating plate forming a wall of the ink passage is deformed by the piezoelectric device to change the volume of the ink passage to eject ink droplets from the ink passage, thereby forming an ink image on a recording medium;
(2) Thermal inkjet printers (such as a printer disclosed by JP S61-59911A), in which an ink in an ink passage is heated by heating a resistor to form an air bubble in the ink passage, thereby ejecting ink droplets from the ink passage, resulting in formation of an ink image on a recording medium; and
(3) Electrostatic inkjet printers (such as a printer disclosed by JP H06-71882A), in which an electrostatic force is formed between a vibrating plate and an electrode opposed to the vibrating plate to deform the vibrating plate and to change the volume of the ink passage, thereby ejecting ink droplets from the ink passage, resulting in formation of an ink image on a recording medium.

Next, the pretreatment liquid for use in pretreating a recording medium will be described.

The pretreatment liquid for use in the image forming method of the present invention includes at least water and a water soluble aliphatic organic acid, and optionally includes a water soluble organic monoamine compound, an organic acid ammonium salt, a water soluble cationic polymer, an aliphatic organic acid salt compound, an inorganic metal salt compound, an organic solvent, a surfactant, and a penetrant.

Water soluble aliphatic organic acids have a property of agglutinating particles of a water-dispersible colorant. In this regard, "agglutinate" means a phenomenon such that particles of a water-dispersible colorant are adsorbed on each other and aggregate. Whether or not a colorant agglutinates can be determined by using a particle diameter distribution measuring instrument.

When an ionic material such as water-soluble aliphatic organic acids is added to the pretreatment liquid, ions of the ionic material are adsorbed on charges on the surface of the water-dispersible colorant, thereby enhancing the agglutination effect caused by intermolecular forces, resulting in agglutination of the particles of the colorant. In order to determine whether a colorant in an ink can be agglutinated, a method, in which 30 ml of the pretreatment liquid is added to 50 of the ink including the water-dispersible colorant in an amount of 5% by weight, and the mixture is observed to determine whether the colorant is agglutinated in a moment, can be used.

Suitable materials for use as the water soluble aliphatic organic acid include water soluble aliphatic organic acids including a carboxyl group, or a sulfonic acid group. In this regard, "aliphatic organic acids" mean organic acids having a linear or branched hydrocarbon group, which is saturated or unsaturated. The number of carbon atoms included in the water soluble aliphatic organic acid is not particularly limited, and the carbon number is preferably from 2 to 6 in a molecule, and more preferably from 2 to 4, from the viewpoint of solubility in solvents. In addition, the number of acid groups included in the water soluble aliphatic organic acid is preferably from 1 to 3 in a molecule, more preferably from 1 to 2, and even more preferably 1, from the viewpoint of image density.

Among these water soluble aliphatic organic acids, water soluble aliphatic organic acids including a carboxyl group having the following formula (V) are preferable.

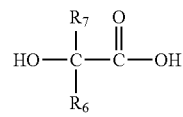

(V)

wherein $R_6$ represents a hydrogen atom, or a methyl group substituted with a hydroxyl group or a carboxyl group, and $R_7$ represents a methyl group, a methyl group substituted with a carboxyl group, or a methyl group substituted with a hydroxyl group and a carboxyl group.

Specific examples of such compounds having formula (V) include lactic acid (pKa of 3.83), malic acid (pKa of 3.4), citric acid (pKa of 3.13), and tartaric acid (pKa of 2.93).

Specific examples of water soluble aliphatic organic acids having a formula other than formula (V) include gluconic acid (pKa of 2.2), pyruvic acid (pKa of 2.49), and fumaric acid (pKa of 3.02).

Among water soluble aliphatic organic acids having a sulfonic acid group, taurine is preferable.

The content of such a water soluble aliphatic organic acid in the pretreatment liquid is preferably from 1% to 40% by weight, and more preferably from 3% to 30% by weight, based on the total weight of the pretreatment liquid. When the content is higher than 40% by weight, it becomes impossible to include a water soluble organic monoamine in the pretreatment liquid in an amount necessary for neutralization. In contrast, when the content is lower than 1% by weight, the image quality improving effect is hardly produced.

The pretreatment liquid preferably includes a water soluble organic monoamine compound to control penetration of the ink into recording media and to prevent a metal constituting a coating device of the pretreatment liquid from being corroded.

Any primary to quaternary amines and salts thereof can be used as the water soluble organic monoamine compound. In this regard, quaternary amines mean compounds in which a nitrogen atom has four alkyl groups as substituents. The carbon number of such water soluble organic monoamine compounds is not particularly limited, but is preferably from 2 to 12 in one molecule, and more preferably from 2 to 6.

Among various water soluble organic monoamine compounds, compounds having the following formula (VI) or (VII) are preferable.

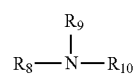

(VI)

wherein each of $R_8$, $R_9$ and $R_{10}$ independently represents a hydrogen atom, an alkoxyl group having 1 to 4 carbon atoms, an alkyl group having 1 to 8 carbon atoms, a hydroxyethyl group, or a hydroxypropyl group, wherein a case where each of $R_8$, $R_9$ and $R_{10}$ is a hydrogen atom is excluded.

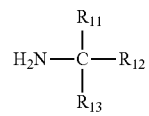

(VII)

wherein $R_{11}$ represents a hydroxymethyl group, $R_{12}$ represents a methyl group, an ethyl group, or a hydroxymethyl group, and $R_{13}$ represents a hydrogen atom, an alkyl group having 1 to 4 carbon atoms, or a hydroxymethyl group.

Specific examples of the compounds having formula (VI) include dimethylamine, ethylamine, diethylamine, triethylamine, propylamine, dipropylamine, isopropylamine, diisopropylamine, n-butylamine, t-butylamine, sec-butylamine, di-n-butylamine, tributylamine, pentylamine, dipentylamine, tripentylamine, 2-ethylhexylamine, di-2-ethylhexylamine, di-n-octylamine, tri-n-octylamine, 1-amino-2-propanol, 3-amino-1-propanol, N-methylethanolamine, N,N-diethylethanolamine, N,N-dimethylethanolamine, N-methyldiethanolamine, diethanolamine, triethanolamine, triisopropanolamine, N-butyldiethanolamine, and N,N-dibutylethanolamine.

Specific examples of the compounds having formula (VII) include 2-amino-2-ethyl-1,3-propanediol, 2-amino-2-(hydroxymethyl)-1,3-propanediol, 2-amino-2-methyl-1,3-propanediol, and 2-amino-2-methyl-1-propanol.

Specific examples of water soluble organic monoamine compounds having formulae other than formulae (VI) and (VII) include allylamine, diallylamine, 3-ethoxypropylamine, 2-(2-aminoethoxy)ethanol, 3-methoxypropylamine, and choline.

The added amount of such a water soluble organic monoamine is preferably from 1.0 to 1.5 moles, and more preferably from 1.0 to 1.2 moles, based on 1 mole of the acid group of the water soluble aliphatic organic acid included in the pretreatment liquid. When the added amount is less than 1.0 mole, the diameters of dot ink images tend to narrow, thereby making it possible to cause a white line image. In contrast, when the added amount is greater than 1.5 moles, a free water soluble organic monoamine tends to accelerate penetration of the ink, thereby often decreasing the image density.

Such a water soluble organic monoamine compound is added to the pretreatment liquid to produce a neutralized salt with a water soluble aliphatic organic acid and to control the pH of the pretreatment liquid so as to be not less than 5. Therefore, it is preferable to determine the added amount of such a water soluble organic monoamine compound based on the molecular weights of the water soluble organic monoamine compound, and the water soluble aliphatic organic acid included in the pretreatment liquid.

The pretreatment liquid can include an organic acid ammonium salt instead of a water soluble aliphatic organic acid or in combination with a water soluble aliphatic organic acid. In this case, effects similar to those produced by water soluble aliphatic organic acids can be produced.

Suitable materials for use as the organic acid ammonium salt include organic acid ammonium salts having the below-mentioned formula (13) from the viewpoints of water solubility, balance between acidity and alkalinity of dissociated ions thereof, and chelate forming ability.

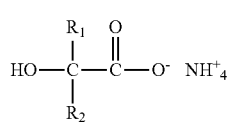
(13)

wherein each of $R_1$ and $R_2$ independently represents a lower alkyl group. The carbon number of the organic acid ammonium salt is not particularly limited, but is preferably not greater than 6 in one molecule from the viewpoint of water solubility.

Specific examples of the organic acid ammonium salt include ammonium lactate, and ammonium acetate.

The added amount of the organic acid ammonium salt is preferably from 1% to 40% by weight, and more preferably from 3% to 30% by weight, based on the total weight of the pretreatment liquid. Even when the added amount is increased so as to be greater than 40% by weight, the image quality improving effect is hardly enhanced, and the viscosity of the pretreatment liquid tends to increase. In contrast, when the added amount is less than 1% by weight, the image quality improving effect is hardly produced.

The pretreatment liquid can include a water soluble cationic polymer instead of a water soluble aliphatic organic acid or in combination with a water soluble aliphatic organic acid. In this case, effects similar to those produced by water soluble aliphatic organic acids can be produced.

Suitable materials for use as the water soluble cationic polymer include water soluble cationic polymers prepared by polymerizing monomers including an amine and an epihalohydrin. Such water soluble cationic polymers include a hydroxyl group and an ammonium cation in the main chain thereof and release a halogen anion in water, thereby enhancing a buffering effect and a pigment agglutination effect when being contacted with the ink.

Specific examples of the water soluble cationic polymer include polyamine-epihalohydrin copolymers, polyamide-epihalohydrin copolymers, polyamidepolyamine-epihalohydrin copolymers, and amine-epihalohydrin copolymers. Among these water soluble cationic polymers, copolymers having the below-mentioned formula (14), copolymers including a repeat unit having the below-mentioned formula (15), and copolymers obtained from an amine having the below-mentioned formula (16), a monomer having the below-mentioned formula (17), and a monomer having the below-mentioned formula (18) are preferable.

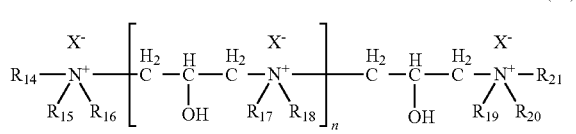
(14)

wherein each of $R_{14}$ to $R_{21}$ independently represents an alkyl group having 1 to 8 carbon atoms, a hydroxyalkyl group, an alkenyl group, or a benzyl group ($R_{14}$ to $R_{21}$ are the same or different from each other); X represents a halogen atom, and n is an integer of from 1 to 4.

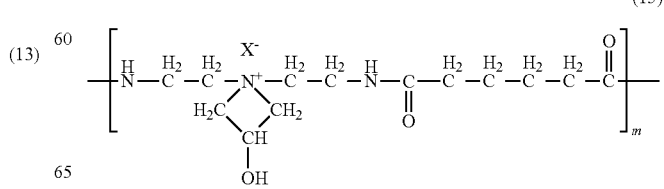
(15)

wherein X represents a halogen atom, and m is a positive integer.

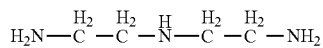
(16)

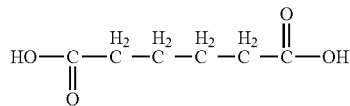
(17)

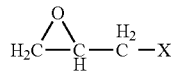
(18)

wherein X represents a halogen atom.

Specific examples of the amine monomers include diethylenetriamine, triethylenetetramine, tetramethylenepentamine, and iminobispropylamine. Among amine monomers, monomers having formula (14) are preferable.

Other quaternary ammonium salt type cationic polymers, and water-dispersible cationic polymers may be used as water soluble cationic polymers.

The above-mentioned water soluble cationic polymer can be prepared by known methods such as a method in which monomers including an amine and an epihalohydrin are polymerized, and a method in which a monomer including an epihalohydrin is graft-polymerized with a polyamide obtained by polymerizing monomers including an amine and a carboxylic acid.

The weight average molecular weight of the water soluble cationic polymer included in the pretreatment liquid is preferably from 500 to 100,000 when the water soluble cationic polymer is a polyamine-epihalohydrin copolymer. When the water soluble cationic polymer is a polyamide-epihalohydrin copolymer or a polyamidepolyamine-epihalohydrin copolymer, the weight average molecular weight is preferably from 10,000 to 5,000,000. When the water-soluble cationic polymer is an amine-epihalohydrin copolymer, the weight average molecular weight is preferably from 700 to 50,000. When the weight average molecular weight is greater than the preferable range, there is a case where a water solution of the copolymer cannot be prepared. In contrast, when the weight average molecular weight is less than the preferable range, the pretreatment effects tend not to be satisfactorily produced.

The added amount of such a water soluble cationic polymer is preferably from 1% to 40% by weight, and more preferably from 3% to 30% by weight, based on the total weight of the pretreatment liquid. When the added amount is increased so as to be greater than 40% by weight, the image quality improving effect is hardly enhanced, and the viscosity of the pretreatment liquid tends to excessively increase. In contrast, when the added amount is less than 1% by weight, the image quality improving effect is hardly produced.

When an aliphatic organic acid salt or an inorganic metal salt compound is included in the pretreatment liquid, the pigment included in the ink tends to remain on the surface of recording media, thereby producing good salting-out effect, resulting in increase of image density.

Specific examples of such an aliphatic organic acid salt include sodium L-aspartate, magnesium L-aspartate, calcium ascorbate, sodium L-ascorbate, sodium succinate, disodium succinate, diammonium succinate, aluminum citrate, potassium citrate, calcium citrate, triammonium citrate, tripotassium citrate, trisodium citrate, diammonium citrate, disodium citrate, zinc lactate, aluminum lactate, ammonium lactate, potassium lactate, calcium lactate, sodium lactate, magnesium lactate, potassium tartrate, calcium tartrate, sodium DL-tartrate, and sodium potassium tartrate.

Specific examples of such an inorganic metal salt compound include magnesium sulfate, aluminum sulfate, manganese sulfate, nickel sulfate, iron(II) sulfate, copper(II) sulfate, zinc sulfate, sodium sulfate, potassium sulfate, lithium sulfate, sodium hydrogen sulfate, potassium hydrogen sulfate, iron(II) nitrate, iron(III) nitrate, cobalt nitrate, strontium nitrate, copper(II) nitrate, nickel(II) nitrate, lead(II) nitrate, manganese(II) nitrate, sodium nitrate, potassium nitrate, nickel(II) chloride, calcium chloride, tin(II) chloride, strontium chloride, barium chloride, magnesium chloride, sodium chloride, potassium chloride, sodium carbonate, potassium carbonate, sodium hydrogen carbonate, and potassium hydrogen carbonate.

The pretreatment liquid preferably includes an organic solvent to control penetration of the ink and to prevent corrosion of metals constituting recording heads. Organic solvents similar to those mentioned above for use in the ink can be used for the pretreatment liquid.

Since such organic solvents can contain water even when being allowed to settle in an open state, good fluidity can be imparted to the pretreatment liquid. In this regard, it is preferable to use an organic solvent having a high equilibrium moisture content, in order to prevent excessive increase of the viscosity of the pretreatment liquid even when water in the pretreatment liquid evaporates. This is because the solvent and water achieve an equilibrium state in the pretreatment liquid.

The content of such an organic solvent in the pretreatment liquid is not particularly limited, but is preferably from 10% to 80% by weight, and more preferably from 15% to 60% by weight, based on the weight of the pretreatment liquid. When the content is higher than 80% by weight, the recording medium coated with the pretreatment liquid tends to have a long drying time although the drying time changes depending on the property of the solvent used. When the content is lower than 10% by weight, water tends to evaporate in the pretreatment process, thereby often changing the formula of the pretreatment liquid seriously.

The pretreatment liquid can include a surfactant to improve wettability of the surfaces of recording media, thereby improving image density, and chroma of recorded images without forming white spot images. In this regard, it is preferable that the pretreatment liquid including a surfactant has a static surface tension of not greater than 30 mN/m to improve wettability of the surfaces of recording media and penetrating property of the ink into recording media.

The nonionic surfactants, anionic surfactants, betaine surfactants, silicone surfactants, and fluorine-containing surfactants mentioned above for use in the ink can be preferably used for the pretreatment liquid. Among these surfactants, silicone surfactants and fluorine-containing surfactants, which can control the static surface tension so as to be not greater than 30 mN/m, are more preferable. These surfactants can be used alone or in combination.

The content of the surfactant in the pretreatment liquid is preferably from 0.001% to 5% by weight, and more preferably from 0.05% to 1% by weight, based on the total weight of the pretreatment liquid. When the content is less than 0.001% by weight, the effects of the surfactant are hardly produced. In contrast, even when the content is increased so as to be greater than 5% by weight, the effects are hardly enhanced.

Similarly to the ink mentioned above, the pretreatment liquid preferably includes a penetrant such as non-wettable polyol compounds or glycol ether compounds, which have 8 to 11 carbon atoms so as to have a good combination of penetrating property and solubility in water. The term "non-wettable" is defined above. In addition, preferable penetrants, non-wettable polyol compounds, and other penetrants, which can be used in combination with the penetrants, are similar to those mentioned above with respect to the ink.

The content of the penetrant in the pretreatment liquid is preferably from 0.1% to 5% by weight based on the total weight of the pretreatment liquid. When the content is less than 0.1% by weight, the effects of the penetrant are hardly produced. In contrast, when the content is increased so as to be greater than 5% by weight, the effects are not enhanced because penetrants have low solubility in solvents, and tend to be separated from solvents.

Other components such as antiseptic/fungicides and antirust agents can be optionally used for the pretreatment liquid, and the materials mentioned above for use in the ink can also be used for the pretreatment liquid.

Next, the aftertreatment liquid used for the inkjet recording method of the present invention will be described. The aftertreatment liquid includes a component capable of forming a transparent protective layer on an image-bearing surface of a recording medium. For example, the aftertreatment liquid includes a water-dispersing resin, an organic solvent, a penetrant, a surfactant, and water, and optionally includes other components. Although the components of the aftertreatment liquid are changed depending on the application method of the aftertreatment liquid (such as coating methods or spraying methods), the aftertreatment liquid preferably includes a resin component, which is polymerized when irradiated with ultraviolet rays, to impart high glossiness to images recorded on a recording medium while protecting the images (i.e., to improve glossiness and fixability of images). In order to improve glossiness and fixability of images, an aqueous resin dispersion (e.g., thermoplastic resin emulsions) is preferably included in the aftertreatment liquid. When the aftertreatment liquid is sprayed by an inkjet recording apparatus, the aftertreatment liquid preferably includes an organic solvent (a wetting agent) in a proper amount. Organic solvents mentioned above for use in the ink and the pretreatment liquid are preferably used for the aftertreatment liquid.

The water-dispersing resin preferably has a glass transition temperature (Tg) of not lower than −30° C., and more preferably from −20° C. to 100° C. When the Tg is lower than −30° C., the resin has tackiness similar to that of adhesives after water evaporates, and therefore it is difficult to practically use such a resin for the aftertreatment liquid. In addition, the water-dispersing resin preferably has a minimum film forming temperature (MFT) of not higher than 50° C., and more preferably not higher than 35° C. When the MFT is higher than 50° C., a film of the resin cannot be formed in a short time even when using a dryer such as heaters and hot air blowers, and therefore it is difficult to practically use such a resin.

The Tg of a resin can be measured with a method such as TMA methods, DSC methods and DMA methods (tension methods), and the MFT can be measured with an instrument such as MFT measuring instruments.

Suitable resins for use as the water-dispersing resins include acrylic resins, styrene-acrylic resins, urethane resins, acrylic-silicone resins, and fluorine-containing resins. Among these resins, the water-dispersing resins mentioned above for use in the ink are preferably used.

The solid content of the water-dispersing resin in the aftertreatment liquid is preferably from 1% to 50% by weight, and from 1% to 30% by weight when the aftertreatment liquid is applied by a spraying method, based on the total weight of the aftertreatment liquid. When the content is greater than 50% by weight, the viscosity of the aftertreatment liquid tends to excessively increase. When the content is less than 1% by weight, the aftertreatment liquid tends to have poor film forming ability, and energy used for drying the coated aftertreatment liquid excessively increases.

The volume average particle diameter (D50) of the aqueous resin dispersions of the water-dispersing resins relates to the viscosity thereof, and as the particle diameters of aqueous dispersions of a resin decrease, the viscosities of the aqueous dispersions increase when the solid contents of the aqueous dispersions are the same. In order that the resultant aftertreatment liquid does not have an excessively high viscosity, the volume average particle diameter (D50) of the aqueous resin dispersion used for the aftertreatment liquid is preferably not less than 50 nm. When the volume average particle diameter (D50) is on the order of tens of micrometers, the resin is larger than the diameter of popular liquid ejection nozzles, and therefore the aqueous resin dispersion cannot be used for the aftertreatment liquid. Even when the volume average particle diameter (D50) of an aqueous resin dispersion is less than the diameter of liquid ejection nozzles, the ejection property of the aftertreatment liquid deteriorates if the resin dispersion includes resin particles having a particle diameter larger than the diameter of the liquid ejection nozzles. Therefore, the volume average particle diameter (D50) of the aqueous resin dispersion used for the aftertreatment liquid is preferably not greater than 200 nm, and more preferably not greater than 150 nm.

The aftertreatment liquid can include an organic solvent. The organic solvents mentioned above for use in the ink and the pretreatment liquid can be used for the aftertreatment liquid. The content of such an organic solvent in the aftertreatment liquid is not particularly limited, but is preferably from 10% to 80% by weight, and more preferably from 15% to 60% by weight, based on the weight of the aftertreatment liquid. When the content is higher than 80% by weight, the aftertreatment liquid tends to have a long drying time although the drying time changes depending on the property of the solvent. When the content is lower than 10% by weight, water tends to evaporate in the aftertreatment process, thereby often changing the formula of the aftertreatment liquid seriously.

The aftertreatment liquid can include a penetrant, a surfactant, and other components such as antiseptics, defoaming agents, and pH controlling agents. The penetrants and the surfactants mentioned above for use in the ink and the pretreatment liquid can be used for the aftertreatment liquid.

With respect to such other components, the materials mentioned above for use in the ink and the pretreatment liquid can be used for the aftertreatment liquid.

Next, the recording medium for use in the image forming method of the present invention will be described.

The recording medium is not particularly limited as long as the recording medium has a coat layer on at least one side thereof, and the coat layer has a liquid absorbing property in a predetermined range. Among these recording media, papers for printing such as coated papers, gloss papers, art papers, and super art papers are preferable from the viewpoint of ink image qualities.

Among these printing papers, in order to form ink images having good image qualities (such as image density, chroma, beading and color bleeding) while having high glossiness and good smear-less fixability, general-purpose printing papers having a liquid absorbing property in a predetermined range are preferable. Specifically, printing papers having a liquid absorbing property such that when pure water is applied on the surface of the recording medium at a contact time of 100 ms using a dynamic scanning absorptometer, the amount of pure water transferred to the printing papers is from 1 to 10 ml/m$^2$ are preferable. When the amount of transferred pure water is too small, the amounts of transferred pretreatment liquid and ink also decrease, thereby causing the beading problem and the color bleed problem. In contrast, when the amount of transferred pure water is too large, the diameter of an ink dot image becomes smaller than the desired diameter, thereby decreasing the image density of a solid image.

The above-mentioned dynamic scanning absorptometer (DSA) is introduced by Shigenori Kuga in JAPAN TAPPI JOURNAL Vol. 48, pp 88-92, May 1994. The DSA can measure precisely the amount of a liquid absorbed by a material in a very short time. The DSA uses the following method.

(1) The liquid absorbing speed is measured by observing the movement of the meniscus of a liquid in a capillary.

(2) A liquid supplying head including the liquid is spirally scanned on a disc-form recording medium. This scanning operation is repeatedly performed predetermined times on different portions of the disc-form recording medium while changing the scanning speed. This scanning operation is automatically performed in a predetermined pattern.

The liquid supplying head includes a capillary to which the liquid is supplied through a TEFLON tube. The position of the meniscus in the capillary is automatically detected by an optical sensor. In this application, a DSA, D type of K350 Series from Kyowa Seiko, is used, and pure water is used for the liquid. The amount of transferred pure water at a contact time of 100 ms is determined by an interpolation method based on the adjacent contact times.

There are marketed printing papers, which have a liquid absorbing property in the above-mentioned range. Specific examples thereof include RICOH BUSINESS COAT GLOSS100 (from Ricoh Co., Ltd.); OK TOP COAT+, OK KINFUJI+, and SA KINFUJI+(from Oji Paper Co., Ltd.); SUPER MI DAL, and AURORA COAT (from Nippon Paper Industries Co., Ltd.); a MATT, and μ COAT (from Hokuetsu Kishu Paper Co., Ltd.); RAICHO ART, and RAICHO SUPER ART (from Chuetsu Pulp z& Paper Co., Ltd.); and PEARL COAT N (from Mitsubishi Paper Mills Ltd.)

The recording medium for use in the image forming method of the present invention preferably has a substrate and a coat layer, which is formed on at least one side of the substrate and which has the above-mentioned liquid absorbing property.

The substrate of the recording medium is not particularly limited, and any known substrates such as papers made of wood fiber, and sheets such as non-woven fabrics made of wood fiber and synthesized fiber can be used.

Specific examples of the materials constituting such paper substrates include wood pulps, and waste paper pulps.

Specific examples of the wood pulps include L-Breached Kraft Pulp (LBKP), and N-Breached Kraft Pulp (NBKP), N-Breached Sulfite Pulp (NBSP), L-Breached Sulfite Pulp (LBSP), Ground Pulp (GP), and Thermo-Mechanical Pulp (TMP).

Waste papers of the below-mentioned papers, which are listed in the waste paper quality specification list prepared by Paper Recycling Promotion Center of Japan, can be used as the raw materials for the waste paper pulps.

(1) high quality white paper without print
(2) lined white paper without print
(3) high quality cream paper without print
(4) cardboard
(5) medium quality paper without print
(6) white paper with black print
(7) woody paper without print
(8) white paper with color print
(9) white paper or art paper with color print
(10) art paper without print
(11) medium quality paper with color print
(12) woody paper with print
(13) newspaper
(14) magazine Specific examples of the waste papers include waste papers of papers for information technology such as non-coated computer papers; papers for printers such as thermal papers and pressure-sensitive papers; papers for office automation (OA) such as papers for plain paper copiers (PPC); coated papers such as art papers, coated papers, micro-coated papers, and matted papers; and non-coated papers such as high quality papers, high quality colored papers, note papers, letter papers, wrapping papers, cover papers, medium quality papers, newspapers, woody papers, imitation Japanese vellums, machine glazed poster papers, and polyethylene-coated paper. Chemical pulp papers and high-yield pulp containing papers prepared from one or more of these waste papers can be used for the substrate.

Waste paper pulps are typically prepared by a method including the following four processes:

1. Pulping Process

Waste paper is treated using a chemical and a mechanical force of a pulper so as to become fibers while removing print inks from the fibers.

2. Dedusting Process

Foreign materials (such as plastics) included in the waste paper are removed therefrom using a screen or a cleaner.

3. Deinking Process

Print inks removed from the fibers using a surfactant are removed from the pulp dispersion by a flotation method or a cleaning method.

4. Bleaching Process

The pulp dispersion is subjected to an oxidation treatment or a reduction treatment to enhance the whiteness of the fibers.

When waste paper pulps are mixed with new pulps, the weight ratio of the waster paper pulps is preferably not greater than 40% by weight to prevent the resultant recording medium from curling after ink images are formed thereon.

Specific examples of the filler to be included in the substrate of the recording medium include white pigments such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatom earth, calcium silicate, magnesium silicate, synthesized silica, aluminum hydroxide, alumina, lithopone, zeolite, magnesium carbonate, and magnesium hydroxide; and organic pigments such as polystyrene-based plastic pigments, acrylic resin-based plastic pigments, particulate polyethylene, microcapsule, particulate urea resins, and particulate melamine resins. These pigments can be used alone or in combination.

When the above-mentioned substrate is prepared, an internal sizing agent is typically used. Specific examples of such internal sizing agents include neutralized rosin-based sizing agents for use in preparing neutralized papers, alkenyl succinic anhydride (ASA), alkylketene dimers (AKD), and petroleum resin-based sizing agents. Among these internal sizing agents, neutralized rosin-based sizing agents, and alkenylsuccinic anhydride are preferable. Alkylketene dimmers can produce good sizing effects, and therefore the added amount can be reduced. However, by adding alkylketene dimers, the friction coefficient of the surface of the recording medium tends to decrease. Therefore, a defective feeding problem such that the recording medium is defectively fed in a printer may be caused depending on the feeding device of the printer.

The thickness of the substrate is not particularly limited, but is preferably from 50 μm to 300 μm. In addition, the weight of the substrate is preferably from 45 to 290 g/m$^2$.

The coat layer on the substrate includes at least a pigment and a binder, and optionally includes a surfactant and other components. Suitable materials for use as the pigment include inorganic pigments, and combinations of an inorganic pigment and an organic pigment.

Specific examples of the inorganic pigments include kaolin, talc, heavy calcium carbonate, light calcium carbonate, calcium sulfite, amorphous silica, titan white, magnesium carbonate, titanium dioxide, aluminum hydroxide, calcium hydroxide, magnesium hydroxide, zinc hydroxide, and chlorite. Among these inorganic pigments, kaolin such as delaminated kaolin, fired kaolin, and engineered kaolin is preferable because of being able to impart high glossiness and feeling similar to that of papers for offset printing to the coat layer. In this regard, kaolin including a relatively small particle kaolin, which has a particle diameter distribution such that particles having a diameter of not greater than 2 μm are included in an amount of not less than 80% by weight, in an amount of not less than 50% by weight is preferable.

The added amount of such a kaolin is preferably not less than 50 parts by weight, based on 100 parts by weight of the binder included in the coat layer. When the added amount is less than 50 parts by weight, the glossiness improving effect is hardly produced. The upper limit of the added amount is not particularly determined. However, kaolin has such a fluidity that when dispersed in water by a high shearing force, the viscosity of the dispersion increases. Therefore, the added amount is preferably not greater than 90 parts by weight to prevent occurrence of defective coating.

Specific examples of the organic pigments mentioned above include particulate resins such as styrene-acrylic copolymers, styrene-butadiene copolymers, polystyrene, and polyethylene. It is preferable that these particulate resins are in an aqueous dispersion state. These organic pigments can be used alone or in combination.

The added amount of such an organic pigment is preferably from 2 to 20 parts by weight based on 100 parts by weight of all the pigments included in the coat layer. Since organic pigments impart high glossiness to the coat layer, and have relatively low specific gravity compared to inorganic pigments, a bulky and glossy coat layer having good covering property can be formed. When the added amount is less than 2 parts by weight, the effects are hardly produced. In contrast, when the added amount is greater than 20 parts by weight, the fluidity of the coating liquid tends to deteriorate, thereby deteriorating the productivity of the coat layer while increasing the manufacturing costs of the coat layer.

Organic pigments have a form such as solid particle forms, hollow particle forms, and donut particle forms. In order to well balance the glossiness imparting property, the surface covering property, and the fluidity of the coating liquid, organic pigments having a volume average particle diameter (D50) of from 0.2 μm to 3.0 μm are preferable, and organic pigments having a hollow particle form having a hollow rate of not less than 40% are more preferable.

Suitable materials for use as the binder in the coat layer include water-soluble resins and water-dispersing resins.

The added amount of such a binder resin is preferably from 2 to 100 parts by weight, and more preferably from 3 to 50 parts by weight, based on 100 parts by weight of the pigment included in the coat layer. The added amount is determined so that the resultant recording medium has a liquid absorbing property in the predetermined range mentioned above.

Specific examples of such water-soluble resins include, but are not limited thereto, polyvinyl alcohol, and modified polyvinyl alcohol such as anionically-modified polyvinyl alcohol, cationically-modified polyvinyl alcohol, and acetal-modified polyvinyl alcohol; polyurethane; polyvinyl pyrrolidone, and modified polyvinyl pyrrolidone such as vinyl pyrrolidone-vinyl acetate copolymers, vinyl pyrrolidone-dimethylaminoethyl methacrylate copolymers, quaternary vinyl pyrrolidone-dimethylaminoethyl methacrylate copolymers, and vinyl pyrrolidone-methacrylamidopropyl trimethyl ammonium chloride copolymers; celluloses such as carboxymethyl cellulose, hydroxyethyl cellulose, and hydroxypropyl cellulose; modified celluloses such as cationized hydroxyethyl cellulose; synthetic resins such as polyesters, polyurethanes, polyacrylic acid and esters thereof, melamine resins, polyester-polyurethane copolymers, and modified versions of these resins; and other resins such as poly(meth)acrylic acid, poly(meth)acrylamide, oxidized starch, phosphoric acid esters of starch, derivatives of starch, cationized starch, other modified starch, polyethylene oxide, sodium polyacrylate, and sodium alginate. These resins can be used alone or in combination. Among these water-soluble resins, polyvinyl alcohol, cationically modified polyvinyl alcohol, acetal-modified polyvinyl alcohol, polyesters, polyurethanes, and polyester-polyurethane copolymers are preferable.

Specific examples of such water-dispersing resins include, but are not limited thereto, polyvinyl acetate, ethylene-vinyl acetate copolymers, polystyrenes, styrene-(meth)acrylate copolymers, polymers of (meth)acrylates, vinyl acetate-(meth)acrylic acid (or esters thereof) copolymers, styrene-butadiene copolymers, ethylene-propylene copolymers, polyvinyl ethers, and silicone-acrylic copolymers.

In addition, crosslinking agents such as methylol melamine, methylol urea, methylol hydroxypropylene urea, and isocyanates can be used in combination with such resins. Further, resins having a self crosslinking ability such as copolymers having an N-methylolacrylamide group can also be used.

These water-soluble resins and the water-dispersing resins can be used in combination.

The coat layer preferably includes a cationic organic compound. Suitable materials for use as the cationic organic compound include materials, which can form a water-insoluble salt by reacting with a sulfonic acid group, a carboxyl group, and an amino group included in a dye (such as direct dyes and acidic dyes) of a water-soluble ink, such as monomers, oligomers and polymers of primary to tertiary amines, and quaternary ammonium salts. Among these materials, oligomers or polymers of primary to tertiary amines, and quaternary ammonium salts are preferable.

When water-dispersing colorants are used as the colorant of the ink, such a cationic organic compound is not necessarily included in the coat layer.

Specific examples of such a cationic organic compound include dimethylamine-epichlorohydrin polycondensates, dimethylamine-ammonia-epichlorohydrin condensates, poly(trimethylaminoethyl methacrylate methylsulfate), diallylamine hydrochloride-acrylamide copolymers, poly(diallylamine hydrochloride-sulfur dioxide), polyallylamine hydrochloride, poly(allylamine hydrochloride-diallylamine hydrochloride), acrylamide-diallylamine copolymers, polyvinylamine copolymers, dicyanediamide, dicyanediamide-ammonium chloride-urea-formaldehyde condenstates, polyalkylenepolyamine-dicyanediamide ammonium salt condensates, dimethyldiallylammonium chloride, polydiallylmethylamine hydrochloride, poly(diallyldimethylammonium chloride), poly(diallyldimethylammonium chloride-sulfur dioxide), poly(diallyldimethylammonium chloride-diallylamine hydrochloride derivatives), acrylamide-diallyldimethylammonium chloride copolymers, acrylate-acrylamide-diallylamine hydrochloride copolymers, polyethyleneimine, polyethyleneimine derivatives (e.g., alkylene oxide-modified polyethyleneimine), and acrylamine polymers. These cationic organic compounds can be used alone or in combination.

Among these compounds, combinations of a low molecular weight cationic organic compound (such as dimethylamine-epichlorohydrin polycondensates, and polyallylamine hydrochloride) and a relatively high molecular weight cationic organic compound (such as poly(diallydimethylammonium chloride)) are preferable. By using such a combination, the image density can be enhanced while reducing the chance of occurrence of a feathering problem in that the outer portion of an image is blurred like a feather.

The cationic organic compound included in the coat layer preferably has a cation equivalent of from 3 to 8 meq/g, which is measured by a colloid titration method using potassium polyvinylsulfate, and toluidine blue. When the cation equivalent falls in this range, good property can be imparted to the coat layer when the weight on a dry basis of the coat layer is in the above-mentioned range. In the colloid titration method, a sample (cationic organic compound) is dissolved in distilled water at a concentration of 0.1% by weight, and pH of the solution is not adjusted.

The weight of the cationic organic compound included in the coat layer is preferably 0.3 to 2.0 g/m² on a dry basis. When the weight is less than 0.3 g/m², the effects thereof to enhance image density while reducing the chance of occurrence of the feathering problem are hardly produced.

The coat layer optionally includes a surfactant such as anionic, cationic, ampholytic, and nonionic surfactants. Among these surfactants, nonionic surfactants are preferable. By adding a surfactant to the coat layer, the water-resistance, image density, and bleeding of images can be improved.

Specific examples of such nonionic surfactants include ethylene oxide adducts of higher alcohols, ethylene oxide adducts of alkylphenols, ethylene oxide adducts of fatty acids, ethylene oxide adducts of fatty acid esters of polyalcohols, ethylene oxide adducts of higher aliphatic amines, ethylene oxide adducts of fatty acid amides, ethylene oxide adducts of fats, ethylene oxide adducts of polypropylene glycol, fatty acid esters of glycerol, fatty acid esters of pentaerythritol, fatty acid esters of sorbitol and sorbitan, fatty acid esters of sucrose, alkyl ethers of polyalcohols, and alkanol amine-based fatty acid amides. These surfactants can be used alone or in combination.

The polyalcohols mentioned above for use in nonionic surfactants are not particularly limited, and specific examples thereof include glycerol, trimethylolpropane, pentaerythritol, sorbitol and sucrose. In addition, the ethylene oxide group of the above-mentioned ethylene oxide adducts is preferably substituted partially with propylene oxide or butylene oxide at a substitution rate such that the resultant surfactants can maintain water solubility. The substitution rate is preferably not greater than 50%.

The HLB of such nonionic surfactants for use in the coat layer is preferably 4 to 15, and more preferably from 7 to 13.

The added amount of such a surfactant in the coat layer is preferably not greater than 10 parts by weight, and more preferably from 0.1 to 1.0 part by weight, based on 100 parts by weight of the cationic organic compound included in the coat layer.

The coat layer can include other additives such as alumina powders, pH controlling agents, antiseptics, and antioxidants in such amounts that the additives do not diminish the effects of the present invention.

The method for forming the coat layer is not particularly limited, and any known methods capable of coating or impregnating a substrate with a coating liquid can be used. Coating or impregnating can be performed using coaters such as conventional size press coaters, gate roll size press coaters, film transfer size press coaters, blade coaters, rod coaters, air knife coaters, and curtain coaters. Among these coaters, conventional size press coaters, gate roll size press coaters, and film transfer size press coaters, which are set to paper manufacturing machines and which can coat or impregnate a substrate with a coating liquid on machine, are preferable from the viewpoint of manufacturing costs.

The coating weight of the coat layer is not particularly limited, and is preferably from 0.5 to 20 g/m², and more preferably from 1 to 15 g/m² on a dry basis.

After the coating or impregnating operation, the substrate may be dried if necessary. The drying temperature is not particularly limited, but is preferably from 100° C. to 250° C.

The recording medium may have a back layer on the backside thereof. In addition, an intermediate layer may be formed between the coat layer and the substrate, and between the substrate and the back layer. In addition, a protective layer may be formed on the coat layer. Each of the coat layer, the back layer, the intermediate layer, and the protective layer may be constituted of a single layer or multiple layers.

Next, the image forming method of the present invention will be described.

The image forming method includes a pretreatment process of adhering a pretreatment liquid to a coat layer located on at least one surface of a substrate of a recording medium; an image forming process of adhering an ink including a colorant, an organic solvent, a surfactant and water to the coat layer treated with the pretreatment liquid to form an image of the ink; and an aftertreatment process of adhering an aftertreatment liquid to the image-bearing surface of the recording medium to form a transparent protective layer on the surface of the recording medium. In the pretreatment process, the pretreatment liquid is applied to the recording medium by coating or spraying (i.e., ink jetting).

Suitable methods for use in the pretreatment process include coating methods capable of evenly coating a surface of a recording medium (such as printing papers) with a pretreatment liquid. Specific examples of the coating methods include blade coating methods, gravure coating methods, gravure offset coating methods, bar coating methods, roll coating methods, knife coating methods, air knife coating methods, comma coating methods (roll knife coating methods), U comma coating methods, AKKU coating methods, smoothing coating methods, microgravure coating methods, reverse roll coating methods, four- to five-roll coating methods, dip coating methods, curtain coating methods, slide coating methods, and die coating methods.

The pretreatment process can be performed on a dry recording medium or a wet recording medium (i.e., a recording medium in a drying process). The pretreated recording medium can be subjected to a drying process if necessary. Specific examples of the drying device for use in drying the pretreated recording medium include infrared driers, microwave driers, roll heaters, drum heaters, and hot air blowers.

The coating weight of the pretreatment liquid is preferably from 0.1 to 30.0 $g/m^2$, and more preferably from 0.2 to 10.0 $g/m^2$ on a wet basis. When the coating weight is less than 0.1 $g/m^2$, the effects to improve image qualities (such as image density, chroma, beading and color bleed) are hardly produced. In contrast, when the coating weight is greater than 30.0 $g/m^2$, the applied pretreatment liquid has poor drying property, and in addition the resultant recording medium tends to be curled.

Next, the image forming process will be described.

The image forming process is a process in which an ink image is formed on the surface of the recording medium, to which the pretreatment liquid has been adhered, by spraying (ejecting) an ink toward the surface. Any known inkjet recording methods can be used for the image forming process. Specific examples of such inkjet recording methods include serial inkjet recording methods in which images are formed on a recording medium sheet by scanning an inkjet recording head in a main scanning direction while feeding the recording medium sheet in a sub-scanning direction, and line inkjet recording methods in which images are formed on a recording medium sheet using a fixed line inkjet recording head while feeding the recording medium sheet in a sub-scanning direction.

The driving method for driving the inkjet recording head used for the image forming process is not particularly limited. Specific examples of the recording heads include on-demand recording heads, which eject inks using an actuator using a piezoelectric element (such as PZT), an actuator using heat energy, or an actuator using an electrostatic force; and continuous inkjet type charge controlling heads.

Next, the aftertreatment process will be described.

In the aftertreatment process, an aftertreatment liquid including a transparent resin is adhered to the image-bearing surface of the recording medium to form a protective layer on the surface.

The aftertreatment liquid may be adhered to the entire image-bearing surface of the recording medium or a specific portion of the image-bearing surface. The method for adhering the aftertreatment liquid to the recording medium is not particularly limited, and the coating methods mentioned above for use in applying the pretreatment liquid or spraying (ejecting) methods similar to the ink spraying (ejecting) methods mentioned above. Among these methods, spraying (ejecting) methods similar to the ink spraying (ejecting) methods mentioned above are preferable because the applicator is simple in structure and the aftertreatment liquid in the applicator has good preservability.

The coating weight of the aftertreatment liquid is preferably from 0.5 to 10 $g/m^2$, and more preferably from 2 to 8 $g/m^2$ on a dry basis. When the coating weight is less than 0.5 $g/m^2$, the effects to improve image qualities (such as image density, chroma, beading and color bleed) are hardly produced. In contrast, when the coating weight is greater than 10 $g/m^2$, the applied aftertreatment liquid has poor drying property, and the image quality improving effects cannot be further enhanced while increasing the running costs.

The image forming method of the present invention can further include a drying process of heating the recording medium, to which the aftertreatment liquid has been adhered, to dry the recording medium. Specific examples of the driers include infrared driers, microwave driers, roll heaters, drum heaters, and hot air blowers. In addition, the image forming method of the present invention can further include a fixing process of heating the recording medium to a temperature of from 100 to 150° C. after the aftertreatment process to smooth the surface of the recording medium while fixing the images and the protective layer to the recording medium, thereby improving the glossiness and fixability of the recorded images. Specific examples of the heaters include roll heaters and drum heaters, and the mirror-like surface (smooth surface) of the roller or drum of the roll heaters and drum heaters is contacted with the image-bearing surface of the recording medium. In this regard, the heating temperature is preferably not lower than the softening point of the thermoplastic resin included in the protective layer. Among these heaters, a fixing roller heated to a temperature of from 100 to 150° C. is preferably used. When the temperature is higher than 150° C., the resin used for the protective layer tends to degrade.

Examples of the printer for use in the image forming method of the present invention are illustrated in FIGS. 1-6.

FIGS. 1-6 illustrate the entire structure of the printer. The printer performs a pretreatment process in which a pretreatment liquid is adhered to a recording medium 1 by a pretreating device 2; an image forming process in which an ink is ejected by a recording head 3 to form an image on the recording medium 1; an aftertreatment process in which an aftertreatment liquid is adhered to the image portion of the recording medium 1 by an aftertreating device 5; an optional drying process in which the recording medium 1 is forcibly dried by a drier; and an optional fixing process in which the recording medium 1 is subjected to a fixing treatment using a fixing device. Numerals 4, 7 and 8 respectively denote a feeding belt; a recording medium which has been subjected to the pretreatment process and on which an image is formed; and a recording medium which has been subjected to the pretreatment process, the image forming process, and the aftertreatment process.

Figure 2:
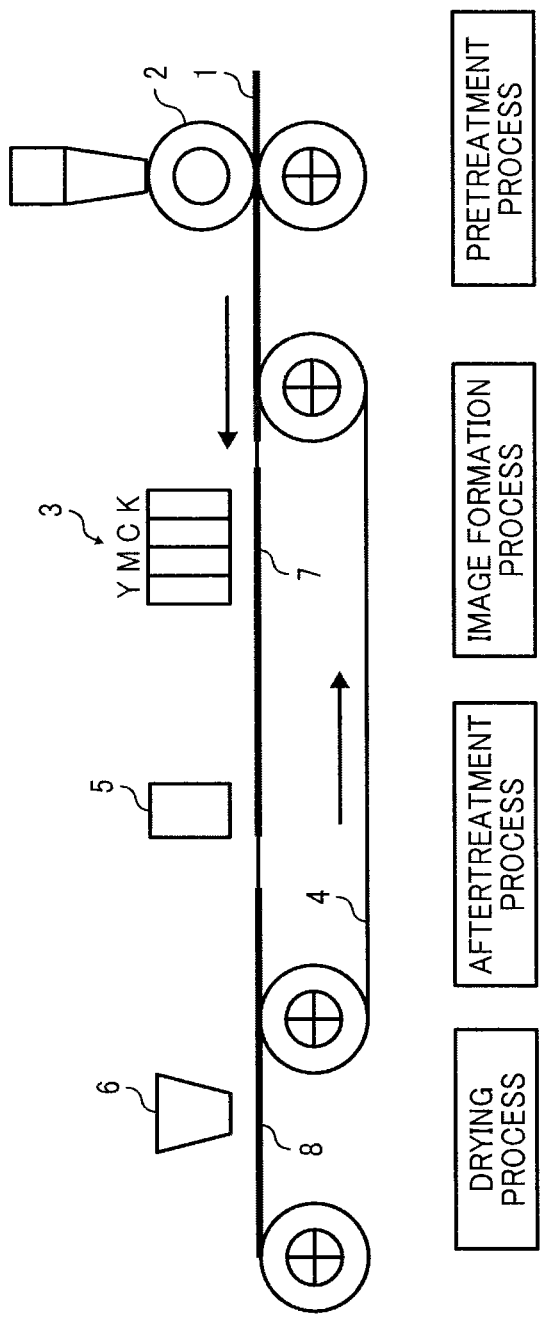
FIG. 2 is a schematic view illustrating another inkjet printer for use in the image forming method of the present invention, which performs hot air drying.
Figure 3:
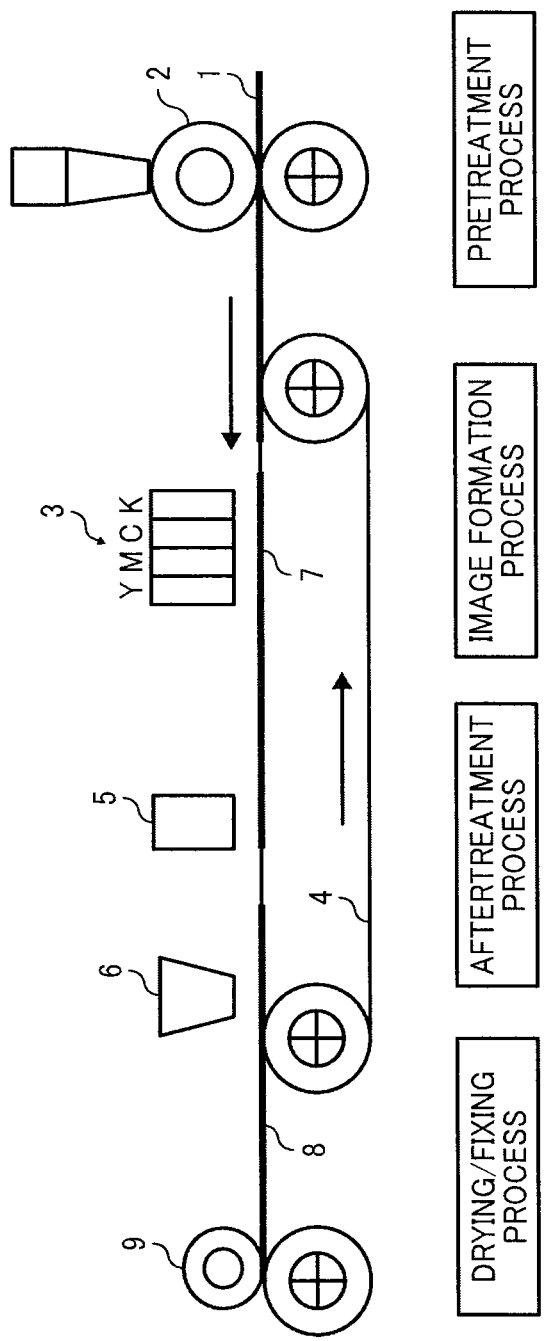
FIG. 3 is a schematic view illustrating another inkjet printer for use in the image forming method of the present invention, which performs hot air drying and heat roller fixing.
Figure 4:
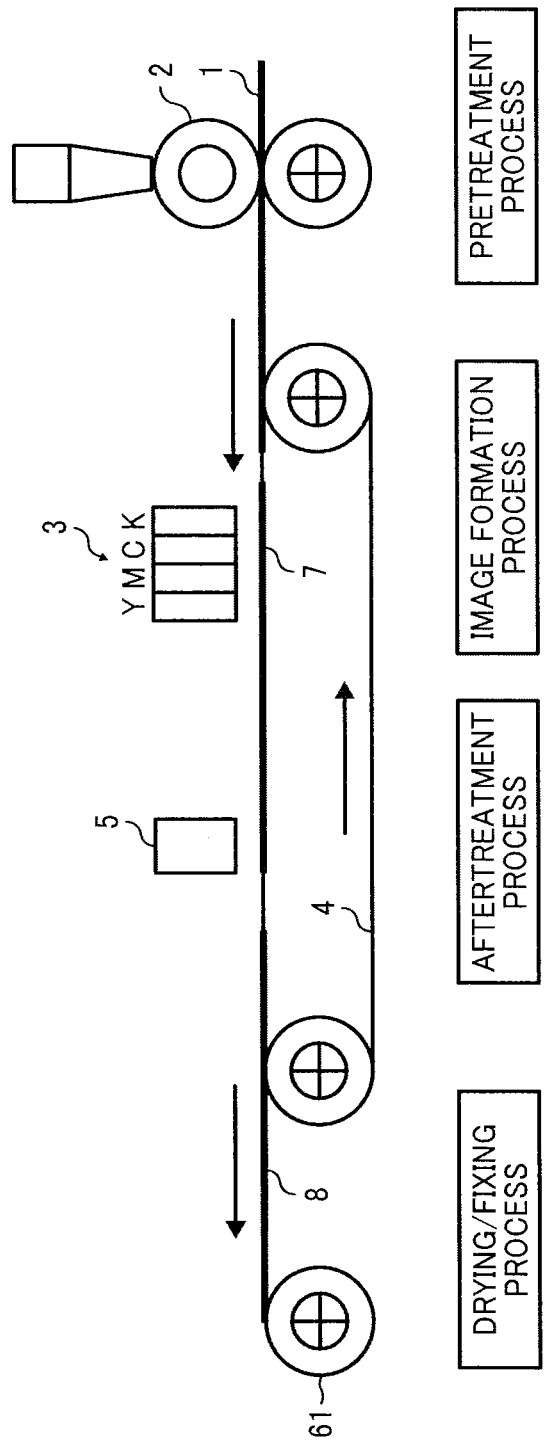
FIG. 4 is a schematic view illustrating another inkjet printer for use in the image forming method of the present invention, which performs heat roller drying.
Figure 5:
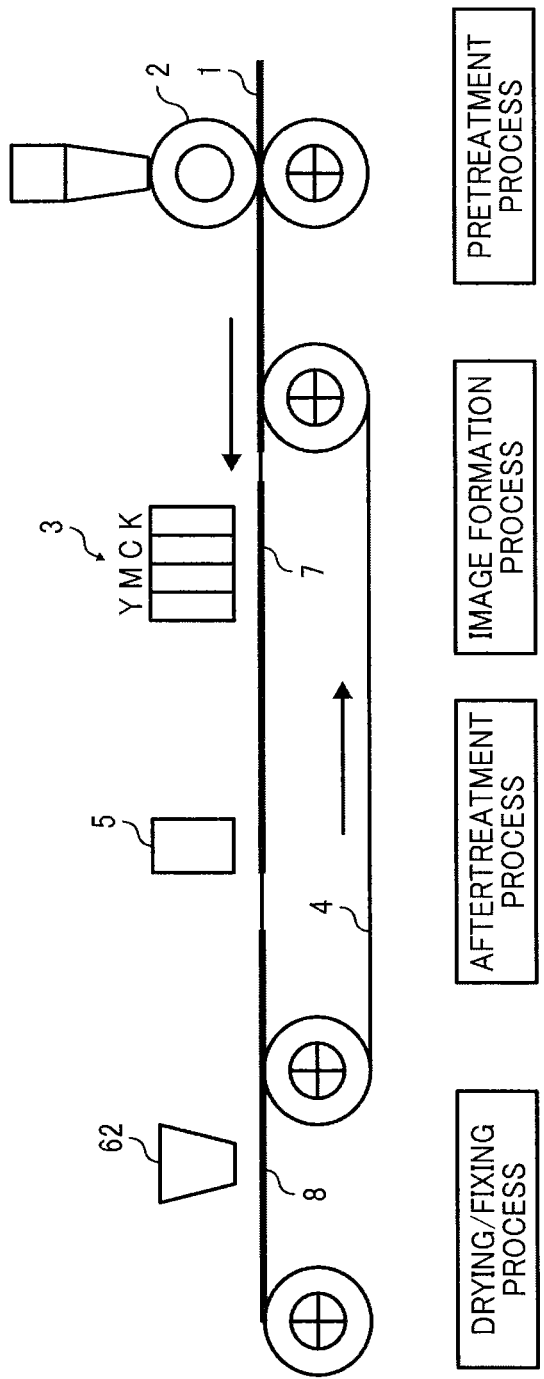
FIG. 5 is a schematic view illustrating another inkjet printer for use in the image forming method of the present invention, which performs infrared irradiation drying.
Figure 6:
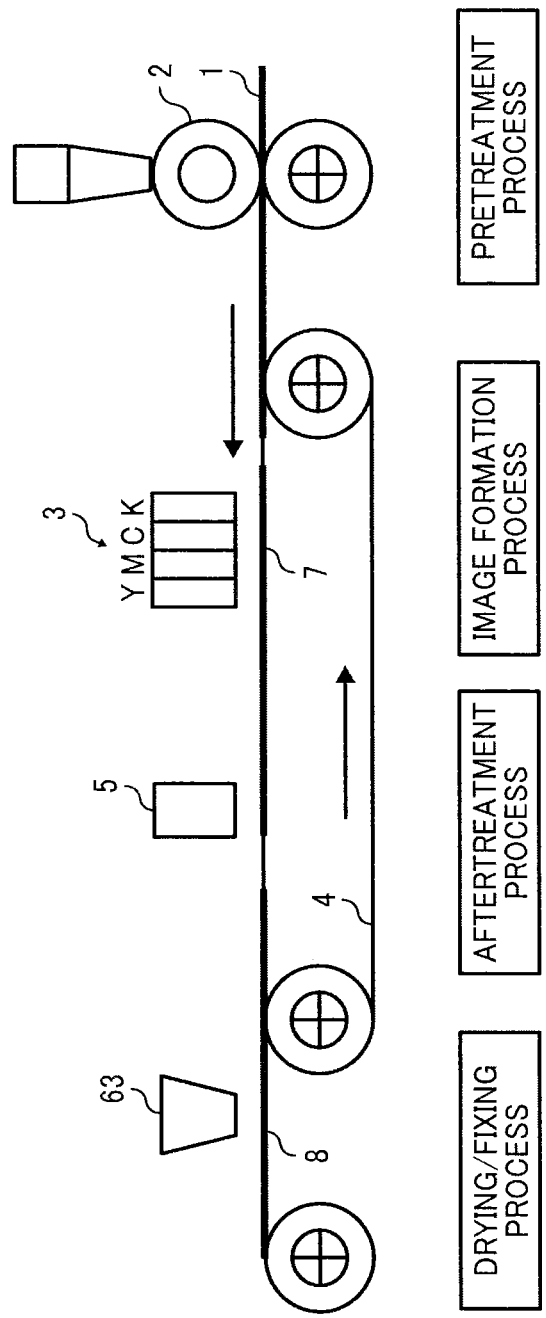
FIG. 6 is a schematic view illustrating another inkjet printer for use in the image forming method of the present invention, which performs microwave drying.

Specifically, in FIG. 1, natural drying is performed after the aftertreatment process. In FIG. 2, hot air drying is performed by a drier 6. In FIG. 3, hot air drying is performed by the drier 6, and a fixing process is performed using a heat fixing roller 9. In FIG. 4, a drying/fixing process is performed using a heat roller 61. In FIG. 5, a drying/fixing process is performed by an infrared irradiator 62. In FIG. 6, a drying/fixing process is performed by a microwave irradiator 63.

The pretreatment process is preferably performed continuously at a constant linear velocity of from 10 to 5,000 mm/s. In these examples, a recording medium sheet is used, and after the pretreatment process is completely performed on the recording medium sheet, the recording medium starts to be subjected to the image forming process, in which images are formed on the recording medium sheet by an inkjet recording method. In this method, since the pretreatment liquid application speed is typically different from the image forming speed, the period of time between the pretreatment liquid application time and the image formation time is different for the front end portion of the image and the rear end portion of the image on the recording medium sheet. Even when this time difference is considerably large, evaporation of water from the pretreatment liquid applied to the recording medium sheet is prevented because the pretreatment liquid includes a hydrophilic solvent having a higher boiling point and a lower evaporation speed than water in a large amount, and the pretreatment liquid is prepared so as to include water in such an amount as to be equilibrium to water (moisture) included in the air surrounding the printer. Therefore, image qualities can be controlled to an extent such that there is no difference in image qualities between the front end portion of an image and the rear end portion of the image when the image is visually observed.

In the printers illustrated in FIGS. 1-6, after the pretreatment liquid is adhered to the recording medium sheet 1, the recording medium sheet has to be fed toward the recording head 3 by a feeding member such as rollers and guides, which is contacted with the recording medium sheet. In this regard, if the pretreatment liquid applied to the recording medium sheet is transferred to the feeding member, problems such that the function of the feeding member is decreased, and/or the feeding member is contaminated, thereby deteriorating the image qualities tend to occur. In order to prevent occurrence of such problems, it is preferable for the printer to use a waved guide, a spur-shaped roller, and/or a roller whose surface is made of a water repellent material.

However, it is preferable that the pretreatment liquid adhered to the recording medium is absorbed by the recording medium as quickly as possible, and the recording medium seems to be dried apparently. In order to attain this object, the pretreatment liquid preferably has a static surface tension of not greater than 30 mN/m so that the liquid quickly penetrates into the recording medium. In this regard, the above-mentioned "apparent drying" of the pretreatment liquid is different from "drying/solidification" of the pretreatment liquid, in which liquids (such as water and organic solvents) included in the pretreatment liquid are evaporated, and the pretreatment liquid cannot maintain a liquid state and achieves a solid state. Therefore, by using a printer having a combination of a pretreatment applicator (such as the pretreating device 2) and an image forming device (such as the recording head 3), inkjet recoding can be performed on the recording medium sheet 1 even when the pretreatment liquid is absorbed by the recording medium sheet, and the recording medium sheet achieves the apparent drying state because the pretreatment liquid is not solidified. Therefore, even when the coating weight of the pretreatment liquid is considerably low, the image qualities can be dramatically improved.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Preparation of Inkjet Inks

Preparation Example 1

Preparation of Water-Soluble Polymer Solution A

The following components (1)-(3) were agitated by an agitator while heated to dissolve the copolymer (1).

| | |
|---|---|
| (1) α-olefin - maleic anhydride copolymer having the below-mentioned formula (a) | 10.0 parts |

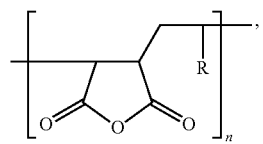

(a)

wherein R is an alkyl group having 18 to 22 carbon atoms, and n is an integer of from 30 to 100.

| | |
|---|---|
| (i.e., T-YP112 from Seiko PMC Corp., having an acid value of 190 mgKOH/g, and a weight average molecular weight of 100,000) | |
| (2) 1N aqueous solution of LiOH (1.2 times the acid value of the copolymer (1)) | 17.34 parts |
| (3) Ion exchange water | 72.66 parts |

The mixture was filtered using a filter having openings with an average diameter of 4 μm to prepare a water-soluble polymer solution A.

In this regard, the copolymer (1) was prepared using an olefin having 20 to 24 carbon atoms, and has a structure such that the alkyl groups (R) having 18 to 22 carbon atoms (among the 20 to 24 carbon atoms of the olefin, two carbon atoms connected with a double bond are incorporated into the polymer chain) are randomly connected with the polymer chain.

Preparation Example 2

Preparation of Surface-Treated Black Pigment Dispersion

Ninety (90) grams of a carbon black having a CTAB specific surface area of 150 m²/g, and a DBP oil absorption of 100 ml/100 g was added to 3,000 ml of a 2.5N solution of sodium sulfate, and the mixture was heated to 60° C. while agitated for 10 hours at a speed of 300 rpm to perform an oxidation reaction. The reaction product was filtered, and the obtained carbon black was mixed with an aqueous solution of sodium hydroxide to neutralize the carbon black, followed by ultrafiltration.

After the carbon black was washed with water, the carbon black was dried. The dried carbon black was dispersed in pure water while fully agitated to prepare a carbon black pigment dispersion. The carbon black pigment dispersion had a volume average particle diameter (D50) of 103 nm when the volume average particle diameter was measured with a particle diameter distribution measuring instrument, NANOTRACK UPA-EX150 from Nikkiso Co., Ltd.

Preparation Example 3

Preparation of Magenta-Pigment Containing Polymer Dispersion (1) Preparation of Polymer Solution A After air in the inside of a 1-litter flask, which is equipped with a mechanical agitator, a thermometer, a nitrogen gas feed pipe, a reflux tube, and a dropping funnel, was substituted with a nitrogen gas, the following components were fed thereto to prepare a mixture.

| | |
|---|---|
| Styrene | 11.2 g |
| Acrylic acid | 2.8 g |
| Lauryl methacrylate | 12.0 g |
| Polyethylene glycol methacrylate | 4.0 g |
| Styrene macromer | 4.0 g |
| Mercaptoethanol | 0.4 g |

The mixture was heated to 65° C.

Next, the following components were mixed and the mixture was dropped into the flask over 2.5 hours using the dropping funnel.

| | |
|---|---|
| Styrene | 100.8 g |
| Acrylic acid | 25.2 g |
| Lauryl methacrylate | 108.0 g |
| Polyethylene glycol methacrylate | 36.0 g |
| Hydroxyethyl methacrylate | 60.0 g |
| Styrene macromer | 36.0 g |
| Mercaptoethanol | 3.6 g |
| Azobismethylvaleronitrile | 2.4 g |
| Methyl ethyl ketone | 18.0 g |

Thereafter, a mixture of 0.8 g of azobismethylvaleronitrile and 18.0 g of methyl ethyl ketone was dropped into the flask over 0.5 hours using the dropping funnel.

After the reaction product in the flask was aged for 1 hour at 65° C., 0.8 g of azobismethylvaleronitrile was fed into the flask, and the mixture was further aged for 1 hour.

After the reaction was completed, 364.0 g of methyl ethyl ketone was fed into the flask. Thus, 800 g of a polymer solution A having a solid content of 50% by weight was prepared.

(2) Preparation of Magenta Pigment-Containing Polymer Dispersion

The following components were mixed by agitation.

| | |
|---|---|
| Polymer solution A prepared above | 28 g |
| C.I. Pigment Red 122 | 42 g |
| 1 mole/l aqueous solution of potassium hydroxide | 13.6 g |
| Methyl ethyl ketone | 20.0 g |
| Ion exchange water | 13.6 g |

The mixture was kneaded using a roll mill. The thus prepared paste was fed into 200 g of pure water, and the mixture was fully agitated. Thereafter, methyl ethyl ketone and water were distilled away from the mixture using an evaporator to prepare a dispersion. Further, the dispersion was subjected to pressure-filtering using a polyvinylidene fluoride membrane filter having an average pore diameter of 5.0 μm to remove coarse particles. Thus, a magenta pigment-containing polymer dispersion having a pigment content of 15% by weight, and a solid content of 20% by weight was prepared. The volume average particle diameter (D50) of the particulate polymer in the dispersion, which was measured by the method mentioned above in Preparation Example 2, was 127 nm.

Preparation Example 4

Preparation of Cyan Pigment-Containing Polymer Dispersion

The procedure for preparation of the magenta pigment-containing polymer dispersion in Preparation Example 3 was repeated except that the pigment was replaced with a phthalocyanine pigment (C.I. Pigment Blue 15:3) to prepare a cyan pigment-containing polymer dispersion. The volume average particle diameter (D50) of the particulate polymer in the dispersion, which was measured by the method mentioned above in Preparation Example 2, was 93 nm.

Preparation Example 5

Preparation of Yellow Pigment-Containing Polymer Dispersion

The procedure for preparation of the magenta pigment-containing polymer dispersion in Preparation Example 3 was repeated except that the pigment was replaced with a monoazo yellow pigment (C.I. Pigment Yellow 74) to prepare a yellow pigment-containing polymer dispersion. The volume average particle diameter (D50) of the particulate polymer in the dispersion, which was measured by the method mentioned above in Preparation Example 2, was 76 nm.

Preparation Example 6

Preparation of Black Pigment-Containing Polymer Dispersion

The procedure for preparation of the magenta pigment-containing polymer dispersion in Preparation Example 3 was repeated except that the pigment was replaced with a carbon black (FW100 from Degussa A.G.) to prepare a black pigment-containing polymer dispersion. The volume average particle diameter (D50) of the particulate polymer in the dispersion, which was measured by the method mentioned above in Preparation Example 2, was 104 nm.

Preparation Example 7

Preparation of Surfactant-Containing Yellow Pigment Dispersion

The below-mentioned surfactant (2) was dissolved in ion exchange water (3), and then the below-mentioned pigment (1) was mixed with the solution so that the pigment was fully wetted.

| | | |
|---|---|---|
| (1) | Monoazo yellow pigment (C.I. Pigment Yellow 74 from Dainichiseika Colour & Chemicals Mfg. Co., Ltd.) | 30.0 parts |
| (2) | Polyoxyethylenestyrene phenyl ether (Nonionic surfactant, NOIGEN EA-177 from Dai-ichi Kogyo Seiyaku Co., Ltd., having a HLB of 15.7) | 10.0 parts |
| (3) | Ion exchange water | 60.0 parts |

The mixture was then subjected to a dispersing treatment for 2 hours using a wet dispersing machine (DYNO MILL KDL A-type from WAB), which was filled with zirconia beads having a diameter of 0.5 mm and which was rotated at a revolution of 2,000 rpm. Thus, a primary pigment dispersion was prepared.

This primary pigment dispersion was mixed with 4.26 parts of an aqueous solution of a water-soluble polyurethane (TAKELAC W-5661 from Mitsui Chemicals Inc., having a solid content of 35.2%, an acid value of 40 mgKOH/g, and a weight average molecular weight of 18,000), and the mixture was fully agitated. Thus, a surfactant-containing yellow pigment dispersion was prepared.

The volume average particle diameter (D50) of the pigment in this pigment dispersion, which was measured by the method mentioned above in Preparation Example 2, was 62 nm.

Preparation Example 8

Preparation of Surfactant-Containing Magenta Pigment Dispersion

The below-mentioned surfactant (2) was dissolved in ion exchange water (3), and then the below-mentioned pigment (1) was mixed with the solution so that the pigment was fully wetted.

| | | |
|---|---|---|
| (1) | Quinacridone pigment (C.I. Pigment Red 122 from Dainichiseika Colour & Chemicals Mfg. Co., Ltd.) | 30.0 parts |
| (2) | Polyoxyethylene-β-naphthyl ether (Nonionic surfactant, RT-1000 from Takemoto Oil & Fat Co., Ltd., having a HLB of 18.5) | 10.0 parts |
| (3) | Ion exchange water | 60.0 parts |

The mixture was then subjected to a dispersing treatment for 2 hours using a wet dispersing machine (DYNO MILL KDL A-type from WAB), which was filled with zirconia beads having a diameter of 0.5 mm and which was rotated at a revolution of 2,000 rpm. Thus, a primary pigment dispersion was prepared.

This primary pigment dispersion was mixed with 7.14 parts of an aqueous solution of a water-soluble styrene-(meth) acrylic acid copolymer (JC-05 from Seiko PMC Corp., having a solid content of 21%, an acid value of 170 mgKOH/g, and a weight average molecular weight of 16,000), and the mixture was fully agitated. Thus, a surfactant-containing magenta pigment dispersion was prepared.

The volume average particle diameter (D50) of the pigment in this pigment dispersion, which was measured by the method mentioned above in Preparation Example 2, was 83 nm.

Preparation Example 9

Preparation of Surfactant-Containing Cyan Pigment Dispersion

The below-mentioned surfactant (2) was dissolved in ion exchange water (3), and then the below-mentioned pigment (1) was mixed with the solution so that the pigment was fully wetted.

| | | |
|---|---|---|
| (1) | Phthalocyanine pigment (C.I. Pigment Blue 15:3 from Dainichiseika Colour & Chemicals Mfg. Co., Ltd.) | 30.0 parts |
| (2) | Polyoxyethylenestyrene phenyl ether (Nonionic surfactant, NOIGEN EA-177 from Dai-ichi Kogyo Seiyaku Co., Ltd., having a HLB of 15.7) | 10.0 parts |
| (3) | Ion exchange water | 60.0 parts |

The mixture was then subjected to a dispersing treatment for 2 hours using a wet dispersing machine (DYNO MILL KDL A-type from WAB), which was filled with zirconia beads having a diameter of 0.5 mm and which was rotated at a revolution of 2,000 rpm. Thus, a primary pigment dispersion was prepared.

This primary pigment dispersion was mixed with 7.51 parts of the above-prepared aqueous polymer solution A prepared in Preparation Example 1 and 2.51 parts of a water-soluble polyester resin (NICHIGO POLYESTER W-0030 from Nippon Synthetic Chemical Industry Co. Ltd., having a solid content of 29.9%, an acid value of 100 mgKOH/g, and a weight average molecular weight of 7,000), and the mixture was fully agitated. Thus, a surfactant-containing cyan pigment dispersion was prepared.

The volume average particle diameter (D50) of the pigment in this pigment dispersion, which was measured by the method mentioned above in Preparation Example 2, was 78 nm.

Manufacturing Examples 1-26

Preparation of Inks 1-26

As illustrated in Tables 1-4 below, organic solvents (such as compounds having formula (I)-(IV), an amide compound having formula (I-1), alkylalkanediols, and polyalcohols), a penetrant, a surfactant, an antiseptic, and water were mixed, and the mixture was agitated for 1 hour so as to be mixed well. In this regard, a water-dispersing resin was optionally added to the mixture, and the mixture was agitated for 1 hour. Thereafter, a pigment dispersion, a defoaming agent, and a pH controlling agent were added to the mixture, and the mixture was agitated for 1 hour. The dispersion was subjected to pressure-filtering using a polyvinylidene fluoride membrane filter having an average pore diameter of 5.0 μm to remove coarse particles and foreign materials. Thus, inks of Manufacturing Examples 1-26 were prepared.

In Tables 1-4, the abbreviations and the like mean the following.

1. Acrylic-silicone resin emulsion: POLYSOL ROY6312 from Showa Denko K.K., having a solid content of 37.2% by weight, a volume average particle diameter of 171 nm, and a minimum film forming temperature (MFT) of 20° C.

2. Polyurethane emulsion: HYDRAN APX-101H from DIC Corp., having a solid content of 45% by weight, a volume average particle diameter of 160 nm, and a minimum film forming temperature (MFT) of 20° C.

3. KF-643: Polyether-modified silicone compound from Shi-Etsu Chemical Co., Ltd., including the active ingredient at 100% by weight.

4. ZONYL FS-300: Polyoxyethylene perfluoroalkyl ether (from Du Pont, including the active ingredient at 40% by weight)

5. SOFTANOL EP-7025: Polyoxyalkylene alkyl ether (from Nippon Shokubai Co., Ltd., including the active ingredient at 40% by weight)

6. PROXEL GXL: Antiseptic including 1,2-benzothiazoline-3-one as a main component (from Avecia Inc., including the active ingredient at 20%, and including dipropylene glycol)

7. KM-72F: Self emulsification type silicone defoaming agent (from Shin-Etsu Chemical Co., Ltd., including the active ingredient at 100%)

TABLE 1

| Components (% by weight) | | | Mfg. Ex. 1 | Mfg. Ex. 2 | Mfg. Ex. 3 | Mfg. Ex. 4 | Mfg. Ex. 5 | Mfg. Ex. 6 | Mfg. Ex. 7 |
|---|---|---|---|---|---|---|---|---|---|
| Pigment dispersion | Surface-treated black pigment dispersion of Preparation Example 2 | | — | — | — | — | — | — | — |
| | Magenta pigment-containing polymer dispersion of Preparation Example 3 | | — | — | — | — | — | — | — |
| | Cyan pigment-containing polymer dispersion of Preparation Example 4 | | — | — | — | — | 33.33 | 33.33 | 33.33 |
| | Yellow pigment-containing polymer dispersion of Preparation Example 5 | | — | — | — | — | — | — | — |
| | Black pigment-containing polymer dispersion of Preparation Example 6 | | 50.00 | 50.00 | 50.00 | 50.00 | — | — | — |
| | Surfactant-containing yellow pigment dispersion of Preparation Example 7 | | — | — | — | — | — | — | — |
| | Surfactant-containing magenta pigment dispersion of Preparation Example 8 | | — | — | — | — | — | — | — |
| | Surfactant-containing cyan pigment dispersion of Preparation Example 9 | | — | — | — | — | — | — | — |
| Water-dispersing resin | Acrylic-silicone resin emulsion | | — | — | — | — | — | — | — |
| | Polyurethane emulsion | | — | — | — | — | — | — | — |
| Organic solvent | Compounds (I)-(IV) | Amide compound (I-2) | 10.00 | 10.00 | 10.00 | 10.00 | 10.00 | 10.00 | 10.00 |
| | | Compound (II-1) | — | — | 10.00 | — | — | — | — |
| | | Compound (III-1) | 10.00 | 10.00 | — | — | 10.00 | 10.00 | 10.00 |
| | | Compound (IV-5) | — | — | — | 10.00 | — | — | — |
| | Amide compound (I-1) | | — | 5.00 | 10.00 | 10.00 | — | — | 5.00 |
| | Alkyl-alkanediol | 2-ethyl-1,3-hexanediol | — | — | — | — | — | — | — |
| | | 2-methyl-1,3-butanediol | — | — | — | — | — | — | — |
| | | 3-methyl-1,3-butanediol | — | — | — | — | — | — | — |
| | | 3-methyl-1,5-pentanediol | — | — | — | — | — | — | — |
| | Polyalcohol | Propylene glycol | — | — | — | — | — | — | — |
| | | Glycerin | 10.00 | 10.00 | 15.00 | 15.00 | 10.00 | 10.00 | 10.00 |
| | | 1,3-butanediol | 10.00 | 10.00 | — | — | 15.00 | 15.00 | 15.00 |
| Penetrant | 2-ethyl-1,3-hexanediol | | 2.00 | 2.00 | 2.00 | 2.00 | — | — | 2.00 |
| | 2,2,4-trimethyl-1,3-pentanediol | | — | — | — | — | — | 2.00 | — |
| Surfactant | KF-643 | | — | — | — | — | — | — | — |
| | ZONYL FS-300 | | 2.50 | 2.50 | 2.50 | 2.50 | 1.25 | 1.25 | 1.25 |
| | SOFTANOL EO-7025 | | — | — | — | — | — | — | — |
| Antiseptic | PROXEL GXL | | 0.05 | 0.05 | 0.05 | 0.05 | 0.05 | 0.05 | 0.05 |
| Defoaming agent | Silicone defoaming agent KM-72F | | 0.10 | 0.10 | 0.10 | 0.10 | 0.10 | 0.10 | 0.10 |
| pH controlling agent | 2-amino-2-ethyl-1,3-propanediol | | 0.3 | 0.3 | 0.3 | 0.3 | 0.3 | 0.3 | 0.3 |
| Pure water | | | Balance | Balance | Balance | Balance | Balance | Balance | Balance |
| Total (% by weight) | | | 100 | 100 | 100 | 100 | 100 | 100 | 100 |

TABLE 2

| Components (% by weight) | | | Mfg. Ex. 8 | Mfg. Ex. 9 | Mfg. Ex. 10 | Mfg. Ex. 11 | Mfg. Ex. 12 | Mfg. Ex. 13 | Mfg. Ex. 14 |
|---|---|---|---|---|---|---|---|---|---|
| Pigment dispersion | Surface-treated black pigment dispersion of Preparation Example 2 | | — | — | — | — | 30.00 | — | — |
| | Magenta pigment-containing polymer dispersion of Preparation Example 3 | | — | — | — | 53.33 | — | — | — |
| | Cyan pigment-containing polymer dispersion of Preparation Example 4 | | 33.33 | — | — | — | — | — | — |
| | Yellow pigment-containing polymer dispersion of Preparation Example 5 | | — | 33.33 | 33.33 | — | — | — | — |
| | Black pigment-containing polymer dispersion of Preparation Example 6 | | — | — | — | — | — | — | — |
| | Surfactant-containing yellow pigment dispersion of Preparation Example 7 | | — | — | — | — | — | 13.90 | — |
| | Surfactant-containing magenta pigment dispersion of Preparation Example 8 | | — | — | — | — | — | — | 28.57 |
| | Surfactant-containing cyan pigment dispersion of Preparation Example 9 | | — | — | — | — | — | — | — |
| Water-dispersing resin | Acrylic-silicone resin emulsion | | — | — | — | — | — | 5.38 | 5.38 |
| | Polyurethane emulsion | | — | — | — | — | — | — | — |
| Organic solvent | Compounds (I)-(IV) | Amide compound (I-2) | 10.00 | 20.00 | 30.00 | 10.00 | 12.50 | 15.00 | 7.50 |
| | | Compound (II-1) | — | — | — | — | — | — | — |
| | | Compound (III-1) | 10.00 | — | — | 7.50 | — | 10.00 | — |
| | | Compound (IV-5) | — | 10.00 | 5.00 | — | 10.00 | — | 10.00 |
| | Amide compound (I-1) | | 5.00 | 5.00 | 5.00 | 5.00 | 7.50 | 10.00 | 5.00 |
| | Alkyl-alkane-diol | 2-ethyl-1,3-hexanediol | — | — | — | 10.00 | — | — | — |
| | | 2-methyl-1,3-butanediol | — | — | — | — | 15.00 | — | — |
| | | 3-methyl-1,3-butanediol | 15.00 | — | — | — | — | — | — |
| | | 3-methyl-1,5-pentanediol | — | — | — | — | — | 20.00 | — |
| | Polyalcohol | Propylene glycol | — | — | — | — | — | — | — |
| | | Glycerin | 10.00 | 10.00 | 10.00 | 10.00 | 10.00 | 10.00 | 10.00 |
| | | 1,3-butanediol | — | 15.00 | — | — | — | — | 14.00 |
| Penetrant | 2-ethyl-1,3-hexanediol | | 2.00 | — | 1.00 | 2.00 | 2.00 | 2.00 | 2.00 |
| | 2,2,4-trimethyl-1,3-pentanediol | | — | 2.00 | 1.00 | — | — | — | — |
| Surfactant | KF-643 | | — | — | — | 1.00 | 1.00 | 1.00 | 1.00 |
| | ZONYL FS-300 | | 1.25 | 1.25 | 1.25 | — | — | — | — |
| | SOFTANOL EO-7025 | | — | — | — | — | — | — | — |
| Antiseptic | PROXEL GXL | | 0.05 | 0.05 | 0.05 | 0.05 | 0.05 | 0.05 | 0.05 |
| Defoaming agent | Silicone defoaming agent KM-72F | | 0.10 | 0.10 | 0.10 | 0.10 | 0.10 | 0.10 | 0.10 |
| pH controlling agent | 2-amino-2-ethyl-1,3-propanediol | | 0.3 | 0.3 | 0.3 | 0.3 | 0.3 | 0.3 | 0.3 |
| Pure water | | | Balance | Balance | Balance | Balance | Balance | Balance | Balance |
| Total (% by weight) | | | 100 | 100 | 100 | 100 | 100 | 100 | 100 |

TABLE 3

| Components (% by weight) | | | Mfg. Ex. 15 | Mfg. Ex. 16 | Mfg. Ex. 17 | Mfg. Ex. 18 | Mfg. Ex. 19 | Mfg. Ex. 20 | Mfg. Ex. 21 |
|---|---|---|---|---|---|---|---|---|---|
| Pigment dispersion | Surface-treated black pigment dispersion of Preparation Example 2 | | — | — | — | — | 26.67 | 30.00 | — |
| | Magenta pigment-containing polymer dispersion of Preparation Example 3 | | — | — | — | — | — | — | — |
| | Cyan pigment-containing polymer dispersion of Preparation Example 4 | | — | — | — | — | — | — | — |
| | Yellow pigment-containing polymer dispersion of Preparation Example 5 | | — | — | — | — | — | — | — |
| | Black pigment-containing polymer dispersion of Preparation Example 6 | | — | 50.00 | — | 50.00 | — | — | 55.33 |
| | Surfactant-containing yellow pigment dispersion of Preparation Example 7 | | — | — | — | — | — | — | — |
| | Surfactant-containing magenta pigment dispersion of Preparation Example 8 | | — | — | — | — | — | — | — |
| | Surfactant-containing cyan pigment dispersion of Preparation Example 9 | | 14.67 | — | 14.67 | — | — | — | — |
| Water-dispersing resin | Acrylic-silicone resin emulsion | | 5.38 | — | — | — | — | — | — |
| | Polyurethane emulsion | | — | — | 4.44 | — | — | — | — |
| Organic solvent | Compounds (I)–(IV) | Amide compound (I-2) | 7.50 | 3.00 | 10.00 | — | — | — | — |
| | | Compound (II-1) | — | — | — | — | — | — | — |
| | | Compound (III-1) | — | 5.00 | 3.00 | — | — | — | — |
| | | Compound (IV-5) | 10.00 | — | — | — | — | — | — |
| | Amide compound (I-1) | | 5.00 | 5.00 | 50.00 | — | 10.00 | — | — |
| | Alkyl-alkane-diol | 2-ethyl-1,3-hexanediol | — | — | — | — | — | — | — |
| | | 2-methyl-1,3-butanediol | — | 10.00 | — | — | 7.50 | 7.50 | 27.50 |
| | | 3-methyl-1,3-butanediol | — | 5.00 | — | — | — | — | — |
| | | 3-methyl-1,5-pentanediol | — | — | — | — | — | — | — |
| | Polyalcohol | Propylene glycol | — | 7.50 | — | — | — | — | 5.00 |
| | | Glycerin | 10.00 | — | 10.00 | 17.50 | 20.00 | 30.00 | — |
| | | 1,3-butanediol | 17.00 | — | — | 17.50 | 7.50 | 15.00 | 10.00 |
| Penetrant | 2-ethyl-1,3-hexanediol | | 2.00 | 2.00 | — | 2.00 | 2.00 | 1.00 | — |
| | 2,2,4-trimethyl-1,3-pentanediol | | — | — | 2.00 | — | — | — | — |
| Surfactant | KF-643 | | 1.00 | — | — | — | — | — | 1.00 |
| | ZONYL FS-300 | | — | 2.50 | — | 2.50 | 2.50 | 1.25 | — |
| | SOFTANOL EO-7025 | | — | — | 0.50 | — | — | — | — |
| Antiseptic | PROXEL GXL | | 0.05 | 0.05 | 0.05 | 0.05 | 0.05 | 0.05 | 0.05 |
| Defoaming agent | Silicone defoaming agent KM-72F | | 0.10 | 0.10 | 0.10 | 0.10 | 0.10 | 0.10 | 0.10 |
| pH controlling agent | 2-amino-2-ethyl-1,3-propanediol | | 0.3 | 0.3 | 0.3 | 0.3 | 0.3 | 0.3 | 0.3 |
| Pure water | | | Balance | Balance | Balance | Balance | Balance | Balance | Balance |
| Total (% by weight) | | | 100 | 100 | 100 | 100 | 100 | 100 | 100 |

TABLE 4

| Components (% by weight) | | | Mfg. Ex. 22 | Mfg. Ex. 23 | Mfg. Ex. 24 | Mfg. Ex. 25 | Mfg. Ex. 26 |
|---|---|---|---|---|---|---|---|
| Pigment dispersion | Surface-treated black pigment dispersion of Preparation Example 2 | | — | — | — | — | — |
| | Magenta pigment-containing polymer dispersion of Preparation Example 3 | | — | — | — | — | — |
| | Cyan pigment-containing polymer dispersion of Preparation Example 4 | | — | — | — | — | — |
| | Yellow pigment-containing polymer dispersion of Preparation Example 5 | | — | — | — | — | — |
| | Black pigment-containing polymer dispersion of Preparation Example 6 | | 50.00 | 50.00 | 50.00 | 50.00 | 50.00 |
| | Surfactant-containing yellow pigment dispersion of Preparation Example 7 | | — | — | — | — | — |
| | Surfactant-containing magenta pigment dispersion of Preparation Example 8 | | — | — | — | — | — |
| | Surfactant-containing cyan pigment dispersion of Preparation Example 9 | | — | — | — | — | — |
| Water-dispersing resin | Acrylic-silicone resin emulsion | | — | — | — | — | — |
| | Polyurethane emulsion | | — | — | — | — | — |
| Organic solvent | Compounds (I)-(IV) | Amide compound (I-2) | 10.00 | — | — | — | — |
| | | Compound (II-1) | — | 10.00 | — | — | — |
| | | Compound (III-1) | — | — | 10.00 | — | — |
| | | Compound (IV-5) | — | — | — | 10.00 | — |
| | Amide compound (I-1) | | — | — | — | — | — |
| | Alkyl-alkanediol | 2-ethyl-1,3-hexanediol | — | — | — | — | — |
| | | 2-methyl-1,3-butanediol | — | — | — | — | — |
| | | 3-methyl-1,3-butanediol | — | — | — | — | 22.00 |
| | | 3-methyl-1,5-pentanediol | — | — | — | — | — |
| | Polyalcohol | Propylene glycol | — | — | — | — | — |
| | | Glycerin | 20.00 | 20.00 | 20.00 | 20.00 | 22.00 |
| | | 1,3-butanediol | 15.00 | 15.00 | 15.00 | 15.00 | — |
| Penetrant | 2-ethyl-1,3-hexanediol | | 2.00 | 2.00 | 2.00 | 2.00 | 2.00 |
| | 2,2,4-trimethyl-1,3-pentanediol | | — | — | — | — | — |
| Surfactant | KF-643 | | — | — | — | — | — |
| | ZONYL FS-300 | | 2.50 | 2.50 | 2.50 | 2.50 | 2.50 |
| | SOFTANOL EO-7025 | | — | — | — | — | — |
| Antiseptic | PROXEL GXL | | 0.05 | 0.05 | 0.05 | 0.05 | 0.05 |
| Defoaming agent | Silicone defoaming agent KM-72F | | 0.10 | 0.10 | 0.10 | 0.10 | 0.10 |
| pH controlling agent | 2-amino-2-ethyl-1,3-propanediol | | 0.3 | 0.3 | 0.3 | 0.3 | 0.3 |
| Pure water | | | Balance | Balance | Balance | Balance | Balance |
| Total (% by weight) | | | 100 | 100 | 100 | 100 | 100 |

The physical properties of the inks of Manufacturing Examples 1-26 were measured by the below-mentioned methods. The results are shown in Table 5 below.

1. Viscosity

The viscosity of an ink was measured at 25° C. using a viscometer RE-550L from Toki Sangyo Co., Ltd.

2. pH

The pH of an ink was measured at 25° C. using a pH meter, HM-30R from DKK-TOA Corp.

3. Static Surface Tension

The static surface tension of an ink was measured at 25° C. using a fully automatic surface tensiometer, CBVP-Z from Kyowa Interface Science Co., Ltd.

TABLE 5

| Inks | Viscosity (mPa·s) | pH | Static surface tension (mN/m) |
|---|---|---|---|
| Mfg. Ex. 1 | 16.5 | 9.5 | 24.6 |
| Mfg. Ex. 2 | 13.6 | 9.3 | 24.2 |
| Mfg. Ex. 3 | 13.8 | 9.6 | 24.1 |
| Mfg. Ex. 4 | 17.5 | 9.7 | 26.5 |
| Mfg. Ex. 5 | 17.2 | 9.4 | 25.7 |
| Mfg. Ex. 6 | 17.8 | 9.4 | 25.2 |
| Mfg. Ex. 7 | 15.6 | 9.7 | 24.7 |
| Mfg. Ex. 8 | 17.2 | 9.6 | 24.8 |
| Mfg. Ex. 9 | 18.7 | 9.8 | 27.6 |
| Mfg. Ex. 10 | 15.9 | 9.7 | 26.4 |
| Mfg. Ex. 11 | 18.3 | 9.5 | 22.8 |
| Mfg. Ex. 12 | 19.0 | 9.4 | 22.4 |
| Mfg. Ex. 13 | 19.5 | 9.7 | 23.1 |
| Mfg. Ex. 14 | 15.9 | 9.7 | 23.7 |
| Mfg. Ex. 15 | 16.2 | 9.7 | 23.8 |
| Mfg. Ex. 16 | 9.0 | 9.4 | 23.5 |
| Mfg. Ex. 17 | 18.1 | 9.7 | 32.2 |
| Mfg. Ex. 18 | 8.4 | 9.1 | 25.4 |
| Mfg. Ex. 19 | 10.9 | 9.3 | 25.7 |
| Mfg. Ex. 20 | 20.5 | 9.2 | 26.8 |
| Mfg. Ex. 21 | 26.7 | 9.3 | 22.9 |
| Mfg. Ex. 22 | 13.5 | 9.5 | 25.2 |
| Mfg. Ex. 23 | 15.9 | 9.6 | 25.3 |
| Mfg. Ex. 24 | 16.2 | 9.4 | 25.2 |
| Mfg. Ex. 25 | 17.0 | 9.3 | 25.5 |
| Mfg. Ex. 26 | 15.1 | 9.8 | 25.4 |

Preparation of Pretreatment Liquids

Pretreatment Liquid Preparation Examples 1-9

Each pretreatment liquid was prepared by the following method.

The components described in Table 6 below were mixed and agitated for 1 hour to prepare a mixture. The mixture was subjected to pressure-filtering using a polyvinylidene fluoride membrane filter having an average pore diameter of 5.0 μm to remove insoluble materials such as foreign materials. Thus, pretreatment liquids of Pretreatment Liquid Preparation Examples 1-9 were prepared.

TABLE 6

| Components (% by weight) | | 1 | 2 | 3 | 4 | 5 | 6 | 7 | 8 | 9 |
|---|---|---|---|---|---|---|---|---|---|---|
| Water-soluble aliphatic organic acid | L-lactic acid | 5.00 | — | — | 15.00 | — | — | — | — | 11.76 |
| | L-(+)-tartaric acid | — | 10.00 | — | — | 20.00 | — | — | — | — |
| | DL-malic acid | — | — | 15.00 | — | — | 10.0 | — | — | — |
| Water-Soluble organic mono-amine compound | 3-amino-1-propanol | — | 10.01 | — | — | 20.02 | — | — | — | — |
| | 2-amino-2-ethyl-1,3-propane-diol | 6.61 | — | 26.66 | — | — | 17.77 | — | — | — |
| | N,N-diethyl ethanol-amine | — | — | — | 23.42 | — | — | — | — | — |
| Inorganic metal salt compound | Magnesium sulfate | — | — | — | — | — | — | — | 10.00 | — |
| | Calcium nitrate | — | — | — | — | — | — | 10.00 | — | — |
| Wetting agent | 3-methyl-1,3-butane-diol | — | 10.00 | 15.00 | — | 5.00 | 5.00 | 10.00 | 20.00 | 10.00 |
| | Glycerin | 15.00 | 15.00 | 10.00 | — | 20.00 | 10.00 | 15.00 | 10.00 | 20.00 |
| Penetrant | 2-ethyl-1,3-hexanediol | 2.0 | 1.00 | 1.00 | — | — | 1.00 | 1.00 | — | 2.00 |
| Surfactant | ZONYL FS-300 | — | — | 2.50 | — | — | 2.50 | — | — | — |
| | FUTARGENT 251 | — | 1.00 | — | — | 1.00 | — | 1.00 | — | 0.50 |
| | KF-643 | — | — | — | 1.00 | — | — | — | — | — |
| Antiseptic | PROXEL GXL | 0.05 | 0.05 | 0.05 | 0.05 | 0.05 | 0.05 | 0.05 | 0.05 | 0.05 |
| Antirust agent | 1,2,3-benzotriazol | 0.10 | 0.10 | 0.10 | 0.10 | 0.10 | 0.10 | 0.10 | 0.10 | 0.10 |
| Pure water | | Balance | Balance | Balance | Balance | Balance | Balance | Balance | Balance | Balance |
| Total (% by weight) | | 100 | 100 | 100 | 100 | 100 | 100 | 100 | 100 | 100 |

The abbreviations and the like in Table 6 mean the following. ZONYL FS-300, KF-643, and PROXEL GXL are described above regarding Tables 1-4.

1. L-lactic acid (having one carboxyl group): L-lactic acid from Tokyo Kasei Chemical Industry Co., Ltd., having a purity of 85% or more, and including 3 carbon atoms.

2. L-(+)-tartaric acid (having two carboxyl groups): L-(+)-tartaric acid from Kanto Chemical Co., Inc., having a purity of 99.5% or more, and including 4 carbon atoms.

3. DL-malic acid (having two carboxyl groups): DL-malic acid from Kanto Chemical Co., Inc., having a purity of 99% or more, and including 5 carbon atoms.

4. FUTARGENT 251: Branched perfluoroalkenyl group-containing fluorine-containing surfactant from Neos Co., Ltd., including the active ingredient at 100%.

The physical properties of the pretreatment liquids of Manufacturing Examples 1-9 were measured by the below-mentioned methods.

1. pH

The pH of a pretreatment liquid was measured at 25° C. using a pH meter HM-30R from DKK-TOA Corp.

2. Static Surface Tension

The static surface tension of a pretreatment liquid was measured at 25° C. using a fully automatic surface tensiometer CBVP-Z from Kyowa Interface Science Co., Ltd.

In addition, the ratio (AM/AC) of an organic amine to an organic acid was calculated using the following equation:

AM/AC=(Number of moles of water-soluble organic monoamine)/((Number of moles of water-soluble aliphatic organic acid)×(Number of acid groups included in one molecule of the water-soluble aliphatic organic acid))

The results are shown in Table 7 below.

TABLE 7

| Pretreatment liquid | AM/AC | pH | Static surface tension (mN/m) |
|---|---|---|---|
| Preparation Ex. 1 | 1.18 | 8.11 | 52.6 |
| Preparation Ex. 2 | 1.0 | 7.41 | 22.8 |
| Preparation Ex. 3 | 1.0 | 7.55 | 22.4 |
| Preparation Ex. 4 | 1.4 | 8.72 | 21.6 |
| Preparation Ex. 5 | 1.0 | 7.69 | 23.5 |
| Preparation Ex. 6 | 1.0 | 7.83 | 24.3 |
| Preparation Ex. 7 | — | 3.01 | 21.6 |
| Preparation Ex. 8 | — | 7.04 | 55.2 |
| Preparation Ex. 9 | 0.0 | 1.80 | 22.2 |

Pretreatment Liquid Preparation Examples 10-20

The procedure for preparation of the pretreatment liquids in Pretreatment Liquid Preparation Examples 1-9 was repeated except that the components were replaced with the components described in Tables 8-1 and 8-2 below. Thus, pretreatment liquids of Pretreatment Liquid Preparation Examples 10-20 were prepared. In this regard, the water-soluble cationic polymers A-1 to A-5 were prepared as follows.

Preparation Example A-1

Preparation of Cationic Polymer

The cationic polymer is a copolymer of N,N-dimethylallylamine hydrochloride and N-methyldiallylamine hydrochloride (in a molar ratio of 0.7:0.3 in formula).

Initially, 237.58 g (1.4 moles) of a 71.66% aqueous solution of N,N-dimethylallylamine hydrochloride, and 147.23 g (0.6 moles) of a 60.17% aqueous solution of N-methyldiallylamine hydrochloride were fed into a 1-litter separable flask equipped with an agitator, a thermometer, and a reflux condenser to prepare an aqueous solution having a monomer concentration of 67.27%. After the aqueous solution was heated to 60° C. and the temperature became constant, 4.56 g (1.0% by mole based on the monomers) of ammonium persulfate serving as a radical polymerization initiator was added thereto to perform polymerization. In addition, 4.56 g (1.0% by mole based on the monomers) of ammonium persulfate was added thereto at times 2 hours and 4 hours after starting the polymerization. Further, 9.13 g (2.0% by mole based on the monomers) of ammonium persulfate was added thereto at times 23 hours, 24 hours, 25 hours, 26 hours, 27 hours and 29 hours after starting the polymerization. Thereafter, the polymerization reaction was further continued for 3 hours. Thus, a brown solution of a copolymer of N,N-dimethylallylamine hydrochloride and N-methyldiallylamine hydrochloride (in a molar ratio of 0.7:0.3 in formula) (i.e., cationic polymer solution of Preparation Example A-1) was prepared.

The weight average molecular weight of this copolymer, which was determined by a Gel Permeation Chromatography method, was 1,800.

Preparation Example A-2

Preparation of Cationic Polymer

The cationic polymer is a copolymer of N,N-dimethylallylamine hydrochloride and N-methyldiallylamine hydrochloride (in a molar ratio of 0.9:0.1 in formula).

Initially, 533.56 g (2.7 moles) of a 61.54% aqueous solution of N,N-dimethylallylamine hydrochloride, and 73.62 g (0.3 moles) of a 60.17% aqueous solution of N-methyldiallylamine hydrochloride were fed into a 1-litter separable flask equipped with an agitator, a thermometer, and a reflux condenser to prepare an aqueous solution having a monomer concentration of 61.37%. After the aqueous solution was heated to 60° C. and the temperature became constant, 6.85 g (1.0% by mole based on the monomers) of ammonium persulfate serving as a radical polymerization initiator was added thereto to perform polymerization. In addition, 6.85 g (1.0% by mole based on the monomers) of ammonium persulfate was added thereto at times 2 hours and 4 hours after starting the polymerization. Further, 13.69 g (2.0% by mole based on the monomers) of ammonium persulfate was added thereto at times 23 hours, 24 hours, 25 hours, 26 hours, 27 hours, 47 hours and 48 hours after starting the polymerization. Thereafter, the polymerization reaction was further continued for 2 hours. Thus, a brown solution of a copolymer of N,N-dimethylallylamine hydrochloride and N-methyldiallylamine hydrochloride (in a molar ratio of 0.9:0.1 in formula) (i.e., cationic polymer solution of Preparation Example A-2) was prepared.

The weight average molecular weight of this copolymer, which was determined by a Gel Permeation Chromatography method, was 700.

Preparation Example A-3

Preparation of Cationic Polymer

The cationic polymer is a copolymer of monoallylamine hydrochloride and N,N-dimethylallylamine hydrochloride (in a molar ratio of 0.5:0.5 in formula).

Initially, 64.87 g (0.50 moles) of a 72.11% aqueous solution of monoallylamine hydrochloride, 100.99 g (0.50 moles) of a 60.21% aqueous solution of N,N-dimethylallylamine hydrochloride, and 13.45 g of water were fed into a 300 ml three-necked flask equipped with an agitator, a thermometer, and a reflux condenser to prepare an aqueous solution having a monomer concentration of 60%. After the aqueous solution was heated to 60° C. and the temperature became constant, 8.68 g (3.2% by mole based on the monomers) of 2,2'-azobis (2-aminodipropane)dihydrochloride serving as a radical polymerization initiator was added thereto to perform polymerization. In addition, 8.68 g of 2,2'-azobis(2-aminodipropane)dihydrochloride was added thereto at times 24 hours, 48 hours and 72 hours after starting the polymerization. Thereafter, the polymerization reaction was continued for 24 hours. The thus prepared pale yellow reaction solution was fed into 3 litters of an acetone-isopropanol solution (in a weight ratio of 1:1) to precipitate the copolymer. After the copolymer was filtered using a glass filter, the copolymer was washed well, and then dried for 48 hours at 60° C. Thus, a brown solution of a copolymer of monoallylamine hydrochloride and N,N-dimethylallylamine hydrochloride (in a molar ratio of 0.5:0.5 in formula) (i.e., cationic polymer solution of Preparation Example A-3) was prepared.

The weight average molecular weight of this copolymer, which was determined by a Gel Permeation Chromatography method, was 800.

Preparation Example A-4

Preparation of Cationic Polymer

The cationic polymer is a copolymer of diallyldimethylamine hydrochloride and sulfur dioxide.

Initially, 100 ml of a 1-mol/l dimethylsulfoxide solution of diallyldimethylamine hydrochloride, and 100 ml of a 1-mol/l dimethylsulfoxide solution of sulfur dioxide were fed into a 300 ml four-necked flask equipped with an agitator, a thermometer, and a reflux condenser. After 0.82 g of azobisisobutyronitrile serving as a polymerization initiator was added thereto, polymerization was performed for 24 hours at 40° C.

The thus prepared reaction solution was dropped into methanol to precipitate the copolymer. After the copolymer was filtered using a glass filter, the copolymer was subjected to reduced-pressure drying. Thus, 18 g of a copolymer (i.e., cationic polymer of Preparation Example A-4) was prepared.

The weight average molecular weight of this copolymer, which was determined by a Gel Permeation Chromatography method using polyethylene glycol as a standard material, was about 3,000.

The copolymer has a repeat unit having the following formula (19).

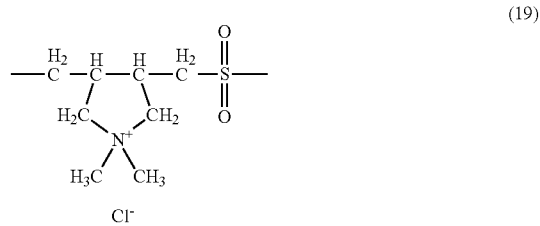

(19)

Preparation Example A-5

Preparation of Cationic Polymer

The cationic polymer is a copolymer of diallyldimethylammonium chloride and acrylamide.

Initially, 134.7 g (0.5 moles) of a 60% aqueous solution of diallyldimethylammonium chloride, and 176 g of distilled water were fed into a 500 ml four-necked flask equipped with an agitator, a thermometer, and a reflux condenser, and pH of the mixture was controlled so as to fall in a range of from 3 to 4 using hydrochloric acid. Next, 18.3 g (0.25 moles) of acrylamide and 3.9 g of sodium hypophosphite were added thereto, and the mixture was agitated at 50° C. to dissolve acrylamide and sodium hypophosphite. After the mixture was heated to 60° C., 1.7 g of a 28.5% aqueous solution of ammonium persulfate was added thereto. After the reaction was performed for 4 hours while controlling the temperature in a range of from 60° C. to 65° C., 3.5 g of a 28.5% aqueous solution of ammonium persulfate was further added thereto. The mixture was subjected to a reaction for 20 hours at 60° C. Thus, a diallyldimethylammonium chloride-acrylamide copolymer (i.e., cationic polymer of Preparation Example A-5) was prepared.

The weight average molecular weight of this copolymer, which was determined by a Gel Permeation Chromatography method, was 3,000.

TABLE 8-1

| Components (% by weight) | | Pretreatment Liquid Preparation Example | | | | | |
|---|---|---|---|---|---|---|---|
| | | 10 | 11 | 12 | 13 | 14 | 15 |
| Organic acid | Ammonium lactate | — | — | — | 6.67 | 6.67 | — |
| ammonium salt | Ammonium acetate | — | — | — | — | — | 5.15 |

TABLE 8-1-continued

| Components (% by weight) | | Pretreatment Liquid Preparation Example | | | | | |
|---|---|---|---|---|---|---|---|
| | | 10 | 11 | 12 | 13 | 14 | 15 |
| Water-soluble cationic polymer | A-1 | 20.00 | — | — | 20.00 | 20.00 | — |
| | A-2 | — | — | — | — | — | 20.00 |
| | A-3 | — | 40.00 | — | — | — | — |
| | A-4 | — | — | — | — | — | — |
| | A-5 | — | — | — | — | — | — |
| | WS-4020 | — | — | 40.00 | — | — | 20.00 |
| | SHALLOL DM-283P | — | — | — | — | — | — |
| Wetting agent | 3-methyl-1,3-butanediol | 10.00 | 10.00 | 20.00 | 10.00 | 10.00 | 10.00 |
| | Glycerin | 20.00 | 20.00 | 10.00 | 20.00 | 20.00 | 20.00 |
| Penetrant | 2-ethyl-1,3-hexanediol | 1.00 | 1.00 | 1.00 | 1.00 | 1.00 | 1.00 |
| Defoaming agent | 2,4,7,9-tetra-methyldecane-4,7-diol | 0.10 | 0.10 | 0.10 | 0.10 | 0.10 | — |
| | 2,5,8,11-tetra-methyldodecane-5,8-diol | — | — | 0.10 | — | — | 0.10 |
| | KM-72F | — | — | — | — | — | — |
| Fluorine-Containing surfactant | Compound having formula (F-1)-e | 0.20 | — | — | 0.20 | — | — |
| | Compound having formula (F-2) | — | 0.20 | — | — | — | 0.30 |
| | Compound having formula (F-3-1) | — | — | 0.10 | — | — | — |
| | Compound having formula (F-4-1) | — | — | — | — | 0.10 | — |
| Surfactant | SOFTANOL EP-7025 | — | — | — | — | — | — |
| Antiseptic | PROXEL GXL | 0.05 | 0.05 | 0.05 | 0.05 | 0.05 | 0.05 |
| Antirust agent | 1,2,3-benzotriazol | 0.05 | 0.05 | 0.05 | 0.05 | 0.05 | 0.05 |
| Pure water | | Balance | Balance | Balance | Balance | Balance | Balance |
| Total (% by weight) | | 100 | 100 | 100 | 100 | 100 | 100 |

TABLE 8-2

| Components (% by weight) | | Pretreatment Liquid Preparation Example | | | | |
|---|---|---|---|---|---|---|
| | | 16 | 17 | 18 | 19 | 20 |
| Organic acid ammonium salt | Ammonium lactate | 6.67 | 6.67 | — | — | — |
| | Ammonium acetate | — | — | 10.31 | — | — |
| Water-soluble cationic polymer | A-1 | — | — | — | 20.00 | — |
| | A-2 | 20.00 | — | — | — | — |
| | A-3 | — | — | — | — | — |
| | A-4 | — | 33.33 | — | — | — |
| | A-5 | — | — | 33.33 | — | — |
| | WS-4020 | — | — | — | — | — |
| | SHALLOL DM-283P | — | — | — | — | 20.00 |
| Wetting agent | 3-methyl-1,3-butanediol | 15.00 | 15.00 | 15.00 | 10.00 | 10.00 |
| | Glycerin | 20.00 | 20.00 | 20.00 | 20.00 | 20.00 |
| Penetrant | 2-ethyl-1,3-hexanediol | 1.00 | 1.00 | 1.00 | 1.00 | 1.00 |
| Defoaming agent | 2,4,7,9-tetra-methyldecane-4,7-diol | 0.10 | 0.10 | 0.10 | 0.10 | 0.10 |
| | 2,5,8,11-tetra-methyldodecane-5,8-diol | — | — | — | — | — |
| | KM-72F | — | — | — | — | — |

TABLE 8-2-continued

| Components (% by weight) | | Pretreatment Liquid Preparation Example | | | | |
|---|---|---|---|---|---|---|
| | | 16 | 17 | 18 | 19 | 20 |
| Fluorine-Containing surfactant | Compound having formula (F-1)-e | 0.20 | 0.20 | 0.20 | — | 0.20 |
| | Compound having formula (F-2) | — | — | — | — | — |
| | Compound having formula (F-3-1) | — | — | — | — | — |
| | Compound having formula (F-4-1) | — | — | — | — | — |
| Surfactant | SOFTANOL EP-7025 | — | — | — | 0.50 | — |
| Antiseptic | PROXEL GXL | 0.05 | 0.05 | 0.05 | 0.05 | 0.05 |
| Antirust agent | 1,2,3-benzotriazol | 0.05 | 0.05 | 0.05 | 0.05 | 0.05 |
| Pure water | | Balance | Balance | Balance | Balance | Balance |
| Total (% by weight) | | 100 | 100 | 100 | 100 | 100 |

The abbreviations and the like in Tables 8-1 and 8-2 mean the following. SOFTANOL EP-7025 and PROXEL GXL are described above regarding Tables 1-4.

1. Ammonium lactate: Ammonium lactate from Kanto Chemical Co., Inc., having a purity of from 73 to 77%.

2. Ammonium acetate: Ammonium acetate from Kanto Chemical Co., Inc., having a purity of 97% or more.

3. WS-4020: Polyamide-epichlorohydrin copolymer from Seiko PMC Corp. including the active ingredient at 25%.

4. SHALLOL DM-283P: Quaternary ammonium type cationic polymer compound having the below-mentioned formula (20) from Dai-ichi Kogyo Seiyaku Co., Ltd., including the active ingredient at 50%, and having a molecular weight of about 28,000.

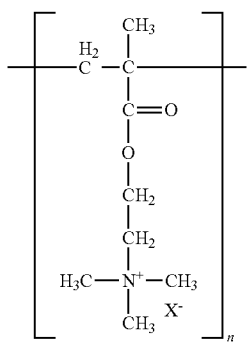

(20)

wherein X represents a halogen atom, and n is an integer.

5. KM-72F: Self emulsification type silicone defoaming agent from Shin-Etsu Chemical Co., Ltd., including the active ingredient at 100%.

6. Compound having formula (F-1)-e

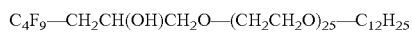

$C_4F_9$—$CH_2CH(OH)CH_2O$—$(CH_2CH_2O)_{25}$—$C_{12}H_{25}$

7. Compound having formula (F-2)

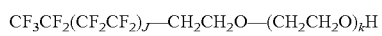

$CF_3CF_2(CF_2CF_2)_j$—$CH_2CH_2O$—$(CH_2CH_2O)_kH$ wherein j is 0 or an integer of from 1 to 10, and k is 0 or an integer of from 1 to 40.

8. Compound having formula (F-3-1)

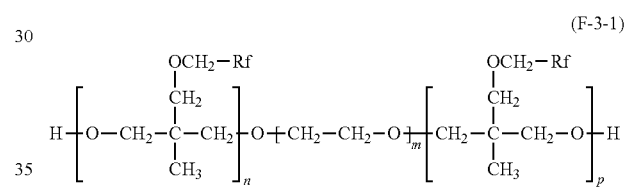

(F-3-1)

wherein Rf represents —$CF_3$, or —$CF_2CF_3$, n is an integer of from 1 to 4, m is an integer of from 6 to 25, and p is an integer of from 1 to 4.

9. Compound having formula (F-4-1)

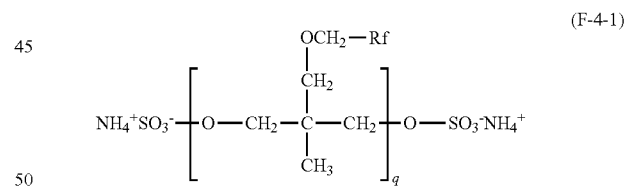

(F-4-1)

wherein Rf represents —$CF_3$, or —$CF_2CF_3$, and q is an integer of from 1 to 6.

The pH and the static surface tension of the pretreatment liquids 10-20 were measured by the methods used for measuring the properties of the pretreatment liquids 1 to 9. The results are shown in Table 9 below.

TABLE 9

| Pretreatment Liquid Preparation Example | pH | Static surface tension (mN/m) |
|---|---|---|
| 10 | 6.44 | 20.6 |
| 11 | 5.78 | 20.8 |
| 12 | 5.19 | 25.7 |
| 13 | 6.43 | 20.7 |

TABLE 9-continued

| Pretreatment Liquid Preparation Example | pH | Static surface tension (mN/m) |
|---|---|---|
| 14 | 6.45 | 26.2 |
| 15 | 6.96 | 20.9 |
| 16 | 6.24 | 21.4 |
| 17 | 5.98 | 20.5 |
| 18 | 6.28 | 20.7 |
| 19 | 6.17 | 30.9 |
| 20 | 4.89 | 20.9 |

Preparation Examples 21-30

Preparation of Aftertreatment Liquids

Each aftertreatment liquid was prepared by the following method.

The components described in Tables 10-1 and 10-2 below were mixed and agitated for 1 hour to prepare a mixture. The mixture was subjected to pressure-filtering using a polyvinylidene fluoride membrane filter having an average pore diameter of 5.0 μm to remove coarse particles and foreign materials. Thus, aftertreatment liquids of Preparation Examples 21-30 were prepared.

TABLE 10-1

| Components (% by weight) | | Preparation Ex. 21 | Preparation Ex. 22 | Preparation Ex. 23 | Preparation Ex. 24 | Preparation Ex. 25 |
|---|---|---|---|---|---|---|
| Water-dispersing resin | LUMIFLON FE4500 | 38.46 | — | — | — | — |
| | POLYSOL ROY6312 | — | 62.50 | — | — | — |
| | HYDRAN HW-930 | — | — | 50.00 | — | — |
| | VONCOAT 9455 | — | — | — | 50.00 | — |
| | VONCOAT BC-280 | — | — | — | — | 50.00 |
| | VINYBLAN 2580 | — | — | — | — | — |
| | VINYBLAN 2586 | — | — | — | — | — |
| Wetting agent | 1,3-butanediol | — | 20.00 | 20.00 | — | 20.00 |
| | 3-methyl-1,3-butanediol | 20.00 | — | 5.00 | — | — |
| | Glycerin | 10.00 | 15.00 | 15.00 | — | 15.00 |
| Penetrant | 2-ethyl-1,3-hexanediol | 1.00 | 1.00 | 1.00 | — | 1.00 |
| Surfactant | ZONYL FS-300 | — | 1.00 | 1.00 | — | 1.00 |
| | Compound (F-1)-e | 0.25 | — | — | 0.25 | — |
| Antiseptic | PROXEL GXL | 0.05 | 0.05 | 0.05 | 0.05 | 0.05 |
| Defoaming agent | 2,4,7,9-tetramethyldecane-4,7-diol | 0.05 | 0.05 | 0.05 | — | 0.05 |
| pH controlling agent | 2-amino-2-ethyl-1,3-propanediol | — | 0.20 | 0.20 | — | 0.20 |
| Pure water | | Balance | Balance | Balance | Balance | Balance |
| Total (% by weight) | | 100 | 100 | 100 | 100 | 100 |

TABLE 10-2

| Components (% by weight) | | Preparation Ex. 26 | Preparation Ex. 27 | Preparation Ex. 28 | Preparation Ex. 29 | Preparation Ex. 30 |
|---|---|---|---|---|---|---|
| Water-dispersing resin | LUMIFLON FE4500 | — | — | — | — | — |
| | POLYSOL ROY6312 | — | — | 62.50 | 50.00 | 50.00 |
| | HYDRAN HW-930 | — | — | — | — | — |
| | VONCOAT 9455 | — | — | — | — | — |
| | VONCOAT BC-280 | — | — | — | — | — |
| | VINYBLAN 2580 | 44.44 | — | — | — | — |
| | VINYBLAN 2586 | — | 44.44 | — | — | — |

TABLE 10-2-continued

| Components (% by weight) | | Preparation Ex. 26 | Preparation Ex. 27 | Preparation Ex. 28 | Preparation Ex. 29 | Preparation Ex. 30 |
|---|---|---|---|---|---|---|
| Wetting agent | 1,3-butane-diol | — | — | — | 10.00 | — |
|  | 3-methyl-1,3-butanediol | 20.00 | 20.00 | 10.00 | — | 10.00 |
|  | Glycerin | 10.00 | 10.00 | 10.00 | 15.00 | 20.00 |
| Penetrant | 2-ethyl-1,3-hexanediol | 1.00 | 1.00 | 1.00 | 1.00 | 1.00 |
| Surfactant | ZONYL FS-300 | — | — | — | — | 0.50 |
|  | Compound having formula (F-1)-e | 0.25 | 0.25 | 0.06 | 0.06 | — |
| Antiseptic | PROXEL GXL | 0.05 | 0.05 | 0.05 | 0.05 | 0.05 |
| Defoaming agent | 2,4,7,9-tetra-methyldecane-4,7-diol | — | — | 0.24 | 0.24 | 0.20 |
| pH controlling agent | 2-amino-2-ethyl-1,3-propanediol | — | — | 0.30 | 0.30 | 0.30 |
| Pure water |  | Balance | Balance | Balance | Balance | Balance |
| Total (% by weight) |  | 100 | 100 | 100 | 100 | 100 |

In Tables 10-1 and 10-2, the abbreviations and the like mean the following. Zonyl FS-300, KF-300 and PROXEL GXL are described above regarding Tables 1-4.

1. LUMIFLON FE-4500F: Fluorine-containing resin emulsion from Asahi Glass Co., Ltd., having a solid content of 52%, a minimum film forming temperature (MFT) of 28° C., and a glass transition temperature (Tg) of from 18 to 23° C.

2. POLYSOL ROY6312: Acrylic-silicone resin emulsion from Showa Denko K.K., having a solid content of 40%, a minimum film forming temperature (MFT) of 20° C., and a glass transition temperature (Tg) of 8° C.

3. HYDRAN HW-930: Polyester type urethane resin emulsion from DIC Corp., having a solid content of 50%, a minimum film forming temperature (MFT) of not higher than 0° C., and a softening temperature of from 115° C. to 120° C.

4. VONCOAT 9455: Styrene-acrylic resin emulsion from DIC Corp., having a solid content of 40%, a minimum film forming temperature (MFT) of from 38° C. to 46° C., and a glass transition temperature (Tg) of 29° C.

4. VONCOAT BC-280: Acrylic resin emulsion from DIC Corp., having a solid content of 50%, a minimum film forming temperature (MFT) of from 0° C. to 3° C., and a glass transition temperature (Tg) of 2° C.

5. VINYBLAN 2580: Acrylic resin emulsion from Nissin Chemical Co., Ltd., having a solid content of 45%, a minimum film forming temperature (MFT) of not lower than 100° C., and a glass transition temperature (Tg) of 100° C.

6. VINYBLAN 2586: Styrene-acrylic resin emulsion from Nissin Chemical Co., Ltd., having a solid content of 45%, a minimum film forming temperature (MFT) of not higher than 0° C., and a glass transition temperature (Tg) of −33° C.

7. Compound having formula (F-1)-e

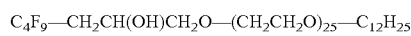

$C_4F_9-CH_2CH(OH)CH_2O-(CH_2CH_2O)_{25}-C_{12}H_{25}$

By using the pretreatment liquids, the inks, and the aftertreatment liquids, images were formed on various recording media.

1. Pretreatment Process

As described above in Tables 11 below, the pretreatment liquids of Preparation Examples 1-20 were applied by a roll coat method on the coat layer surfaces of the recording media, followed by natural drying. In this regard, the coating weights (on a dry basis) of the coated pretreatment liquids are described in Table 11, and the pretreatment process was not performed in Comparative Examples 1, and 3-5.

2. Image Forming Process

As described in Table 11 below, the inks of Manufacturing Examples 1-26 were ejected by an inkjet recording apparatus (IPSIO GXE-5500 from Ricoh Co., Ltd.) under environmental conditions of 23±0.5° C. and 50±5% RH to perform an image forming process. In this regard, the driving voltage of the piezoelectric element was changed so that the amounts of the ejected inks are equal, and therefore the inks are adhered to the recording media in the same amounts. In addition, the print mode of the inkjet recording apparatus was set to a "plain paper—clear image" mode.

3. Aftertreatment Process

The aftertreatment liquids of Preparation Examples 1-20 were applied on the image portions by a roll coating method or a spraying (ejecting) method using an inkjet head under the conditions described in Table 12. In the roll coating method, the aftertreatment liquid was applied on the entire surface of the recording medium bearing the images thereon, and the weight of the dried aftertreatment layer was measured. In the spraying method, the aftertreatment liquid was applied only on the image portion, and the weight of the dried aftertreatment layer per 1 m² was determined based on the amount of the ejected ink and the content of the resin in the aftertreatment liquid. The results are shown in Table 12. In addition, in some examples, a heat fixing roller was contacted with the aftertreatment layer (protective layer) to perform fixing and smoothing. In Comparative Examples 1, 2 and 4, the aftertreatment process was not performed.

TABLE 11

| | Recording medium | Water absorbing property of recording medium (amount of transferred water per 100 ms) (ml/m²) | Pretreatment process Pretreatment liquid | Coating weights of pretreatment liquid on a wet basis (g/m²) | Image forming process Ink used |
|---|---|---|---|---|---|
| Example 1 | OK TOP COAT+ | 3 | Prep. Ex. 1 | 1.6 | Mfg. Ex. 1 |
| Example 2 | OK TOP COAT+ | 3 | Prep. Ex. 2 | 1.6 | Mfg. Ex. 2 |
| Example 3 | OK TOP COAT+ | 3 | Prep. Ex. 3 | 0.8 | Mfg. Ex. 3 |
| Example 4 | OK KINFUJI+ | 1.9 | Prep. Ex. 4 | 0.8 | Mfg. Ex. 4 |
| Example 5 | SA KINFUJI+ | 1.9 | Prep. Ex. 5 | 0.8 | Mfg. Ex. 5 |
| Example 6 | AURORA COAT | 2.8 | Prep. Ex. 6 | 0.8 | Mfg. Ex. 6 |
| Example 7 | SUPER MI DAL | 7 | Prep. Ex. 9 | 0.8 | Mfg. Ex. 7 |
| Example 8 | RICOH BUSINESS COAT GLOSS 100 | 5.8 | Prep. Ex. 10 | 0.8 | Mfg. Ex. 8 |
| Example 9 | SPACE DX | 9.9 | Prep. Ex. 11 | 1.6 | Mfg. Ex. 9 |
| Example 10 | MIRROR COAT PLATINUM | 0.2 | Prep. Ex. 12 | 0.8 | Mfg. Ex. 10 |
| Example 11 | OK TOP COAT+ | 3 | Prep. Ex. 13 | 0.8 | Mfg. Ex. 11 |
| Example 12 | OK TOP COAT+ | 3 | Prep. Ex. 14 | 0.8 | Mfg. Ex. 12 |
| Example 13 | OK TOP COAT+ | 3 | Prep. Ex. 15 | 0.8 | Mfg. Ex. 13 |
| Example 14 | OK TOP COAT+ | 3 | Prep. Ex. 16 | 0.8 | Mfg. Ex. 14 |
| Example 15 | OK TOP COAT+ | 3 | Prep. Ex. 17 | 0.8 | Mfg. Ex. 15 |
| Example 16 | OK TOP COAT+ | 3 | Prep. Ex. 18 | 0.8 | Mfg. Ex. 16 |
| Example 17 | OK TOP COAT+ | 3 | Prep. Ex. 19 | 0.8 | Mfg. Ex. 17 |
| Example 18 | OK TOP COAT+ | 3 | Prep. Ex. 13 | 1.6 | Mfg. Ex. 11 |
| Example 19 | OK TOP COAT+ | 3 | Prep. Ex. 7 | 0.8 | Mfg. Ex. 12 |
| Example 20 | OK TOP COAT+ | 3 | Prep. Ex. 8 | 0.8 | Mfg. Ex. 12 |
| Example 21 | OK TOP COAT+ | 3 | Prep. Ex. 20 | 0.8 | Mfg. Ex. 12 |
| Example 22 | AURORA COAT | 2.8 | Prep. Ex. 6 | 0.8 | Mfg. Ex. 6 |
| Example 23 | SUPER MI DAL | 7 | Prep. Ex. 9 | 0.8 | Mfg. Ex. 7 |
| Comparative Example 1 | OK TOP COAT+ | 3 | — | — | Mfg. Ex. 12 |
| Comparative Example 2 | OK TOP COAT+ | 3 | Prep. Ex. 13 | 0.8 | Mfg. Ex. 12 |
| Comparative Example 3 | OK TOP COAT+ | 3 | — | — | Mfg. Ex. 12 |
| Comparative Example 4 | OK TOP COAT+ | 3 | — | — | Mfg. Ex. 18 |
| Comparative Example 5 | OK TOP COAT+ | 3 | — | — | Mfg. Ex. 19 |
| Comparative Example 6 | OK TOP COAT+ | 3 | Prep. Ex. 16 | 0.8 | Mfg. Ex. 20 |
| Comparative Example 7 | OK TOP COAT+ | 3 | Prep. Ex. 17 | 0.8 | Mfg. Ex. 21 |
| Comparative Example 8 | OK TOP COAT+ | 3 | Prep. Ex. 12 | 0.8 | Mfg. Ex. 22 |
| Comparative | OK TOP | 3 | Prep. Ex. 15 | 0.8 | Mfg. Ex. 23 |

TABLE 11-continued

|  | Recording medium | Water absorbing property of recording medium (amount of transferred water per 100 ms) (ml/m²) | Pretreatment process | | Image forming process Ink used |
|---|---|---|---|---|---|
|  |  |  | Pretreatment liquid | Coating weights of pretreatment liquid on a wet basis (g/m²) |  |
| Example 9 Comparative Example 10 | COAT+ OK TOP COAT+ | 3 | Prep. Ex. 13 | 1.6 | Mfg. Ex. 24 |
| Comparative Example 11 | SUPER FINE PAPER | 33.5 | Prep. Ex. 13 | 1.6 | Mfg. Ex. 25 |
| Comparative Example 12 | TYPE 6200 | 11.5 | Prep. Ex. 13 | 1.6 | Mfg. Ex. 26 |

TABLE 12

|  | Aftertreatment process | | | | | |
|---|---|---|---|---|---|---|
|  | After-treatment liquid | Dry weight of protective layer (g/m²) | Coating method | Coated area | Drying method | Heat fixing |
| Example 1 | Prep. Ex. 21 | 0.8 | Roll coating | Entire surface | Hot air drying | No |
| Example 2 | Prep. Ex. 22 | 1.6 | Ejection from head | Image portion | Hot air drying | Yes |
| Example 3 | Prep. Ex. 23 | 1.6 | Ejection from head | Image portion | Heat roller drying | No |
| Example 4 | Prep. Ex. 24 | 1.6 | Roll coating | Entire surface | Hot air drying | No |
| Example 5 | Prep. Ex. 25 | 1.6 | Roll coating | Entire surface | Natural drying | Yes |
| Example 6 | Prep. Ex. 26 | 1.6 | Roll coating | Entire surface | Infrared drying | Yes |
| Example 7 | Prep. Ex. 27 | 1.6 | Roll coating | Entire surface | Hot air drying | No |
| Example 8 | Prep. Ex. 28 | 1.6 | Ejection from head | Image portion | Microwave drying | No |
| Example 9 | Prep. Ex. 29 | 1.6 | Ejection from head | Image portion | Hot air drying | No |
| Example 10 | Prep. Ex. 30 | 1.6 | Ejection from head | Image portion | Hot air drying | No |
| Example 11 | Prep. Ex. 22 | 1.2 | Ejection from head | Image portion | Hot air drying | No |
| Example 12 | Prep. Ex. 23 | 1.2 | Ejection from head | Image portion | Infrared drying | No |
| Example 13 | Prep. Ex. 28 | 1.6 | Ejection from head | Image portion | Hot air drying | No |
| Example 14 | Prep. Ex. 29 | 1.6 | Ejection from head | Image portion | Microwave drying | No |
| Example 15 | Prep. Ex. 30 | 1.6 | Ejection from head | Image portion | Hot air drying | No |
| Example 16 | Prep. Ex. 29 | 1.2 | Ejection from head | Image portion | Hot air drying | No |
| Example 17 | Prep. Ex. 30 | 1.2 | Ejection from head | Image portion | Hot air drying | No |
| Example 18 | Prep. Ex. 22 | 1.2 | Ejection from head | Image portion | Hot air drying | Yes |
| Example 19 | Prep. Ex. 23 | 1.6 | Ejection from head | Image portion | Hot air drying | No |
| Example 20 | Prep. Ex. 23 | 1.6 | Ejection from head | Image portion | Hot air drying | No |
| Example 21 | Prep. Ex. 23 | 1.6 | Ejection from head | Image portion | Hot air drying | No |
| Example 22 | Prep. Ex. 26 | 1.6 | Roll coating | Entire surface | Natural drying | No |

TABLE 12-continued

| | Aftertreatment process | | | | | |
|---|---|---|---|---|---|---|
| | Aftertreatment liquid | Dry weight of protective layer (g/m$^2$) | Coating method | Coated area | Drying method | Heat fixing |
| Example 23 | Prep. Ex. 27 | 1.6 | Roll coating | Entire surface | Natural drying | No |
| Comparative Example 1 | — | — | — | — | — | — |
| Comparative Example 2 | — | — | — | — | — | — |
| Comparative Example 3 | Prep. Ex. 22 | 1.6 | Ejection from head | Image portion | Hot air drying | No |
| Comparative Example 4 | — | — | — | — | — | — |
| Comparative Example 5 | Prep. Ex. 21 | 1.6 | Roll coating | Entire surface | Hot air drying | No |
| Comparative Example 6 | Prep. Ex. 21 | 0.8 | Roll coating | Entire surface | Hot air drying | No |
| Comparative Example 7 | Prep. Ex. 22 | 1.6 | Ejection from head | Image portion | Hot air drying | No |
| Comparative Example 8 | Prep. Ex. 23 | 1.6 | Ejection from head | Image portion | Hot air drying | No |
| Comparative Example 9 | Prep. Ex. 22 | 1.6 | Roll coating | Entire surface | Hot air drying | No |
| Comparative Example 10 | Prep. Ex. 22 | 1.6 | Roll coating | Entire surface | Hot air drying | No |
| Comparative Example 11 | Prep. Ex. 22 | 1.6 | Roll coating | Entire surface | Hot air drying | No |
| Comparative Example 12 | Prep. Ex. 22 | 1.6 | Roll coating | Entire surface | Hot air drying | No |

The abbreviations and the like in Table 11 mean the following.
1. OK TOP COAT+: Paper for offset printing from Oji Paper Co., Ltd., grade A2.
2. OK KINFUJI+: Paper for offset printing from Oji Paper Co., Ltd., grade A1.
3. SA KINFUJI+: Paper for offset printing from Oji Paper Co., Ltd., grade A0.
4. AURORA COAT: Paper for offset printing from Nippon Paper Industries Co., Ltd., grade A2.
5. SUPER MI DAL: Paper for offset printing from Nippon Paper Industries Co., Ltd., grade A2.
6. RICOH BUSINESS COAT GLOSS 100: Paper for gel-jet printing from Ricoh Co., Ltd., grade A2.
7. SPACE DX: Paper for gravure printing from Nippon Paper Industries Co., Ltd.
8. MIRROR COAT PLATINUM: Cast coat paper for offset printing from Oji Paper Co., Ltd.
9. SUPER FINE PAPER: Paper for inkjet printing from Seiko Epson Corp.
10. TYPE 6200: Paper for plain paper copier (PPC) from Ricoh Co., Ltd.

The images recorded by the methods of Examples 1-23 and Comparative Examples 1-12 were evaluated with respect to image density, chroma, beading, cockling (waving), smear, and glossiness. The evaluation results are shown in Table 13 below.

The evaluations were performed on each of several color images based on the predetermined evaluation criteria. In a case where evaluation results of the several color images varied, the mode (i.e., the most popular evaluation result) is described in Table 13. When there were two or more modes, the best mode is described in Table 13. Since the ink was not ejected in Comparative Example 7, the evaluation was not performed.

The mark "-" in Table 13 means that the evaluation (measurement) could not be performed. In addition, since the cause of color bleeding is the same as that of beading, and the evaluation results of color bleeding are the same as those of beading, the evaluation results of color bleeding are not described in Table 13.

1. Image Density

After performing a pretreatment process on a recording medium as described in Table 11, a color image of a chart including a 64 point solid square image, which was prepared using Microsoft Word 2000, was recorded on the pretreated recording medium. In this regard, the print mode of the printer was set to a mode which is a "glossy paper-clear" mode modified so as not to be subjected to color compensation using a driver attached to the printer. Thereafter, the aftertreatment process was performed thereon as described in Table 12.

The image density of the black square image was measured with a spectrodensitometer X-RITE 939 from X-Rite Corp. The image density was graded as follows.

⊚ (Excellent): Not lower than 2.0 for black image
  Not lower than 1.25 for yellow image
  Not lower than 2.0 for magenta image
  Not lower than 2.0 for cyan image
○ (Good): Not lower than 1.9 and lower than 2.0 for black image
  Not lower than 1.2 and lower than 1.25 for yellow image
  Not lower than 1.9 and lower than 2.0 for magenta image
  Not lower than 1.9 and lower than 2.0 for cyan image
Δ (Acceptable): Not lower than 1.8 and lower than 1.9 for black image
  Not lower than 1.15 and lower than 1.2 for yellow image
  Not lower than 1.8 and lower than 1.9 for magenta image
  Not lower than 1.8 and lower than 1.9 for cyan image
X (Bad): Lower than 1.8 for black image
  Lower than 1.15 for yellow image
  Lower than 1.8 for magenta image
  Lower than 1.8 for cyan image 2. Chroma of Image A color image of the chart was formed by the method used for the evaluation of image density, and then the aftertreatment process was performed thereon. The print mode of the printer was set to a mode which is a "glossy paper-clear" mode modified so as not to be subjected to color compensation using a driver attached to the printer. The solid square image was subjected to colorimetric measurement using the spectrodensitometer X-RITE 939 from X-Rite Corp. The ratio (M/S) of the measured value (M) of chroma to the value (S) of chroma of the standard color image (Japan color ver.2) was calculated. In this regard, the chroma of the standard yellow, magenta, and cyan color images is 91.34, 74.55 and 62.82, respectively.

The chroma was graded as follows.

⊚ (Excellent): The ratio is not less than 1.0.
○ (Good): The ratio is not less than 0.9 and less than 1.0.
X (Bad): The ratio is less than 0.9.

3. Beading

After performing a pretreatment process on a recording medium as described in Table 11, a solid color image was recorded on the recording medium.

The solid color image was visually observed to determine whether the images are uneven density images (i.e., image with beading). The beading was graded as follows.

⊚ (Excellent): The images had no beading.
○ (Good): The images had slight beading.
△ (Acceptable): The images had beading, but beading is on a practical level.
X (Bad): The images had serious beading.

4. Cockling

After performing a pretreatment process on a recording medium as described in Table 11, a solid image with a size of 3 cm×15 cm (in which three solid square images are arrayed), which image was prepared using Microsoft Word 2000, was recorded on the pretreated recording medium. In this regard, the print mode of the printer was set to a mode which is a "glossy paper-clear" mode modified so as not to be subjected to color compensation using a driver attached to the printer. The cockling was graded as follows.

⊚ (Excellent): The images had no cockling, and the recording medium was fed without problem.
○ (Good): The images caused slight cockling, but the recording medium was fed without problem.
△ (Acceptable): The images caused cockling, but the recording medium was fed without a problem.
X (Bad): The images caused serious cockling, and the recording medium was fed with a problem.

5. Smear of Image

A color image of the chart was formed by the method used for the evaluation of image density, and then the aftertreatment process was performed thereon. In this regard, the print mode was the "glossy paper-clear" mode.

After the image was dried for 24 hours under environmental conditions of 23±2° C. and 50±15% RH, the solid square image was rubbed back and forth ten times with a cloth of cotton No. 3, which is defined in JIS L0803 and which is attached to a CM-1 type clock meter using a double-stick tape. The optical density of the cotton cloth was measured with the spectrodensitometer X-RITE 939 from X-Rite Corp. before and after the rubbing test to determine the difference between the optical density of the portion of the cotton cloth used for rubbing and the optical density of the cotton cloth before the rubbing test (i.e., background density of the cotton cloth). The smear was graded as follows.

⊚ (Excellent): The optical density difference was less than 0.05.
○ (Good): The optical density difference was not less than 0.05 and less than 0.1.
△ (Acceptable): The optical density difference was not less than 0.1 and less than 0.15.
X (Bad): The optical density difference was not less than 0.15.

6. Glossiness of Image

A color image of the chart was formed by the same method used for the evaluation of image density, and then the aftertreatment process was performed thereon. In this regard, the print mode of the printer was set to a mode, which is a "glossy paper-clear" mode modified so as not to be subjected to color compensation, using a driver attached to the printer.

The 60° glossiness of the solid square image was measured with a glossmeter. The glossiness was graded as follows.

⊚ (Excellent): The glossiness is not less than 50%.
○ (Good): The glossiness is not less than 30% and less than 50%.
△ (Acceptable): The glossiness is not less than 15% and less than 30%.
X (Bad): The glossiness is less than 15%.

TABLE 13

| | Evaluation results | | | | | |
|---|---|---|---|---|---|---|
| | Image density | Chroma | Beading | Cockling | Smear | Glossiness |
| Ex. 1 | ⊚ | — | ⊚ | ○ | ⊚ | ○ |
| Ex. 2 | ⊚ | — | ⊚ | ○ | ⊚ | ⊚ |
| Ex. 3 | ⊚ | — | ⊚ | ○ | ⊚ | ○ |
| Ex. 4 | ⊚ | — | ○ | ○ | ⊚ | ○ |
| Ex. 5 | ⊚ | ⊚ | ○ | ○ | ⊚ | ⊚ |
| Ex. 6 | ⊚ | ⊚ | ⊚ | ○ | ⊚ | ⊚ |
| Ex. 7 | ⊚ | ⊚ | ⊚ | ○ | ⊚ | ○ |
| Ex. 8 | ⊚ | ⊚ | ⊚ | ⊚ | ⊚ | ○ |
| Ex. 9 | ⊚ | ⊚ | ○ | ○ | ⊚ | ○ |
| Ex. 10 | ⊚ | ⊚ | △ | ⊚ | ⊚ | ○ |
| Ex. 11 | ⊚ | ⊚ | ⊚ | ⊚ | ⊚ | ○ |
| Ex. 12 | ⊚ | — | ⊚ | ⊚ | ⊚ | ⊚ |
| Ex. 13 | ⊚ | ⊚ | ⊚ | ⊚ | ⊚ | ○ |
| Ex. 14 | ⊚ | ⊚ | ⊚ | ○ | ⊚ | ⊚ |
| Ex. 15 | ⊚ | ⊚ | ⊚ | ○ | ⊚ | ○ |
| Ex. 16 | ⊚ | — | ⊚ | △ | ⊚ | ○ |
| Ex. 17 | ⊚ | ⊚ | ⊚ | △ | ⊚ | ○ |
| Ex. 18 | ⊚ | ⊚ | ⊚ | ⊚ | ⊚ | ⊚ |
| Ex. 19 | ⊚ | — | ⊚ | ⊚ | △ | ○ |
| Ex. 20 | ⊚ | — | ⊚ | ⊚ | △ | ○ |
| Ex. 21 | ⊚ | — | △ | ⊚ | ⊚ | ○ |
| Ex. 22 | ⊚ | ⊚ | ⊚ | ○ | △ | ○ |
| Ex. 23 | ⊚ | ⊚ | ⊚ | ○ | ⊚ | ○ |
| Comp. Ex. 1 | ○ | — | X | ○ | ⊚ | △ |
| Comp. Ex. 2 | X | — | ⊚ | ○ | ⊚ | △ |
| Comp. Ex. 3 | ⊚ | — | X | ○ | ⊚ | ○ |
| Comp. Ex. 4 | ○ | — | X | X | ⊚ | △ |
| Comp. Ex. 5 | ⊚ | — | X | X | ⊚ | ○ |
| Comp. Ex. 6 | ⊚ | — | ⊚ | X | ⊚ | ○ |
| Comp. Ex. 7 | — | — | — | — | — | — |
| Comp. Ex. 8 | ⊚ | — | △ | X | ⊚ | ○ |
| Comp. Ex. 9 | ⊚ | — | ⊚ | X | ⊚ | ○ |
| Comp. Ex. 10 | ⊚ | — | ⊚ | X | ⊚ | ○ |
| Comp. Ex. 11 | X | — | ⊚ | X | ⊚ | X |

TABLE 13-continued

| | Evaluation results | | | | | |
|---|---|---|---|---|---|---|
| | Image density | Chroma | Beading | Cockling | Smear | Glossiness |
| Ex. 11 Comp. Ex. 12 | X | — | ◉ | X | ◉ | X |

Additional modifications and variations of the present invention are possible in light of the above teachings. It is therefore to be understood that within the scope of the appended claims the invention may be practiced other than as specifically described herein.

What is claimed is:

1. An image forming method comprising:
adhering a pretreatment liquid to a surface of a recording medium bearing a coat layer thereon, wherein the recording medium includes a support, and the coat layer is located on at least one surface of the support;
adhering an inkjet ink including a colorant, an organic solvent, a surfactant and water to the surface of the recording medium, to which the pretreatment liquid has been adhered, to form an image of the ink; and
adhering an aftertreatment liquid to the surface of the recording medium, on which the image has been formed, to form a protective layer at least on the ink image on the recording medium,
wherein the organic solvent of the ink includes:
a polyalcohol having an equilibrium moisture content of not less than 30% by weight at 23° C. and 80% RH;
an amide compound having the below-mentioned formula (I):

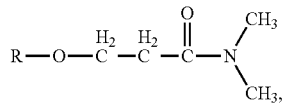

(I)

wherein R represents an alkyl group having 4 to 6 carbon atoms; and
a compound having a formula selected from the group consisting of the below-mentioned formulae (II) to (IV):

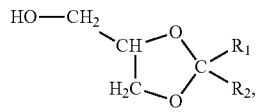

(II)

wherein $R_1$ represents a hydrogen atom, or an alkyl group having 1 or 2 carbon atoms, and $R_2$ represents an alkyl group having 1 to 4 carbon atoms;

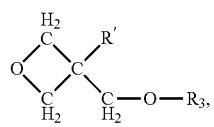

(III)

wherein R' represents an alkyl group having 1 or 2 carbon atoms, and $R_3$ represents a hydrogen atom, an alkyl group having 1 to 8 carbon atoms, a cyclic alkyl group, or an aromatic group; and

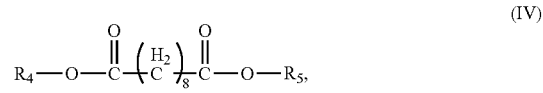

(IV)

wherein each of $R_4$ and $R_5$ independently represents an alkyl group having 1 to 8 carbon atoms.

2. The image forming method according to claim 1, wherein the amide compound has the following formula (I-1):

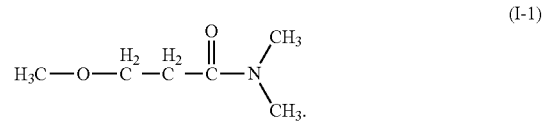

(I-1)

3. The image forming method according to claim 1, wherein the pretreatment liquid includes a water-soluble aliphatic organic acid having the following formula (V):

(V)

wherein $R_6$ represents a hydrogen atom, or a methyl group substituted with a hydroxyl group or a carboxyl group; $R_7$ represents a methyl group, a methyl group substituted with a carboxyl group, or a methyl group substituted with a hydroxyl group and a carboxyl group.

4. The image forming method according to claim 3, wherein the pretreatment liquid further includes a water-soluble organic monoamine compound.

5. The image forming method according to claim 4, wherein the water-soluble organic monoamine compound has one of the following formulae (VI) and (VII):

(VI)

wherein each of $R_8$, $R_9$ and $R_{10}$ independently represents a hydrogen atom, an alkoxyl group having 1 to 4 carbon atoms, an alkyl group having 1 to 8 carbon atoms, a hydroxyethyl group, or a hydroxypropyl group, wherein $R_8$, $R_9$ and $R_{10}$ are not simultaneously a hydrogen atom; and

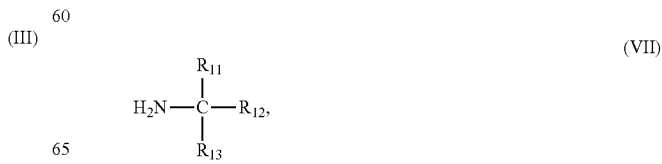

(VII)

wherein $R_{11}$ represents a hydroxymethyl group; $R_{12}$ represents a methyl group, an ethyl group, or a hydroxymethyl group; and $R_{13}$ represents a hydrogen atom, an alkyl group having 1 to 4 carbon atoms, or a hydroxymethyl group.

6. The image forming method according to claim 1, wherein the pretreatment liquid includes at least one of ammonium lactate, ammonium acetate, and a water-soluble cationic polymer.

7. The image forming method according to claim 1, wherein the aftertreatment liquid includes at least one water-dispersing resin selected from the group consisting of acrylic resins, styrene-acrylic resins, urethane resins, acrylic-silicone resins, and fluorine-containing resins.

* * * * *